United States Patent
Sengupta et al.

(10) Patent No.: US 11,533,213 B2
(45) Date of Patent: *Dec. 20, 2022

(54) RESYNCHRONIZATION SIGNAL DESIGN

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/156,479

(22) Filed: Jan. 22, 2021

(65) Prior Publication Data

US 2021/0144043 A1 May 13, 2021

Related U.S. Application Data

(63) Continuation of application No. 16/234,375, filed on Dec. 27, 2018, now Pat. No. 10,931,500.

(Continued)

(51) Int. Cl.
*H04L 27/26* (2006.01)
*H04J 11/00* (2006.01)
(Continued)

(52) U.S. Cl.
CPC ...... *H04L 27/2678* (2013.01); *H04J 11/0073* (2013.01); *H04J 11/0076* (2013.01);
(Continued)

(58) Field of Classification Search
CPC .............. H04L 27/2678; H04L 27/261; H04L 27/2675; H04J 11/0073; H04J 11/0076;
(Continued)

(56) References Cited

U.S. PATENT DOCUMENTS 10,149,288 B2    12/2018   Kim et al.
10,931,500 B2 *   2/2021   Sengupta ............ H04J 11/0073
(Continued)

FOREIGN PATENT DOCUMENTS

| CN | 105308887 A | 2/2016 |
| CN | 107409370 A | 11/2017 |
| WO | WO-2017052252 A1 | 3/2017 |

OTHER PUBLICATIONS

"3rd Generation Partnership Project; Technical Specification Group Radio Access Network; Evolved Universal Terrestrial Radio Access (E-UTRA); Physical Layer Procedures (Release 15)", 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 16, 2018, pp. 88-177, XP051392683, [retrieved on Jan. 16, 2018].

(Continued)

*Primary Examiner* — Peter G Solinsky
(74) *Attorney, Agent, or Firm* — Nerrie M. Zohn

(57) ABSTRACT

Methods, systems, and devices for wireless communications are described. A user equipment (UE) may receive a first synchronization signal for synchronizing with a cell, the first synchronization signal transmitted at a first periodicity by a base station serving the cell. The UE may then receive, subsequent to the synchronizing, a second synchronization signal for resynchronizing with the cell. In some cases, the second synchronization signal may be transmitted by the base station according to a second periodicity that is different from the first periodicity. In some cases, the second synchronization signal may include a plurality of repetitions of a first sequence that is based at least in part on a cell identifier of the cell. The UE may communicate over the cell (Continued)

with the base station based at least in part on the resynchronizing.

31 Claims, 27 Drawing Sheets

Related U.S. Application Data

(60) Provisional application No. 62/755,400, filed on Nov. 2, 2018, provisional application No. 62/669,704, filed on May 10, 2018, provisional application No. 62/652,634, filed on Apr. 4, 2018, provisional application No. 62/710,408, filed on Feb. 16, 2018, provisional application No. 62/621,751, filed on Jan. 25, 2018.

(51) Int. Cl.
  *H04W 56/00* (2009.01)
  *H04W 52/02* (2009.01)
(52) U.S. Cl.
  CPC ........ *H04J 11/0079* (2013.01); *H04L 27/261* (2013.01); *H04L 27/2675* (2013.01); *H04W 52/0225* (2013.01); *H04W 56/0015* (2013.01)
(58) Field of Classification Search
  CPC ........... H04J 11/0079; H04W 52/0225; H04W 56/0015
  USPC ........................................................ 370/350
  See application file for complete search history.

(56) References Cited

U.S. PATENT DOCUMENTS

| | | | |
|---|---|---|---|
| 2014/0198772 A1* | 7/2014 | Baldemair | H04L 27/2692 370/335 |
| 2014/0307621 A1 | 10/2014 | Frenger et al. | |
| 2015/0092691 A1 | 4/2015 | Hwang et al. | |
| 2015/0098381 A1 | 4/2015 | Cucala et al. | |
| 2016/0218821 A1 | 7/2016 | Adhikary et al. | |
| 2016/0338056 A1 | 11/2016 | Xue et al. | |
| 2018/0270757 A1 | 9/2018 | Ahn et al. | |
| 2019/0229973 A1 | 7/2019 | Sengupta et al. | |

OTHER PUBLICATIONS

International Search Report and Written Opinion—PCT/US2018/067830—ISA/EPO—dated Jun. 19, 2019.
Partial International Search Report—PCT/US2018/067830—ISA/EPO—dated Apr. 12, 2019.
Samsung: "Discussion on Enhanced Synchronization Signals and Re-Synchronization Signals" [online], 3GPP Draft, 3GPP TSG RAN WG1 Meeting #91, R1-1720259, Reno, USA, Nov. 27-Dec. 1, 2017, Nov. 18, 2017, pp. 1-2, Retrieved from the Internet: URL: https://www.3gpp.org/ftp/TSG_RAN/WG1_RL1/TSGR1_91/Docs/R1-1720259.zip,.
Taiwan Search Report—TW107147730—TIPO—dated Jun. 20, 2021.
Ericsson: "Reduced System Acquisition Time for MTC," 3GPP TSG-RAN WG1 Meeting #91, R1-1719349, Nov. 27-Dec. 1, 2017, (Nov. 18, 2017), 6 pages.
Huawei., et al., "Synchronization Signal Design," 3GPP Draft, 3GPPTSG RAN WG1 Meeting #84, R1-160311, 3rd Generation Partnership Project (3GPP), Mobile Competence Centre; 650, Route Des Lucioles; F-06921 Sophia-Antipolis Cedex; France; vol. RAN WG1, No. St Julian's, Malta; Feb. 15, 2016-Feb. 19, 2016; Feb. 14, 2016 (Feb. 14, 2016), 10 pages, XP051053651, Retrieved from the Internet: URL:http://www.3gpp.org/ftp/Meetings_3GPP_SYNC/RAN1/Docs/ [retrieved on Feb. 14, 2016], the whole document.
Intel Corporation: "Wake-Up signal for efeMTC," 3GPP TSG RAN WG1 Meeting #90, R1-1712498, Aug. 21-25, 2017 (Aug. 12, 2017), 8 pages.
Sierra Wireless: "Reduced PSS/SSS Acquisition Time Analysis," 3GPP TSG RAN WG1 Meeting #89, R1-1708310, May 15-19, 2017 (May 6, 2017), 9 pages.
Sony: "On Reduced System Acquisition Time for efeMTC," 3GPP TSG RAN WG1 Meeting #90, R1-1712955, Aug. 21-25, 2017, (Aug. 12, 2017), 5 pages.

* cited by examiner

— B

— A

— 0

— 1

RESYNCHRONIZATION SIGNAL DESIGN

CROSS REFERENCES

The present application for patent is a Continuation of U.S. patent application Ser. No. 16/234,375 by SENGUPTA, et al., entitled "RESYNCHRONIZATION SIGNAL DESIGN" filed Dec. 27, 2018, which claims the benefit of U.S. Provisional Patent Application No. 62/621,751 by SENGUPTA, et al., entitled "RESYNCHRONIZATION SIGNAL DESIGN," filed Jan. 25, 2018, and claims the benefit of U.S. Provisional Patent Application No. 62/710,408 by SENGUPTA, et al., entitled "RESYNCHRONIZATION SIGNAL DESIGN", filed Feb. 16, 2018, and claims the benefit of U.S. Provisional Application No. 62/652,634 by SENGUPTA, et al., entitled "RESYNCHRONIZATION SIGNAL DESIGN", filed Apr. 4, 2018, and claims the benefit of U.S. Provisional Application No. 62/669,704 by SENGUPTA, et al., entitled "RESYNCHRONIZATION SIGNAL DESIGN", filed May 10, 2018, and claims the benefit of U.S. Provisional Application No. 62/755,400 by SENGUPTA, et al., entitled "RESYNCHRONIZATION SIGNAL DESIGN", filed Nov. 2, 2018, each of which are assigned to the assignee hereof, and expressly incorporated by reference herein.

BACKGROUND

The following relates generally to wireless communication, and more specifically to resynchronization signal design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of the wireless communications systems, a UE may discover and synchronize to a cell by detecting a primary synchronization signal (PSS) and a secondary synchronization signal (SSS). In some cases, for example where the UE is designed to work at low signal-to-noise ratio (SNR), detection for timing synchronization may involve combining signal energy from multiple instances of the PSS and/or SSS. Because of the energy density of the PSS and SSS signals, synchronization or resynchronization (where the UE has previously synchronized and maintains coarse timing information) may cause significant latency for communications. Increasing transmission power for the PSS and SSS may improve latency, but may not be feasible because of transmission power limits or interference concerns.

SUMMARY

The described techniques relate to improved methods, systems, devices, or apparatuses that support resynchronization signal design. Generally, the described techniques provide for efficient design of resynchronization signal to reduce latency for communications. Some fifth generation (5G) or New Radio (NR) systems are designed to support user equipments (UEs) having low signal-to-noise ratio (SNR). Using previous techniques, a UE may be configured to detect timing synchronization by combining signal energy from multiple instances of synchronization signals. In some aspects, synchronization signals for a cell include a primary synchronization signal (PSS) and a secondary synchronization signal (SSS). However, for operation at low SNRs, once a UE loses synchronization, the UE may combine energy across multiple PSS/SSS cycles before achieving synchronization. Aspects of the present disclosure provide methods, systems, and devices for increasing energy density and improving timing detection properties for transmission of a synchronization signal.

In some cases, the UE may receive a first synchronization signal (e.g., PSS/SSS) for synchronizing with a cell. In some examples, the first synchronization signal may be transmitted according to a first periodicity by a base station serving the cell. The first synchronization signal may be used by the UE for timing synchronization and detection of the cell identifier for the cell. In some examples, the first synchronization signal may be transmitted according to a first periodicity. After receiving the first synchronization signal, the UE may camp on the cell in an idle mode (e.g., with or without entering a connected mode first) or a sleep mode (e.g., power-save state) for some period of time. In some examples, by transitioning into a sleep mode, the UE may lose symbol level synchronization with the cell. According to some aspects of the present disclosure, the UE may receive a second synchronization signal for resynchronizing with the cell. In some cases, the second synchronization signal may be referred to as a resynchronization signal (RSS). In some examples, the RSS may be transmitted according to a second periodicity different from the first periodicity. For example, the second periodicity may be lower than the first periodicity. In some cases, the UE may be configured to use the RSS to re-acquire synchronization once the UE has been in sleep mode. In some examples, upon resynchronizing, the UE may be configured to communicate with the cell. Thus, once a UE has been in synchronization with a base station or has timing information related to the periodicity of the resynchronization signal, the present techniques enable the UE to regain timing synchronization with reduced latency and power expenditure.

A method of wireless communication is described. The method may include receiving a first synchronization signal for synchronizing with a cell, the first synchronization signal transmitted by a base station serving the cell according to a first periodicity, receiving, subsequent to the synchronizing, a second synchronization signal for resynchronizing with the cell, the second synchronization signal transmitted by the base station according to a second periodicity, and communicating over the cell with the base station based on the resynchronizing. In some cases, the second synchronization signal may include a plurality of repetitions of a first sequence that is based on a cell identifier of the cell.

An apparatus for wireless communication is described. The apparatus may include means for receiving a first synchronization signal for synchronizing with a cell, the first synchronization signal transmitted by a base station serving the cell according to a first periodicity, means for receiving, subsequent to the synchronizing, a second synchronization signal for resynchronizing with the cell, the second synchronization signal transmitted by the base station according to a second periodicity, and means for communicating over the cell with the base station based on the resynchronizing. In some cases, the second synchronization signal may include a plurality of repetitions of a first sequence that is based on a cell identifier of the cell.

Another apparatus for wireless communication is described. The apparatus may include a processor, memory in electronic communication with the processor, and instructions stored in the memory. The instructions may be operable to cause the processor to receive a first synchronization signal for synchronizing with a cell, the first synchronization signal transmitted by a base station serving the cell according to a first periodicity, receive, subsequent to the synchronizing, a second synchronization signal for resynchronizing with the cell, the second synchronization signal transmitted by the base station according to a second periodicity, and communicate over the cell with the base station based on the resynchronizing. In some cases, the second synchronization signal may include a plurality of repetitions of a first sequence that is based on a cell identifier of the cell.

A non-transitory computer-readable medium for wireless communication is described. The non-transitory computer-readable medium may include instructions operable to cause a processor receive a first synchronization signal for synchronizing with a cell, the first synchronization signal transmitted by a base station serving the cell according to a first periodicity, receive, subsequent to the synchronizing, a second synchronization signal for resynchronizing with the cell, the second synchronization signal transmitted by the base station according to a second periodicity, and communicate over the cell with the base station based on the resynchronizing. In some cases, the second synchronization signal may include a plurality of repetitions of a first sequence that is based on a cell identifier of the cell.

In some examples of the method, apparatus, and non-transitory computer-readable medium described above, the first sequence may include a first subsequence and a second subsequence. In some examples of the method, apparatus, and non-transitory computer-readable medium described above, the second subsequence corresponds to a complex conjugate of the first subsequence.

In some examples of the method, apparatus, and non-transitory computer-readable medium described above, the second synchronization signal may include a plurality of repetitions of a second sequence. In some cases, the plurality of repetitions of the first sequence and the plurality of repetitions of the second sequence may be transmitted according to a binary sequence.

In some examples of the method, apparatus, and non-transitory computer-readable medium described above, the first sequence and the second sequence may have low absolute value of cross-correlation with each other. In some examples of the method, apparatus, and non-transitory computer-readable medium described above, the second sequence corresponds to a complex conjugate of the first sequence.

In some examples of the method, apparatus, and non-transitory computer-readable medium described above, identifying the binary sequence is based on a length of the first sequence, or a length of the second synchronization signal, or the cell identifier, or a combination thereof.

In some examples of the method, apparatus, and non-transitory computer-readable medium described above, identifying a sequence type of the binary sequence is based on a length of the first sequence or a length of the second synchronization signal. In some cases, the sequence type corresponds to a Gold sequence, an m-sequence, or a computer-generated sequence with minimum sidelobe amplitude in an autocorrelation function.

In some examples of the method, apparatus, and non-transitory computer-readable medium described above, the binary sequence comprises a four-bit binary sequence given by {1, 0, 1, 1}, an eight-bit binary sequence given by {1, 0, 0, 1, 0, 1, 1, 1}, a sixteen-bit binary sequence given by {0, 0, 1, 1, 0, 1, 0, 0, 0, 1, 1, 0, 0, 1, 0, 1}, a thirty-two-bit binary sequence given by {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1}, or a forty-bit binary sequence given by {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 0, 1, 0, 1, 1, 0}.

Some examples of the method, apparatus, and non-transitory computer-readable medium described above may further include processes, features, means, or instructions for receiving a third synchronization signal for the resynchronizing with the cell, the third synchronization signal being transmitted by the base station over the cell subsequent to the second synchronization signal and having a sequence length longer than a sequence length of the first sequence.

In some examples of the method, apparatus, and non-transitory computer-readable medium described above, the sequence length of the third synchronization may be shorter than a sequence length of the second synchronization signal. In some examples of the method, apparatus, and non-transitory computer-readable medium described above, the first synchronization signal may span a plurality of physical resource blocks (PRBs) and the second synchronization signal may span the plurality of PRBs. In some examples of the method, apparatus, and non-transitory computer-readable medium described above, the second synchronization signal may span a subset of a plurality of PRBs corresponding to a bandwidth of a narrowband protocol type.

In some examples of the method, apparatus, and non-transitory computer-readable medium described above, a transmission power associated with the second synchronization signal may be increased relative to a transmission power associated with the first synchronization signal by a ratio of a first number of PRBs in the plurality of PRBs to a second number of PRBs in the subset of the plurality of PRBs. In some cases, the subset of the plurality of PRBs correspond to a contiguous set of PRBs. In some cases, the subset of the plurality of PRBs correspond to a non-contiguous set of PRBs. Some examples of the method, apparatus, and non-transitory computer-readable medium described above may further include processes, features, means, or instructions for determining the cell identifier of the base station from the first synchronization signal. Some examples of the method, apparatus, and non-transitory computer-readable medium described above may further include processes, features, means, or instructions for correlating the second synchronization signal for the resynchronizing using a representation of the first sequence determined based on the cell identifier.

Some examples of the method, apparatus, and non-transitory computer-readable medium described above may further include processes, features, means, or instructions for receiving system information associated with the cell, the system information indicating at least one of a presence of the second synchronization signal, timing information for the second synchronization signal (e.g., the second periodicity, a timing offset from the first synchronization signal), a length of the second synchronization signal, a frequency offset and/or a frequency location for the second synchronization signal, a transmit power for the second synchronization signal, a bandwidth of the second synchronization signal, a hopping pattern for the second synchronization signal, a multiplicative factor for the second periodicity, or an overhead percentage.

Some examples of the method, apparatus, and non-transitory computer-readable medium described above may further include processes, features, means, or instructions for determining the second periodicity based on an association between the length of the second synchronization signal received in the system information and the second periodicity.

In some examples of the method, apparatus, and non-transitory computer-readable medium described above, the association between the length of the second synchronization signal received in the system information and the second periodicity may be determined based on the multiplicative factor.

Some examples of the method, apparatus, and non-transitory computer-readable medium described above may further include processes, features, means, or instructions for determining the length of the second synchronization signal based on an association between the second periodicity received in the system information and the length of the second synchronization signal.

In some examples of the method, apparatus, and non-transitory computer-readable medium described above, the association between the second periodicity received in the system information and the length of the second synchronization signal may be determined based on the overhead percentage.

In some examples of the method, apparatus, and non-transitory computer-readable medium described above, the receiving the second synchronization signal may include: identifying that at least one of a plurality of scheduled subframes for the second synchronization signal coincides with a subframe that may be restricted for transmission of the second synchronization signal. Some examples of the method, apparatus, and non-transitory computer-readable medium described above may further include processes, features, means, or instructions for modifying the plurality of scheduled subframes for the receiving the second synchronization signal.

In some examples of the method, apparatus, and non-transitory computer-readable medium described above, the restricted subframe may include one of a multicast subframe, a machine-type communication (MTC) invalid subframe, a time division duplex (TDD) uplink subframe, or a TDD special subframe.

In some examples of the method, apparatus, and non-transitory computer-readable medium described above, the modifying the plurality of scheduled subframes may include selecting a modification action from the group including postponing the at least one of the plurality of scheduled subframes to a next subframe after the restricted subframe, suppressing reception of the at least one of the plurality of scheduled subframes for the restricted subframe, and receiving a portion of the at least one of the plurality of scheduled subframes in the restricted subframe.

In some examples of the method, apparatus, and non-transitory computer-readable medium described above, the selecting the modification action may be based on a TDD special subframe configuration. In some examples of the method, apparatus, and non-transitory computer-readable medium described above, the second synchronization signal may be punctured by at least one of a reference signal, the first synchronization signal, or a broadcast channel.

Some examples of the method, apparatus, and non-transitory computer-readable medium described above may further include processes, features, means, or instructions for receiving, from the base station, a resynchronization signal configuration for a neighbor cell, the resynchronization signal configuration including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal. In some examples of the method, apparatus, and non-transitory computer-readable medium described above, the resynchronization signal configuration may be received in system information or in dedicated signaling from the base station.

Some examples of the method, apparatus, and non-transitory computer-readable medium described above may further include processes, features, means, or instructions for transitioning, subsequent to the synchronizing, out of a connected mode with the base station. In some examples of the method, apparatus, and non-transitory computer-readable medium described above, the first sequence corresponds to a pseudo-noise (PN) sequence, a Zadoff-Chu sequence, or a result of a Kronecker product of a subsequence with a binary sequence.

In some examples of the method, apparatus, and non-transitory computer-readable medium described above, the subsequence corresponds to a PN sequence or a Zadoff-Chu sequence. In some examples of the method, apparatus, and non-transitory computer-readable medium described above, the binary sequence corresponds to a maximum length sequence, a Barker code, or a Gold sequence.

Some examples of the method, apparatus, and non-transitory computer-readable medium described above may further include processes, features, means, or instructions for receiving a second instance of the first synchronization signal for the resynchronizing with the cell based on phase or timing information determined from the second synchronization signal. In some examples of the method, apparatus, and non-transitory computer-readable medium described above, identifying a length of the first sequence is based on a length of the second synchronization signal. In some examples of the method, apparatus, and non-transitory computer-readable medium described above, the length of the second synchronization signal is a multiple of the length of the first sequence.

Some examples of the method, apparatus, and non-transitory computer-readable medium described above may further include processes, features, means, or instructions for identifying an association between the length of the first sequence and the length of the second synchronization signal from a look-up table.

A method of wireless communication is described. The method may include transmitting, by a base station serving a cell, a first synchronization signal for the cell, the first synchronization signal transmitted according to a first periodicity, transmitting a second synchronization signal for the cell, the second synchronization signal transmitted according to a second periodicity, and communicating with at least one UE over the cell based on the transmission of the first synchronization signal or the second synchronization signal. In some cases, the second synchronization signal may include a plurality of repetitions of a first sequence that is based on a cell identifier of the cell.

An apparatus for wireless communication is described. The apparatus may include means for transmitting, by a base station serving a cell, a first synchronization signal for the cell, the first synchronization signal transmitted according to a first periodicity, means for transmitting a second synchronization signal for the cell, the second synchronization signal transmitted according to a second periodicity, and means for communicating with at least one UE over the cell based on the transmission of the first synchronization signal or the second synchronization signal. In some cases, the second synchronization signal may include a plurality of repetitions of a first sequence that is based on a cell identifier of the cell.

Another apparatus for wireless communication is described. The apparatus may include a processor, memory in electronic communication with the processor, and instructions stored in the memory. The instructions may be operable to cause the processor to transmit, by a base station serving a cell, a first synchronization signal for the cell, the first synchronization signal transmitted according to a first periodicity, transmit a second synchronization signal for the cell, the second synchronization signal transmitted according to a second periodicity, and communicate with at least one UE over the cell based on the transmission of the first synchronization signal or the second synchronization signal. In some cases, the second synchronization signal may include a plurality of repetitions of a first sequence that is based on a cell identifier of the cell.

A non-transitory computer-readable medium for wireless communication is described. The non-transitory computer-readable medium may include instructions operable to cause a processor to transmit, by a base station serving a cell, a first synchronization signal for the cell, the first synchronization signal transmitted according to a first periodicity, transmit a second synchronization signal for the cell, the second synchronization signal transmitted according to a second periodicity, and communicate with at least one UE over the cell based on the transmission of the first synchronization signal or the second synchronization signal. In some cases, the second synchronization signal may include a plurality of repetitions of a first sequence that is based on a cell identifier of the cell.

In some examples of the method, apparatus, and non-transitory computer-readable medium described above, the first sequence may include a first subsequence and a second subsequence. In some examples of the method, apparatus, and non-transitory computer-readable medium described above, the second subsequence corresponds to a complex conjugate of the first subsequence.

Some examples of the method, apparatus, and non-transitory computer-readable medium described above may further include processes, features, means, or instructions for transmitting the first subsequence via a first antenna port and the second subsequence via a second antenna port. In some examples of the method, apparatus, and non-transitory computer-readable medium described above, the second synchronization signal may include a plurality of repetitions of a second sequence. In some cases, the plurality of repetitions of the first sequence and the plurality of repetitions of the second sequence may be transmitted according to a binary sequence.

In some examples of the method, apparatus, and non-transitory computer-readable medium described above, the first sequence and the second sequence may have low absolute value of cross-correlation with each other. In some examples of the method, apparatus, and non-transitory computer-readable medium described above, the second sequence corresponds to a complex conjugate of the first sequence.

In some examples of the method, apparatus, and non-transitory computer-readable medium described above, identifying the binary sequence is based on a length of the first sequence, or a length of the second synchronization signal, or the cell identifier, or a combination thereof.

In some examples of the method, apparatus, and non-transitory computer-readable medium described above, identifying a sequence type of the binary sequence is based on a length of the first sequence or a length of the second synchronization signal. In some cases, the sequence type corresponds to a Gold sequence, an m-sequence, or a computer-generated sequence with minimum sidelobe amplitude in an autocorrelation function.

Some examples of the method, apparatus, and non-transitory computer-readable medium described above may further include processes, features, means, or instructions for transmitting the first sequence via a first antenna port and the second sequence via a second antenna port.

Some examples of the method, apparatus, and non-transitory computer-readable medium described above may further include processes, features, means, or instructions for transmitting a third synchronization signal for the cell subsequent to the second synchronization signal, the third synchronization signal having a sequence length longer than a sequence length of the first sequence. In some examples of the method, apparatus, and non-transitory computer-readable medium described above, the sequence length of the third synchronization may be shorter than a sequence length of the second synchronization signal.

Some examples of the method, apparatus, and non-transitory computer-readable medium described above may further include processes, features, means, or instructions for transmitting system information associated with the cell, the system information indicating at least one of a presence of the second synchronization signal, timing information for the second synchronization signal (e.g., the second periodicity, a timing offset from the first synchronization signal), a length of the second synchronization signal, a frequency offset and/or a frequency location for the second synchronization signal, a transmit power for the second synchronization signal, a bandwidth of the second synchronization signal, a hopping pattern for the second synchronization signal, a multiplicative factor for the second periodicity, or an overhead percentage.

Some examples of the method, apparatus, and non-transitory computer-readable medium described above may further include processes, features, means, or instructions for determining the second periodicity based on an association between the length of the second synchronization signal indicated in the system information and the second periodicity. In some examples of the method, apparatus, and non-transitory computer-readable medium described above, the association between the length of the second synchronization signal received in the system information and the second periodicity may be determined based on the multiplicative factor.

Some examples of the method, apparatus, and non-transitory computer-readable medium described above may further include processes, features, means, or instructions for determining the length of the second synchronization signal based on an association between the second periodicity indicated in the system information and the length of the second synchronization signal. In some examples of the method, apparatus, and non-transitory computer-readable medium described above, the association between the second periodicity received in the system information and the length of the second synchronization signal may be determined based on the overhead percentage.

Some examples of the method, apparatus, and non-transitory computer-readable medium described above may further include processes, features, means, or instructions for identifying that at least one of a plurality of scheduled subframes for the second synchronization signal coincides with a subframe that may be restricted for of the second synchronization signal. Some examples of the method, apparatus, and non-transitory computer-readable medium described above may further include processes, features, means, or instructions for modifying the plurality of scheduled subframes for the transmitting the second synchronization signal.

In some examples of the method, apparatus, and non-transitory computer-readable medium described above, the restricted subframe may include one of a multicast subframe, a machine-type communication (MTC) invalid subframe, a time division duplex (TDD) uplink subframe, or a TDD special subframe.

In some examples of the method, apparatus, and non-transitory computer-readable medium described above, the modifying the plurality of scheduled subframes may include selecting a modification action from the group including postponing the at least one of the plurality of scheduled subframes to a next subframe after the restricted subframe, suppressing transmission of the at least one of the plurality of scheduled subframes for the restricted subframe, and transmitting a portion of the at least one of the plurality of scheduled subframes in the restricted subframe. In some examples of the method, apparatus, and non-transitory computer-readable medium described above, the selecting the modification action may be based on a TDD special subframe configuration.

Some examples of the method, apparatus, and non-transitory computer-readable medium described above may further include processes, features, means, or instructions for puncturing the second synchronization signal with at least one of a reference signal, the first synchronization signal, or a broadcast channel. Some examples of the method, apparatus, and non-transitory computer-readable medium described above may further include processes, features, means, or instructions for transmitting, to the at least one UE, a resynchronization signal configuration for a neighbor cell, the resynchronization signal configuration including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal.

In some examples of the method, apparatus, and non-transitory computer-readable medium described above, the resynchronization signal configuration may be transmitted in system information or in dedicated signaling from the base station to the at least one UE. In some examples of the method, apparatus, and non-transitory computer-readable medium described above, the first sequence corresponds to a PN sequence, a Zadoff-Chu sequence, or a result of a Kronecker product of a subsequence with a binary sequence.

In some examples of the method, apparatus, and non-transitory computer-readable medium described above, the subsequence corresponds to a PN sequence or a Zadoff-Chu sequence. In some examples of the method, apparatus, and non-transitory computer-readable medium described above, the binary sequence corresponds to a maximum length sequence, a Barker code, or a Gold sequence.

In some examples of the method, apparatus, and non-transitory computer-readable medium described above, identifying a length of the first sequence is based on a length of the second synchronization signal. In some examples of the method, apparatus, and non-transitory computer-readable medium described above, the length of the second synchronization signal is a multiple of the length of the first sequence.

Some examples of the method, apparatus, and non-transitory computer-readable medium described above may further include processes, features, means, or instructions for identifying an association between the length of the first sequence and the length of the second synchronization signal from a look-up table.

A method of wireless communication at a UE is described. The method may include receiving a signal mapped to a first subset of resource elements of a time-frequency resource block and a set of reference signals mapped to a second subset of the resource elements of the time-frequency resource block, where the first subset of resource elements include a subset of resource elements of a first symbol period of the time-frequency resource block, and each resource element of a second symbol period of the time-frequency resource block, identifying a power ratio between each of the first subset of resource elements and the set of reference signals based on a number of antenna ports of the set of reference signals, and demodulating the signal based on the power ratio.

An apparatus for wireless communication at a UE is described. The apparatus may include a processor, memory in electronic communication with the processor, and instructions stored in the memory. The instructions may be executable by the processor to cause the apparatus to receive a signal mapped to a first subset of resource elements of a time-frequency resource block and a set of reference signals mapped to a second subset of the resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and demodulate the signal based on the power ratio.

Another apparatus for wireless communication at a UE is described. The apparatus may include means for receiving a signal mapped to a first subset of resource elements of a time-frequency resource block and a set of reference signals mapped to a second subset of the resource elements of the time-frequency resource block, where the first subset of resource elements include a subset of resource elements of a first symbol period of the time-frequency resource block, and each resource element of a second symbol period of the time-frequency resource block, identifying a power ratio between each of the first subset of resource elements and the set of reference signals based on a number of antenna ports of the set of reference signals, and demodulating the signal based on the power ratio.

A non-transitory computer-readable medium storing code for wireless communication at a UE is described. The code may include instructions executable by a processor to receive a signal mapped to a first subset of resource elements of a time-frequency resource block and a set of reference signals mapped to a second subset of the resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and demodulate the signal based on the power ratio.

In some examples of the method, apparatuses, and non-transitory computer-readable medium described herein, the identifying the power ratio may include operations, features, means, or instructions for evaluating a function of a first power ratio between the set of reference signals and resource elements of a data channel for the first symbol period and a second power ratio between the set of reference signals and resource elements of the data channel for the second symbol period.

In some examples of the method, apparatuses, and non-transitory computer-readable medium described herein, the function may include normalizing the second power ratio by the first power ratio. In some examples of the method, apparatuses, and non-transitory computer-readable medium described herein, the function includes a minimum of the first power ratio and the second power ratio.

In some examples of the method, apparatuses, and non-transitory computer-readable medium described herein, the function includes a maximum of the first power ratio and the second power ratio. In some examples of the method, apparatuses, and non-transitory computer-readable medium described herein, the function includes a sum of a product of the first power ratio with a first scaling factor and a product of the second power ratio with a second scaling factor.

In some examples of the method, apparatuses, and non-transitory computer-readable medium described herein, a first power ratio between the set of reference signals and resource elements of a data channel may be configured for the first symbol period and a second power ratio between the set of reference signals and resource elements of the data channel may be configured for the second symbol period. For a first subset of values of a system information parameter, the power ratio may correspond to the first power ratio, and for a second subset of values of the system information parameter, the power ratio may correspond to the second power ratio.

In some examples of the method, apparatuses, and non-transitory computer-readable medium described herein the power ratio is identified based on a table indexed by the number of antenna ports and a ratio of the first power ratio and the second power ratio. In some examples of the method, apparatuses, and non-transitory computer-readable medium described herein, the identifying the power ratio may be independent of a first power ratio between the set of reference signals and resource elements of a data channel for the first symbol period and a second power ratio between the set of reference signals and resource elements of the data channel for the second symbol period. In some examples of the method, apparatuses, and non-transitory computer-readable medium described herein, the power ratio may be based on a per port power ratio for each of the number of antenna ports.

Some examples of the method, apparatuses, and non-transitory computer-readable medium described herein may further include operations, features, means, or instructions for performing channel estimation or a channel measurement using the signal based on the power ratio. Some examples of the method, apparatuses, and non-transitory computer-readable medium described herein may further include operations, features, means, or instructions for receiving a power boost parameter associated with the signal, the power boost parameter indicating a configurable increase of a transmit power for the signal, and where the identifying the power ratio may be based on the power boost parameter In some examples of the method, apparatuses, and non-transitory computer-readable medium described herein, each of the number of antenna ports may be associated with a single radio frequency (RF) chain at a transmitter of the signal. In some examples of the method, apparatuses, and non-transitory computer-readable medium described herein, the signal includes a resynchronization signal that includes a set of repetitions of a first sequence that may be based on a cell identifier of a cell. In some examples of the method, apparatuses, and non-transitory computer-readable medium described herein, the signal includes a wake-up signal transmitted prior to an associated paging occasion for the UE.

A method of wireless communication at a base station is described. The method may include mapping a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block, identifying a power ratio between each of the first subset of resource elements and the set of reference signals based on a number of antenna ports of the set of reference signals, and transmitting the signal and the set of reference signals based on the power ratio.

An apparatus for wireless communication at a base station is described. The apparatus may include a processor, memory in electronic communication with the processor, and instructions stored in the memory. The instructions may be executable by the processor to cause the apparatus to map a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and transmit the signal and the set of reference signals based on the power ratio.

Another apparatus for wireless communication at a base station is described. The apparatus may include means for mapping a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block, identifying a power ratio between each of the first subset of resource elements and the set of reference signals based on a number of antenna ports of the set of reference signals, and transmitting the signal and the set of reference signals based on the power ratio.

A non-transitory computer-readable medium storing code for wireless communication at a base station is described. The code may include instructions executable by a processor to map a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and transmit the signal and the set of reference signals based on the power ratio.

In some examples of the method, apparatuses, and non-transitory computer-readable medium described herein, the identifying the power ratio may include operations, features, means, or instructions for evaluating a function of a first power ratio between the set of reference signals and resource elements of a data channel for the first symbol period and a second power ratio between the set of reference signals and resource elements of the data channel for the second symbol period. In some examples of the method, apparatuses, and non-transitory computer-readable medium described herein, the function may include normalizing the second power ratio by the first power ratio.

In some examples of the method, apparatuses, and non-transitory computer-readable medium described herein, the function includes a minimum of the first power ratio and the second power ratio. In some examples of the method, apparatuses, and non-transitory computer-readable medium described herein, the function includes a maximum of the first power ratio and the second power ratio. In some examples of the method, apparatuses, and non-transitory computer-readable medium described herein, the function includes a sum of a product of the first power ratio with a first scaling factor and a product of the second power ratio with a second scaling factor.

In some examples of the method, apparatuses, and non-transitory computer-readable medium described herein, a first power ratio between the set of reference signals and resource elements of a data channel may be configured for the first symbol period and a second power ratio between the set of reference signals and resource elements of the data channel may be configured for the second symbol period. For a first subset of values of a system information parameter, the power ratio may correspond to the first power ratio, and for a second subset of values of the system information parameter, the power ratio may correspond to the second power ratio.

In some examples of the method, apparatuses, and non-transitory computer-readable medium described herein the power ratio is identified based on a table indexed by the number of antenna ports and a ratio of the first power ratio and the second power ratio. In some examples of the method, apparatuses, and non-transitory computer-readable medium described herein, the identifying the power ratio may be independent of a first power ratio between the set of reference signals and resource elements of a data channel for the first symbol period and a second power ratio between the set of reference signals and resource elements of the data channel for the second symbol period. In some examples of the method, apparatuses, and non-transitory computer-readable medium described herein, the power ratio may be based on a per port power ratio for each of the number of antenna ports.

Some examples of the method, apparatuses, and non-transitory computer-readable medium described herein may further include operations, features, means, or instructions for configuring a power boost parameter associated with the signal, the power boost parameter indicating a configurable increase of a transmit power for the signal, and where the identifying the power ratio may be based on the power boost parameter.

In some examples of the method, apparatuses, and non-transitory computer-readable medium described herein, the power boost parameter may be based on a number of blanked time-frequency resource blocks. In some examples of the method, apparatuses, and non-transitory computer-readable medium described herein, a first reference signal of the set of reference signals may be mapped to a first resource element of the time-frequency resource block and a second reference signal of the set of reference signals may be mapped to a second resource element of the time-frequency resource block, and the transmitting includes transmitting, via a first antenna port, the first reference signal via the first resource element and a null symbol via the second resource element and transmitting, via a second antenna port, the second reference signal via the second resource element and a null symbol via the first resource element.

In some examples of the method, apparatuses, and non-transitory computer-readable medium described herein, each of the number of antenna ports may be associated with a single radio frequency (RF) chain at the base station. In some examples of the method, apparatuses, and non-transitory computer-readable medium described herein, the signal includes a resynchronization signal that includes a set of repetitions of a first sequence that may be based on a cell identifier of a cell. In some examples of the method, apparatuses, and non-transitory computer-readable medium described herein, the signal includes a wake-up signal transmitted prior to a paging occasion.

DETAILED DESCRIPTION

Figure 1:
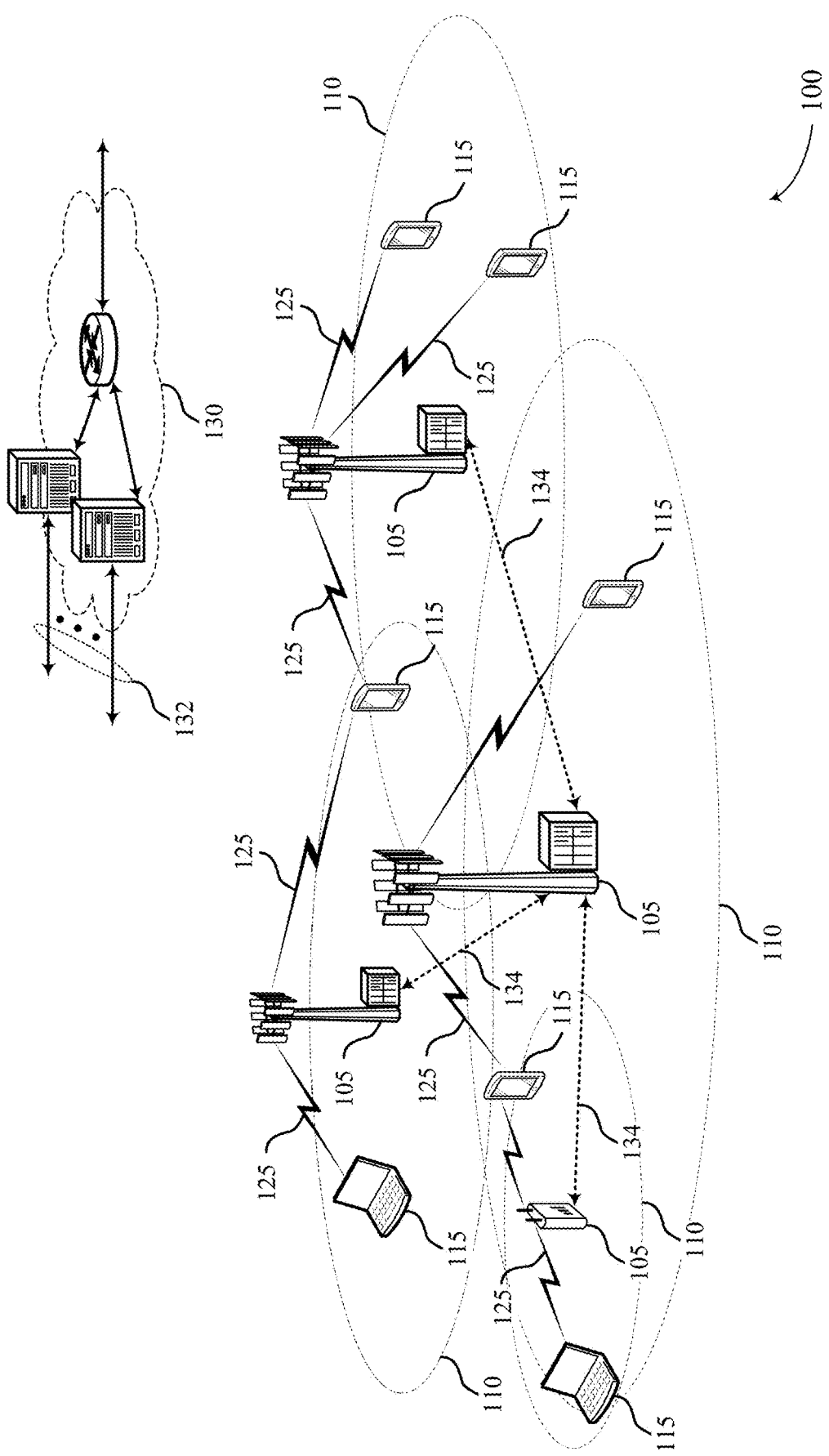
FIG. 1 illustrates an example of a system for wireless communication that supports resynchronization signal design in accordance with aspects of the present disclosure.

Fifth generation (5G) or New Radio (NR) systems are designed to support user equipments (UEs) having low signal-to-noise ratio (SNR). In some aspects, synchronization signals for a cell include a primary synchronization signal (PSS) and a secondary synchronization signal (SSS). However, for cell detection or timing synchronization at low SNRs, a UE may combine energy across multiple PSS/SSS cycles before achieving synchronization. For accurately detecting timing synchronization from PSS/SSS (such as for accurately combining energy), UEs remain on for a long period of time. This results in power inefficiency as well as increased latency for communications. Aspects of the present disclosure provide methods, systems, and devices for increasing energy density and improving timing detection properties for transmission of a synchronization signal.

In some cases, the UE may receive a first synchronization signal (e.g., PSS/SSS) for synchronizing with a cell. In some examples, the first synchronization signal may be transmitted according to a first periodicity by a base station serving the cell. The first synchronization signal may be used by the UE for timing synchronization and detection of the cell identifier for the cell. After receiving the first synchronization signal, the UE may camp on the cell in an idle mode (e.g., with or without entering a connected mode first) or a sleep mode (e.g., power-save state) for some period of time. The UE may maintain coarse timing synchronization with the cell via a local clock, but may not maintain symbol-level timing synchronization. According to some aspects, the UE may receive a second synchronization signal for resynchronizing with the cell. In some cases, the second synchronization signal may be referred to as a resynchronization signal (RSS). For example, the UE may be configured to use the RSS to re-acquire synchronization once the UE has been in sleep mode. According to some aspects, the RSS may be transmitted by the base station according to a second periodicity (e.g., according to a separately configured periodicity that may be different from the first periodicity). For example, the second periodicity may be lower than the first periodicity. Although the RSS may be transmitted at a lower periodicity than the PSS/SSS, the increased density (e.g., more contiguous or quasi-contiguous symbols) may enable a UE to resynchronize over fewer cycles (e.g., in some cases resynchronization may be achieved from one instance of the RSS). Thus, once a UE has been in synchronization with a base station or has timing information related to the periodicity of the RSS, the present techniques enable the UE to regain timing synchronization with reduced latency and power expenditure.

In some examples, the UE may be aware of a sequence used in the resynchronization signal. More specifically, the UE may have a copy of the sequence locally stored or may determine the sequence based on cell parameters (e.g., cell ID, etc.). In some embodiments, the UE may receive an indication of the presence or parameters for the RSS in a system information block (SIB). Upon receiving the RSS including one or more sequences, the UE may be configured to correlate the RSS with the stored local copy of the sequence.

Based on the correlation output, the UE may be configured to detect the timing (e.g., symbol timing) for the cell.

In some examples, processing complexity of a synchronization signal may be based on a length of the synchronization signal. Although synchronization signals including longer sequences may have better performance, longer sequences involve higher processing complexity. For example, a synchronization signal including a longer, random sequence may result in better performance while correlating the synchronization signal with the stored local copy. Better correlation performance may result in more accurate timing adjustments (such as, symbol timing adjustment for the cell) However, the process of correlating the sequence at the UE is computationally complex. A structured (e.g., non-random) sequence may reduce computational complexity, but may not have good signal autocorrelation properties. In such cases, the correlation of a structured sequence may lead to poor performance at a receiver (such as the UE) due to the amplitude of secondary peaks (e.g., sidelobes) in correlation. Thus, the present disclosure provides synchronization signal designs to achieve high correlation performance while having reduced computational complexity at the receiver.

Various synchronization signal designs for resynchronization are disclosed. In some examples, an RSS may include multiple repetitions of a sequence S. In some examples, the sequence S may be a pseudo-noise (PN) sequence repeated in the time domain. More specifically, a sequence S may be repeated in a synchronization signal a predetermined number of times, and the concatenated signal may be referred to as a first RSS. In some cases, the sequence S may be based on a cell identifier of a cell. In some cases, resynchronization for the cell may be supported via a second RSS transmitted subsequent to the first RSS. In some examples, the second RSS may have a sequence length longer than a sequence length of the sequence S and shorter than a sequence length of the first RSS (e.g., the concatenation of the multiple sequences S). In some examples, the second RSS may also be based on an identifier of a cell served by the base station transmitting the first RSS and the second RSS. Upon receiving the first RSS, the receiver (such as the UE) may be configured to detect the received signal by correlating the received RSS with the sequence S. In some cases, the receiver may be configured to compute a correlation with the sequence S, and once the correlation is computed, the receiver may shift and add the correlations of the subsequent repetitions of the sequence. In some cases, a length of the sequence S may be related to a length of the first RSS. For example, the length of the sequence S may be a fixed fraction of the length of the first RSS. Alternatively, the length of the sequence S may be a configurable fraction of the length of the first RSS. In some cases, a relation between the length of the sequence S and the length of the first RSS may be defined as a look-up table.

In some cases, reducing or spreading secondary peaks in signal autocorrelation may improve performance. A second RSS design may include multiple repetitions of a first sequence S and a second sequence S. In some examples, the second sequence S* may be a complex conjugate of the first sequence S. In some cases, the second sequence S* and the first sequence S may be uncorrelated. In some examples, the first sequence S may be a PN sequence. The first RSS may include alternating repetitions of the first sequence S and the second sequence S*. In some cases, the sequence S may be based on a cell identifier of a cell served by the base station transmitting the first RSS. In some cases, resynchronization for the cell may be supported via a second RSS transmitted subsequent to the first RSS. In some examples, the second RSS may have a sequence length longer than a sequence length of the first sequence S and the second sequence S*. In some cases, a sequence length of the second RSS may be shorter than a sequence length of the first RSS (the multiple repetitions of the first sequence S and the second sequence S*).

Upon receiving the first RSS, the receiver (such as the UE) may be configured to detect the received signal by correlating the received RSS with the first sequence S and the second sequence S*. In some cases, the receiver may be configured to compute a correlation of a received signal with the first sequence S and the second sequence S*. In some examples, the signal autocorrelation for the first RSS may include multiple peaks. For example, the autocorrelation may include a primary peak and multiple secondary peaks. However, when compared to the first RSS design, the second RSS design eliminates alternate peaks in the autocorrelation. The second RSS may be used by the receiver to disambiguate between the peaks. Upon receiving the second RSS, the receiver (such as the UE) may be configured to perform synchronization by further correlating the second RSS.

In a third RSS design, the RSS may include multiple repetitions of a first sequence S1 and a second sequence S2 arranged according to the 0s and 1s in a binary sequence. In some cases, the length of the first sequence S1 or the length of the second sequence S2 may be a predetermined length. In some cases, the first sequence S1 or the second sequence S2 may be one (1) subframe (e.g., 1 ms) in length. In some examples, the RSS may be a predetermined length or the length may be selected from a predetermined set of RSS lengths. For example, the RSS may have a total length of one of 4 ms, 8 ms, 16 ms, 32 ms, or 40 ms (e.g., a binary sequence of length 4, 8, 16, 32, or 40, with the 0s and 1s in the binary sequence corresponding to repetitions of the first sequence S1 and a second sequence S2, respectively). Several different sequence types may be used for the binary sequence. For example, the binary sequence may be an m-sequence, a Barker code, a Gold sequence, a computer-generated sequence with minimum sidelobe amplitude in the autocorrelation function, or a combination thereof. In some cases, the sequence type may be based on a length of the first sequence S1 or a length of the RSS. As an example, a Gold sequence or an m-sequence may be used as a binary sequence if the length of the RSS is greater than a threshold. Additionally or alternatively, a computer-generated sequence with minimum sidelobe amplitude in a autocorrelation function may be used as a binary sequence if the length of the RSS is less than a threshold. More specifically, the computer-generated sequence with minimum sidelobe amplitude may include a computer-generated sequence having the smallest "maximum side-lobe amplitude" in a sequence autocorrelation function (e.g., hamming correlation). In some examples, dynamic programming or stochastic search techniques may be used to determine sequences of a given length (e.g., for sequences having a length greater than is feasible for a brute-force search). For example, techniques such as simulated annealing, Monte Carlo search, or evolutionary search may be used. The stochastic search may use random or semi-random rules to choose search branches. In some cases, branch and bound techniques for pruning the search tree may be used, including minimax pruning, naïve minimax pruning, or alpha-beta pruning. In one example, a length four (4) binary sequence may be given by {1, 0, 1, 1}, a length eight (8) binary sequence may be given by {1, 0, 0, 1, 0, 1, 1, 1}, a length 16 binary sequence may be given by {0, 0, 1, 1, 0, 1, 0, 0, 0, 1, 1, 0, 0, 1, 0, 1}, a length 32 binary sequence may be given by {1, 1, 0, 0, 1, 0, 0, 1, 0, 1, 1, 1, 0, 0, 0, 1, 1, 1, 0, 1, 0, 1, 0, 0, 0, 1, 0, 1, 0, 0, 1, 1, 0, 1}, and a length 40 binary sequence may be given by {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 1, 0, 1, 0, 1, 1, 0}. In some cases, this binary sequence may also carry information about the Cell ID. In some examples, the second sequence S2 may be a complex conjugate of the first sequence S1 (e.g., S and S* as described above). In some cases, the second sequence S2 and the first sequence S1 may be two different uncorrelated sequences. As previously described with reference to the first RSS design and the second RSS design, the sequences S1 and S2 may be PN sequences. In some cases, S1 and S2 may be Zadoff-Chu sequences, computer-generated sequences, or be constructed by repeating a smaller sequence using a binary cover code. In some cases, the first sequence S1 and the second sequence S2 may be based on a cell identifier. Upon receiving the RSS, the receiver may be configured to detect the received signal by correlating the received RSS with the first sequence S1 and the second sequence S2. In some cases, the third RSS design may eliminate the need for a second RSS (e.g., a second RSS having a longer sequence length). In some cases, the third RSS design may lead up to 2× faster re-acquisition time for a receiver without increasing the computational complexity. The faster re-acquisition time therefore results in power savings and latency benefit.

According to some aspects of the present disclosure, a base station may map a signal (e.g., RSS, WUS) to a first subset of resource elements of a time-frequency resource block and a set of reference signals (e.g., cell-specific reference signal (CRS)) to a second subset of the resource elements of the time-frequency resource block. In some cases, a first power ratio ($\rho_A$) may be configured as a power ratio between the set of reference signals and resource elements of a data channel for symbol periods that do not include CRS, and a second power ratio ($\rho_B$) may be configured as a power ratio between the set of reference signals and resource elements of the data channel for symbol periods that do include CRS. In some cases, a UE may determine a function of a power ratio between each of the first subset of resource elements and the set of reference signals based on a number of antenna ports of the set of reference signals. For example, the function may include normalizing a second power ratio by a first power ratio. Alternatively, the function may include a minimum of the first power ratio and the second power ratio or a maximum of the first power ratio and the second power ratio. In some examples, the function may include a sum of a product of the first power ratio with a first scaling factor and a product of the second power ratio with a second scaling factor.

Aspects of the disclosure are initially described in the context of a wireless communications system. More specifically, aspects of the disclosure are directed to methods supporting resynchronization signal design. Aspects of the disclosure further illustrated by and described with reference to apparatus diagrams, system diagrams, and flowcharts that relate to resynchronization signal design.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 serving a cell may transmit a first synchronization signal for the cell according to a first periodicity. The base station 105 may transmit a second synchronization signal for the cell according to a second periodicity that is different from the first periodicity. In some cases, the second synchronization signal may include a plurality of repetitions of a first sequence that is based on a cell identifier of the cell. In some cases, the second synchronization signal may be referred to as an RSS. In some examples, the base station 105 may communicate with at least one UE 115 over the cell based on the transmission of the first synchronization signal or the second synchronization signal.

According to one or more aspects of the present disclosure, a UE 115 may receive a first synchronization signal for synchronizing with a cell. In some cases, the first synchronization signal transmitted according to a first periodicity by a base station 105 serving the cell. In some examples, the UE 115 may receive, subsequent to the synchronizing, a second synchronization signal for resynchronizing with the cell. In some cases, the second synchronization signal transmitted by the base station 105 according to a second periodicity that is different from the first periodicity. Further, in some cases, the second synchronization signal may include a plurality of repetitions of a first sequence that is based on a cell identifier of the cell. The UE 115 may then communicate over the cell with the base station 105 based on the resynchronizing.

Figure 2:
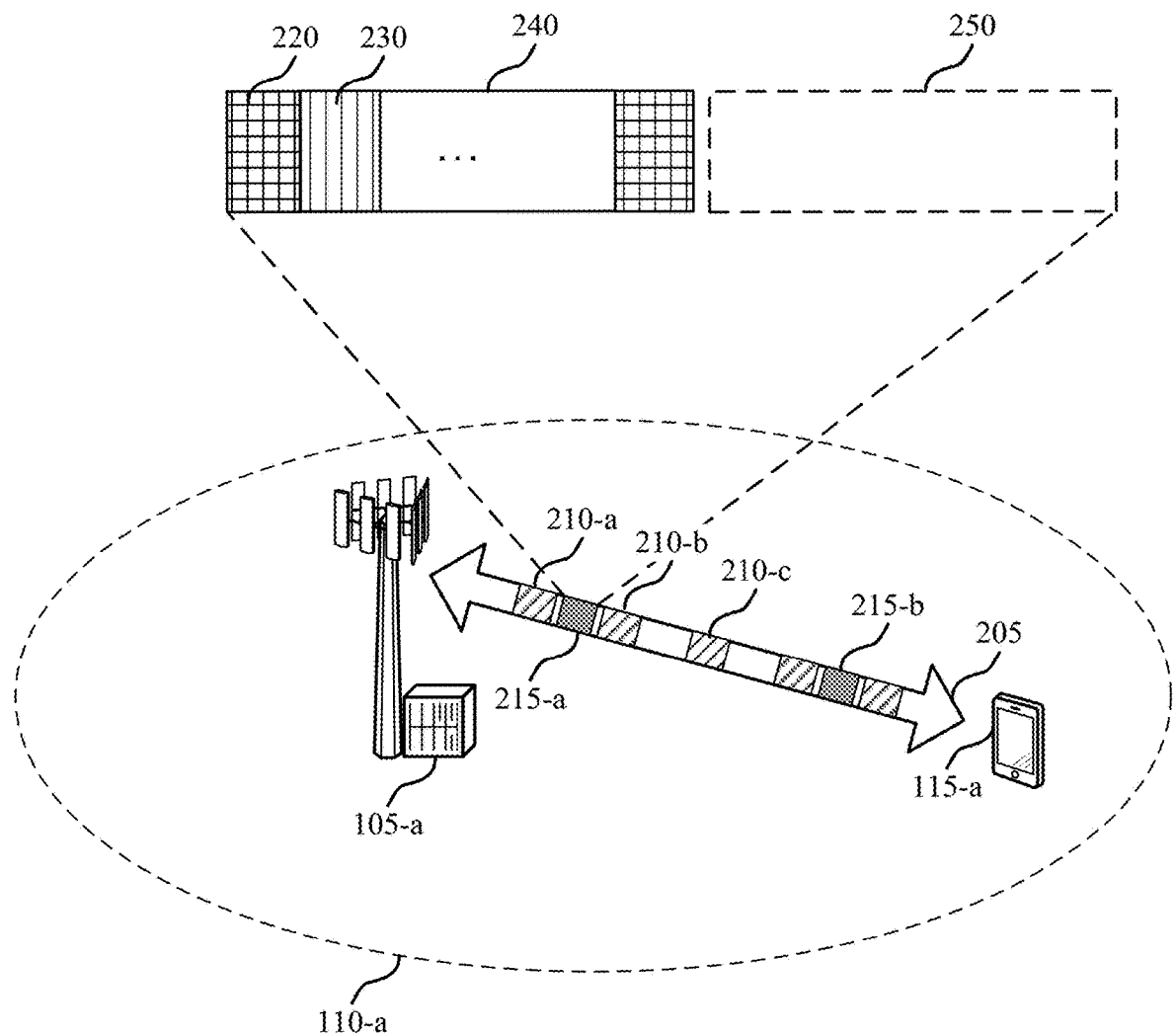
FIG. 2 illustrates an example of a wireless communications system that supports resynchronization signal design in accordance with aspects of the present disclosure.

FIG. 2 illustrates an example of a wireless communications system 200 that supports resynchronization signal design in accordance with various aspects of the present disclosure. In some examples, the wireless communications system 200 may implement aspects of wireless communications system 100. In some examples, the wireless communications system 200 may include a base station 105-a and UE 115-a, which may be examples of the corresponding devices as described with reference to FIG. 1. UE 115-a may communicate with the base station 105-a within a coverage area 110-a.

In some examples, the base station 105-a may utilize synchronization signals to perform cell acquisition procedures with UE 115-a. For example, the UE 115-a may utilize PSS and SSS for synchronizing with a cell. In one example, synchronization signals may be transmitted over a carrier 205 for a cell. The synchronization signals may be conveyed using synchronization sequences. In some cases, the UE 115-a may receive a synchronization signal (e.g., PSS/SSS) for synchronizing with a cell served by the base station 105-a. In some examples, the UE 115-a may receive the synchronization signal 210 transmitted according to a first periodicity by the base station 105-a. In the example of FIG. 2, the UE 115-a may subsequently receive a first instance of the synchronization signal 210-a, a second instance of the synchronization signal 210-b, and a third instance of the synchronization signal 210-c, according to the first periodicity. In some cases, the synchronization signal 210 may be used by the UE 115-a for timing synchronization and detection of a cell identifier. For example, the UE 115-a may utilize the synchronization signal 210 to determine an identifier associated with the cell served by the base station 105-a.

In some cases, the UE 115-a may be configured to receive system information associated with the cell (not shown). For example, after receiving the synchronization signal, the system information may be received in form of a system information block (SIB). The SIB may signal a presence of an RSS on the carrier 205. In some cases, the SIB may signal an indication of a second periodicity of the RSS, a length of the RSS, a frequency offset and/or a frequency location for the RSS. In some cases, the frequency offset may be based on a cell ID, as well as a frequency domain configuration of the RSS. The frequency offset based on frequency domain configuration of the RSS may reduce inter-cell collision. Additionally or alternatively, the SIB may indicate a transmit power for the RSS, a bandwidth of the RSS, a hopping pattern for the RSS, a multiplicative factor for the second periodicity, or an overhead percentage. In some cases, the SIB may indicate a starting physical resource block (PRB) for the RSS. In some examples, the UE 115-a may be configured to determine an implicit or explicit relationship between a periodicity of the RSS and a length of the RSS. For example, the length of the RSS may be explicitly signaled and the periodicity of the RSS may be determined based on an implicit relationship to the length of the RSS. Alternatively, the periodicity of the RSS may be explicitly signaled and the length of the RSS may be determined based on an implicit relationship to the periodicity of the RSS. The implicit relationship may be based on another parameter (e.g., an overhead percentage, multiplicative factor, etc.). In some cases, after an initial synchronization, the UE 115-a may transition out of a connected mode. In some cases, after the initial synchronization, the UE 115-a may lose synchronization by transitioning into a sleep mode.

According to some examples, the UE 115-a may receive a second synchronization signal 215 for resynchronizing with the cell. The second synchronization signal 215 may also be referred to as an RSS 215. In the example of FIG. 2, the UE 115-a may subsequently receive a first instance of an RSS 215-a and a second instance of an RSS 215-b, according to a second periodicity. According to some aspects, the UE 115-a may use the RSS 215 to re-acquire synchronization. According to some aspects, the second periodicity of the RSS 215 may be different from the first periodicity of the synchronization signal 210. As shown in the example of FIG. 2, the second periodicity may be lower than the first periodicity. In some cases, the RSS 215 may be transmitted with an increased density using more contiguous or quasi-contiguous symbols. This enables the UE 115-a to resynchronize over fewer cycles (e.g., in some cases resynchronization may be achieved from one instance of the RSS 215).

In some examples, the UE 115-a may be aware of a sequence used in the resynchronization signal. As previously described, the UE 115-a may receive a SIB indicating at least one of a presence of the RSS 215, timing information (e.g., the second periodicity, offset from the synchronization signal 210), a length of the RSS 215, a frequency offset and/or a frequency location for the RSS 215, a transmit power for the RSS 215, a bandwidth of the RSS 215, a hopping pattern for the RSS 215, a multiplicative factor for the second periodicity, or an overhead percentage. In some cases, the frequency offset for the RSS 215 may be based on a cell ID, as well as a frequency domain configuration of the RSS 215 to reduce inter-cell collision. The frequency offset may indicate, for example, a starting PRB for the RSS 215. Upon receiving information associated with the RSS 215, the UE may store a copy of a sequence used in the RSS 215. Additionally or alternatively, the UE 115-a may determine the sequence based on cell parameters (e.g., cell ID, etc.) determined from the PSS/SSS indicated in the SIB.

In some examples, the RSS 215 may include a first RSS 240 and a second RSS 250. The first RSS 240 may include a first repetition 220 and a second repetition 230 of a sequence S. In some examples, the RSS may be a PN sequence repeated in the time domain. According to one or more aspects, a sequence S may be repeated in a signal a predetermined number of times, and the concatenated signal may be referred to as a first RSS 240. In some cases, a length of the sequence S may be related to a length of the first RSS 240. For example, the length of the sequence S may be a fixed fraction of the length of the first RSS 240. Alternatively, the length of the sequence S may be a configurable fraction of the length of the first RSS 240. In some cases, a relation between the length of the sequence S and the length of the first RSS 240 may be defined within a look-up table available to both the base station 105-a and the UE 115-a. For example, the look-up table may include values of the length of the sequence S for various lengths of the first RSS 240. In some examples, the sequence S may be based on a cell identifier of a cell served by the base station 105-a. In some cases, resynchronization for the cell may be optionally supported via a second RSS 250 transmitted subsequent to the first RSS 240. In some examples, the second RSS 250 may have a sequence length longer than a sequence length of the sequence S and shorter than a sequence length of the first RSS 240 (e.g., the multiple repetition of the sequences S). In some examples, the second RSS 250 may also be based on an identifier of a cell served by the base station 105-a transmitting the first RSS 240 and the second RSS 250.

In another example of a second design for the RSS 215, the RSS 215 may include a first RSS 240 and a second RSS 250. The first RSS 240 may include a first repetition 220 of a first sequence S and a first repetition 230 of a second sequence S*. The first RSS 240 may include additional repetitions of the first sequence S and the second sequence S*. In some examples, the second sequence S* may be a complex conjugate of the first sequence S. In some cases, the second sequence S* and the first sequence S may be uncorrelated. In some examples, the first RSS 240 may include alternating repetitions of the first sequence S and the second sequence S*. In some cases, the first sequence S may be a PN sequence. According to one or more aspects, the first sequence S and the second sequence S* may be alternatively repeated in a signal a predetermined number of times, and the concatenated signal may be referred to as the first RSS 240. In some cases, the sequence S may be based on a cell identifier of a cell served by the base station 105-a. In some cases, resynchronization for the cell may be supported via a second RSS 250 transmitted subsequent to the first RSS 240. As previously discussed, the second RSS 250 may have a sequence length longer than a sequence length of the first sequence S and the second sequence S*. In some cases, a sequence length of the second RSS 250 may be shorter than a sequence length of the first RSS (i.e., the multiple repetitions of the first sequence S and the second sequence S*).

In a third example of a design for the RSS 215, the RSS 215 may include the first RSS 240. The first RSS 240 may include a first repetition 220 of a first sequence S1 and a second repetition 230 of a second sequence S2 arranged according to the 0s and 1s in a binary sequence. Several different sequence types may be used for the binary sequence. For example, the binary sequence may be an m-sequence, a Barker code, a Gold sequence, a computer-generated sequence with minimum sidelobe amplitude in the autocorrelation function, or a combination thereof. In some cases, the sequence type of the binary sequence may be based on a length of the first sequence S1 or a length of the first RSS 240. As an example, a Gold sequence or an m-sequence may be used as a binary sequence if the length of the first RSS 240 is greater than a threshold. Additionally or alternatively, a computer-generated sequence with minimum sidelobe amplitude in a autocorrelation function may be used as a binary sequence, if the length of the first RSS 240 is less than a threshold. In some cases, the binary sequence may also carry information about the Cell ID. In some cases, the binary sequence depends on the length of the first RSS (e.g., the binary sequence is selected based on an explicit length of the RSS signaled in the SIB).

In some examples, the second sequence S2 may be a complex conjugate of the first sequence S1 (e.g., S and S* as described with reference to the second design). In some cases, the second sequence S2 and the first sequence S1 may be two different uncorrelated sequences. As previously described with reference to the first RSS design and the second RSS design, the first sequence S1 and the second sequence S2 may be PN sequences. In some cases, the first sequence S1 and the second sequence S2 may be Zadoff-Chu sequences, computer-generated sequences, or be constructed by repeating a smaller sequence using a binary cover code. In some examples, the first sequence S1 and the second sequence S2 may be based on a cell identifier of a cell served by the base station 105-a. In some examples, a second RSS 250 may not be transmitted subsequent to the first RSS 240.

In some cases, at least one of a plurality of scheduled subframes for the RSS 215 may coincide with a restricted subframe. For example, at least one of the plurality of scheduled subframes for the RSS 215 may coincide with a subframe that is either restricted for transmission of the RSS 215 or an invalid subframe. In some cases, there may be an existing pattern for valid and invalid subframes. For example, one or more subframes may be blocked by the network for transmission of higher priority information. In some examples, the restricted subframe may include one of a multicast subframe, a machine-type communication (MTC) invalid subframe, a time division duplex (TDD) uplink subframe, or a TDD special subframe. In such cases, the base station 105-a and UE 115-a may modify the plurality of scheduled subframes for the RSS 215. As one example, the base station 105-a may be configured to postpone the plurality of scheduled subframes to an upcoming valid downlink subframe.

In some cases, upon determining an upcoming collision, the UE 115-a may consider the a scheduled subframe for the RSS as invalid, and may postpone reception of the scheduled subframe to a next valid subframe or drop receiving of the RSS for the subframe. In some examples, base station 105-a may be configured to puncture portions of subframes for the RSS 215. For example, the base station 105-a may puncture an RSS 215 to transmit only in a downlink portion of a TDD special subframe or other subframe having a restricted portion and valid portion. As a result, the UE 115-a may identify that the RSS 215 has been adapted to only be in the downlink portion of the subframe. In some examples, the UE 115-a may receive an indication of special subframe configurations in the SIB. In some cases, the base station may transmit (e.g., in the SIB) an indication of how the RSS will be adapted in special subframes, and the adaptation can vary based on the length of the downlink portion of the special subframe. For example, UE 115-a may be configured to postpone or drop an RSS 215 for short downlink subframes (e.g., having a downlink portion less than or equal to a threshold, etc.). Further, in some cases, for longer downlink subframes (e.g., having a downlink portion greater than or equal to a threshold, etc.), the RSS 215 may be punctured.

According to some aspects, the RSS 215 may be punctured by at least one of a reference signal, the first synchronization signal, or a broadcast channel. For example, the RSS 215 may be punctured by a CRS, PSS, SSS, or a physical broadcast channel (PBCH). In some cases, if RSS 215 collides with a subframe for the PSS, SSS or PBCH, then the RSS 215 is dropped for the entire subframe. In some cases, to prevent such punctures, a location in frequency of the RSS 215 may be configurable in a SIB. In some cases, one cell may be configured to indicate the RSS configuration of its neighboring cells. For example, the RSS configuration may include a length of an RSS associated with a neighboring cell, a periodicity of the RSS associated with the neighboring cell, a timing offset of the RSS associated with the neighboring cell, a transmit power of the RSS associated with the neighboring cell, a transmit bandwidth of the RSS associated with the neighboring cell, a frequency position of the RSS associated with the neighboring cell and an indication of presence of the RSS associated with the neighboring cell. In some cases, the RSS configuration for neighboring cells may also be indicated via radio resource control (RRC) signaling.

In some cases, upon receiving the RSS 215, including one or more sequences, the UE 115-*a* may be configured to correlate the RSS 215 with the stored local copy of the sequence. Based on the correlation output, the UE may be configured to detect the timing (e.g., symbol timing) for the cell.

Figure 3:
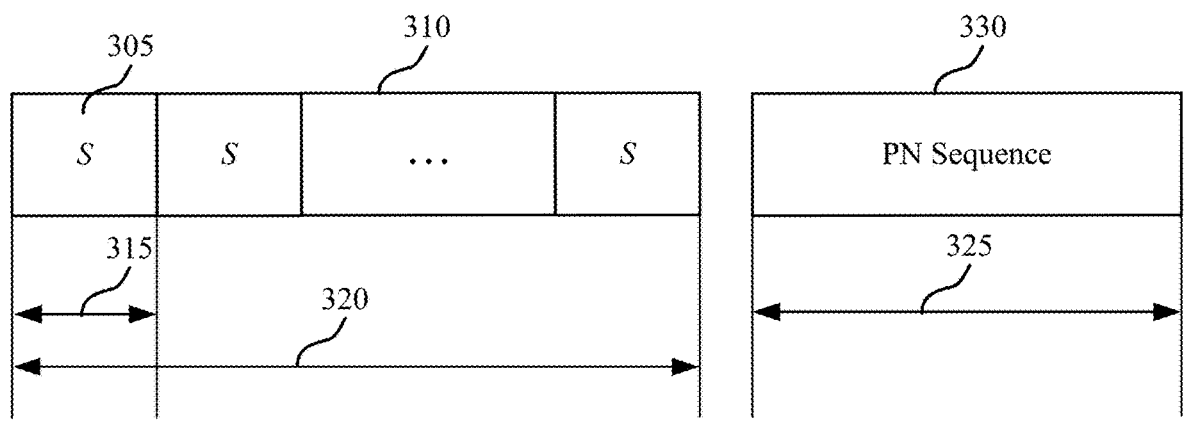
FIG. 3 illustrates an example of a signal design that supports resynchronization signal design in accordance with aspects of the present disclosure.

FIG. 3 illustrates an example of a signal design 300 that supports resynchronization signal design in accordance with various aspects of the present disclosure. In some examples, the signal design 300 may be implemented by aspects of wireless communications system 100.

In some examples, a base station (such as base station 105 in FIG. 1 and base station 105-*a* in FIG. 2) may broadcast synchronization signals for a cell to support connection on the cell for UEs. For example, the base station may transmit a first synchronization signal to a UE according to a first periodicity. A UE may receive the first synchronization signal for synchronizing with the cell. In some cases, the UE may transition out of a connected mode, or transition into a sleep mode, or lose synchronization with the cell. In such cases, the UE may receive a second synchronization signal for resynchronizing with the cell. More specifically, the second synchronization signal may be referred to as an RSS. In some cases, the second synchronization signal may be based on a cell identifier of the cell. In the example of FIG. 3, the second synchronization signal may include a first RSS 310 and a second RSS 330. The first RSS 310 may include a plurality of repetitions of a sequence S 305. In some cases, the sequence S may be of a predetermined length 315. In some cases, a length 315 of the sequence S may be configured based on the first RSS 310. In such cases, the length 315 of the sequence S may be related to a sequence length 320 of the first RSS 310. For example, the length 315 of the sequence S may be a fixed fraction of the length of the sequence length 320 of the first RSS 310. Alternatively, the length 315 of the sequence S may be a configurable fraction of the sequence length 320 of the first RSS 310. In some cases, a relation between the length 315 of the sequence S and the length 320 of the first RSS 310 may be determined based on values in a look-up table. For example, the length 315 may be specified in a look-up table according to values or ranges of the length 320 of the first RSS 310.

According to one or more aspects, the sequence S may be repeated in a signal a predetermined number of times, and the concatenated signal may be referred to as a first RSS 310. In some cases, a length of the first RSS 310 may be based on a length 315 of the sequence S and a number of times that the sequence has been repeated. In some examples, each sequence S is transmitted in one symbol period, and thus the number of symbol periods spanned by the first RSS 310 corresponds to a number of repetitions of the sequence S.

In some cases, resynchronization for the cell may be supported via a second RSS 330 transmitted subsequent to the first RSS 310. As described with reference to FIG. 3, the second RSS 330 may also be a PN sequence. In some examples, the second RSS 330 may also be based on a cell identifier of the cell served by the base station transmitting the first RSS 310 and the second RSS 330. In some examples, the second RSS 330 may have a sequence length 325 longer than a sequence length 315 of the sequence S and shorter than a sequence length 320 of the first RSS 310. Upon receiving the first RSS 310, the UE may be configured to detect the received signal by correlating then first RSS with a stored local copy of the sequence S. In some cases, once the correlation is computed, the UE may shift and add the correlations of the subsequent sequences.

Figure 4:
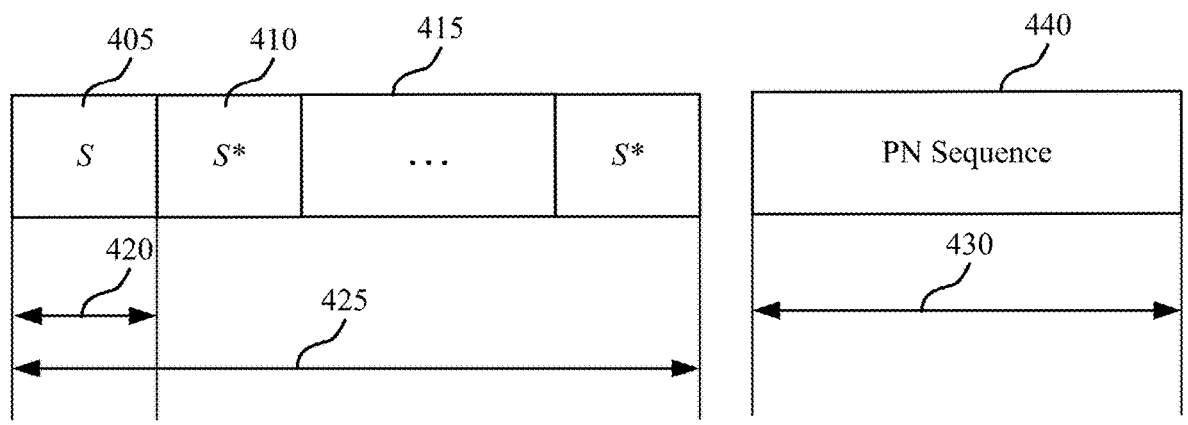
FIG. 4 illustrates an example of a signal design that supports resynchronization signal design in accordance with aspects of the present disclosure.

FIG. 4 illustrates an example of a signal design 400 that supports resynchronization signal design in accordance with various aspects of the present disclosure. In some examples, the signal design 400 may be implemented by aspects of wireless communications system 100.

As previously discussed with reference to FIG. 3, a base station (such as base station 105 in FIG. 1 and base station 105-*a* in FIG. 2) may broadcast synchronization signals for a cell to support connections on the cell by UEs. The base station may transmit a first synchronization signal according to a first periodicity. In some examples, a UE may receive the first synchronization signal for synchronizing with a cell. In some cases, when the UE loses synchronization with the cell, the UE may be configured to receive a second synchronization signal for resynchronizing with the cell. More specifically, the second synchronization signal may be referred to as an RSS. In some cases, the second synchronization signal may be based on a cell identifier of the cell. In the example of FIG. 4, the second synchronization signal may include a first RSS 415 and a second RSS 440. The first RSS 415 may include a plurality of repetitions of a first sequence S 405 and a second sequence S* 410. In some cases, the sequence S may be of a predetermined length 420. In some cases, the length 420 of the sequence S may be related to a sequence length 425 of the first RSS 415. In one example, the sequence length 425 of the first RSS 415 may be a multiple of the length 420 of the sequence S. In some cases, a relation between the length 420 of the sequence S and the sequence length 425 of the first RSS 415 may be determined using a look-up table. In some examples, the second sequence S* 410 may be a complex conjugate of the first sequence S 405. In some cases, the second sequence S* 410 and the first sequence S 405 may be uncorrelated. In some examples, the first RSS 415 may include alternative repetitions of the first sequence S 405 and the second sequence S* 410.

As previously discussed, the first sequence S 405 and the second sequence S* 410 may be PN sequences. According to the example of FIG. 4, the first sequence S 405 and the second sequence S* 410 may be alternatively repeated a predetermined number of times, and the concatenated signal may be referred to as the first RSS 415. In some cases, the first sequence S 405 and the second sequence S* 410 may both be based on a cell identifier of a cell served by the base station. In some examples, each sequence S 405 or sequence S* 410 is transmitted in one symbol period, and thus the number of symbol periods spanned by the first RSS 415 corresponds to a number of repetitions of the sequence S 405 or sequence S* 410.

In some cases, resynchronization for the cell may be supported via a second RSS 440 transmitted subsequent to the first RSS 415. In some examples, the second RSS 440 may have a sequence length 430 longer than a sequence length 420 of the first sequence S and the second sequence S*. In some cases, a sequence length 430 of the second RSS 440 may be shorter than a sequence length 425 of the first RSS 415. Upon receiving the first RSS, the receiver (such as the UE) may be configured to detect the received signal by correlating the received RSS with the first sequence S 405 and the second sequence S* 410. In some cases, the receiver may be configured to compute a correlation of a received RSS with the first sequence S 405 and the second sequence S* 410.

Figure 5:
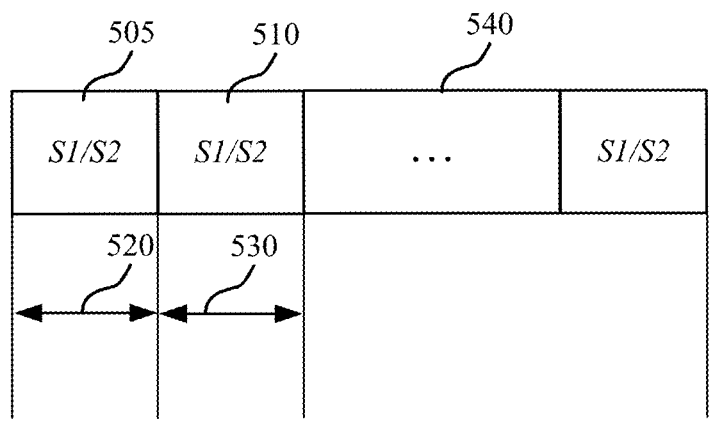
FIGS. 5 through 8B illustrate examples of signal designs that support resynchronization signal design in accordance with aspects of the present disclosure.

FIG. 5 illustrates an example of a signal design 500 that supports resynchronization signal design in accordance with various aspects of the present disclosure. In some examples, signal design 500 may be implemented by aspects of wireless communications system 100.

As previously discussed with reference to FIGS. 3 and 4, a base station (such as base station 105 in FIG. 1 and base station 105-a in FIG. 2) may broadcast synchronization signals for a cell to support connections over the cell by UEs. The base station may transmit a first synchronization signal according to a first periodicity (such as at the first periodicity). In some cases, when the UE loses synchronization with the cell, the UE may be configured to receive a second synchronization signal (e.g., RSS) for resynchronizing with the cell. In some cases, the second synchronization signal may be based on a cell identifier of the cell. FIG. 5 illustrates the signal design of the second synchronization signal (e.g., RSS) for resynchronizing with the cell.

In the example of FIG. 5, the second synchronization signal (e.g., RSS 540) may include a first repetition 505 of either a first sequence S1 or a second sequence S2 and a second repetition 510 of either a first sequence S1 or a second sequence S2 arranged according to the 0s and 1s in a binary sequence. In some examples, the first sequence S1 may be arranged according to the 0s of the binary sequence. In some cases, the second sequence S2 may be arranged according to the 1s of the binary sequence. In some cases, the first sequence S1 may be of a first length 520 and the second sequence S2 may be of a second length 530. In an example where the binary sequence begins with a 0 followed by a 1, the first sequence S1 of the first length 520 may be transmitted first, and the second sequence S2 of the second length 530 may be transmitted after the first sequence S1. Several different sequence types may be used for the binary sequence. In some examples, the binary sequence may an m-sequence, a Barker code, a Gold sequence, a computer-generated sequence with minimum sidelobe amplitude in the autocorrelation function, or a combination thereof. In some cases, the sequence type may be based on a length of the first sequence S1 or a length of the RSS 540. As an example, a Gold sequence or an m-sequence may be used as a binary sequence if the length of the RSS 540 is greater than a threshold. In one example, a Gold sequence generator may be initialized based on a cell ID, and a pseudo-random sequence may be generated after the initialization. In some cases, the Gold sequence may be an example of the pseudo-random sequence generated by the Gold sequence generator. In some cases, the length of the RSS 540 may be determined based on a number of subcarriers and a number of OFDM symbols. In some cases, the length of the RSS 540 may be based on the number of subcarriers, number of symbols, and a mapping (e.g., Quadrature Phase Shift Keying (QPSK) mapping) of the RSS 540.

Further, a computer-generated sequence with minimum sidelobe amplitude in a autocorrelation function may be used as a binary sequence if the length of the RSS 540 is less than a threshold. In some cases, this binary sequence may also carry information about the Cell ID. In some cases, the second sequence S2 may be a complex conjugate of the first sequence S1 (e.g., S and S*). In some cases, the second sequence S2 and the first sequence S1 may be two different uncorrelated sequences.

In the example of FIG. 5, the first repetition 505 including either a first sequence S1 or a second sequence S2 may be similar to the second repetition 510 including first repetition 505 of either a first sequence S1 or a second sequence S2. As previously described, the first sequence S1 and the second sequence S2 may be PN sequences. In some cases, the first sequence S1 and the second sequence S2 may be Zadoff-Chu sequences, computer-generated sequences, or be constructed by repeating a smaller sequence using a binary cover code. In some examples, the first sequence S1 and the second sequence S2 may be based on a cell identifier of a cell served by the base station 105-a. In some examples, multiple repetitions of the first sequence S1 and the second sequence S2 may be concatenated to form the RSS 540. In some examples, each sequence S1 or S2 is transmitted in one symbol period, and thus the number of symbol periods spanned by the RSS 540 corresponds to a number of repetitions of the sequences S1 or S2.

Further, in the example of FIG. 5, the second synchronization signal (e.g., RSS 540) may include a first repetition 505 of either a first sequence S1 or a second sequence S2 and a second repetition 510 of either a first sequence S1 or a second sequence S2 arranged according to the 0s and 1s in a binary sequence. In some cases, the second sequence S2 may be a phase-rotated version of the first sequence S1 (e.g., S and $Se^{j\theta}$). Thus, the first repetition 505 and second repetition 510 may include either a first sequence S1 (e.g., S) or a second sequence S2 (e.g., $Se^{j\theta}$). As previously described, the first sequence S1 and the second sequence S2 may be PN sequences and phase-rotated versions of PN sequences, respectively. In some examples, the first sequence S1 and the second sequence S2 may be based on a cell identifier of a cell served by the base station 105-a. In some examples, multiple repetitions of the first sequence S1 and the second sequence S2 may be concatenated to form the RSS 540.

In some cases, the length of the first sequence S1 may span a duration corresponding to 1 subframe. In one example, the duration corresponding to 1 subframe may be 1 ms. Additionally or alternatively, the length of the second sequence S2 may span a duration corresponding to 1 subframe (or 1 ms). In some examples, the length of the multiple repetitions of the first sequence S1 and the second sequence S2 (or RSS 540) may correspond to a total duration of 4 ms, 8 ms, 16 ms, 32 ms or 40 ms.

In some cases, as previously discussed, the first sequence S1 may be repeated (or arranged) according to the 0s of the binary sequence and the second sequence S2 may be arranged according to the 1s of the binary sequence. In cases where the length of the multiple repetitions of the first sequence S1 and the second sequence S2 (or RSS 540) corresponds to a total duration of one of 4 ms, 8 ms, 16 ms, 32 ms and 40 ms, then the binary sequence may be constructed using the following Table 1.

TABLE 1

| RSS 540 Duration | Binary Sequence |
|---|---|
| 4 ms | {1, 0, 1, 1} |
| 8 ms | {1, 0, 0, 1, 0, 1, 1, 1} |

TABLE 1-continued

| RSS 540 Duration | Binary Sequence |
|---|---|
| 16 ms | {0, 0, 1, 1, 0, 1, 0, 0, 0, 1, 1, 0, 0, 1, 0, 1} |
| 32 ms | {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1} |
| 40 ms | {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 0, 1, 0, 1, 1, 0} |

In some examples, several different sequence types may be used for the binary sequence. In some examples, the binary sequence may include an m-sequence, a Barker code, a Gold sequence, a computer-generated sequence with minimum sidelobe amplitude in the autocorrelation function, or a combination thereof. In some example, the binary sequence may be generated by minimizing a maximum sidelobe amplitude in a Hamming autocorrelation function. As an example, as described in Table 1, the binary sequence {1, 0, 1, 1} for transmitting the RSS 540 having a duration of 4 ms, may correspond to a binary sequence that has a minimum sidelobe amplitude in the autocorrelation function. Similarly, the binary sequence {1, 0, 0, 1, 0, 1, 1, 1} may have a minimum sidelobe amplitude in the autocorrelation function for the RSS 540 having a duration of 8 ms. Additionally, the binary sequence {0, 0, 1, 1, 0, 1, 0, 0, 0, 1, 1, 0, 0, 1, 0, 1} may have a minimum sidelobe amplitude in the autocorrelation function for the RSS 540 having a duration of 16 ms. In some cases, the binary sequence {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1} may have a minimum sidelobe amplitude in the autocorrelation function for the RSS 540 having a duration of 32 ms. In some cases, the binary sequence {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 0, 1, 0, 1, 1, 0} may have a minimum sidelobe amplitude in the autocorrelation function for the RSS 540 having a duration of 40 ms.

As previously discussed, the multiple repetitions of the first sequence S1 and the second sequence S2 may be arranged according to the 0s and 1s in the binary sequence. In one example, the binary sequence may include the first sequence S1 in places where the binary sequence includes 0, and may include the second sequence S2 in places where the binary sequence includes 1. In such cases, when the RSS 540 duration is 8 ms, the binary sequence may be constructed as {S2, S1, S1, S2, S1, S2, S2, S2}. In some cases, the sequence type may be based on a length of the first sequence S1 or a length of the RSS 540. For example, a Gold sequence or an m-sequence may be used as a binary sequence if the length of the RSS 540 is greater than a threshold. Alternatively, a computer-generated sequence with minimum sidelobe amplitude in a autocorrelation function may be used as a binary sequence if the length of the RSS 540 is less than a threshold. In some cases, this binary sequence may also carry information about the Cell ID. In some examples, the binary sequence may also include a subframe number (SFN). In some cases, the binary sequence can also be used to indicate whether system information has changed. In one example, binary sequences may be unique for every cell, and the second synchronization sequence (e.g., RSS) S may be the same for multiple cells.

Figure 6:
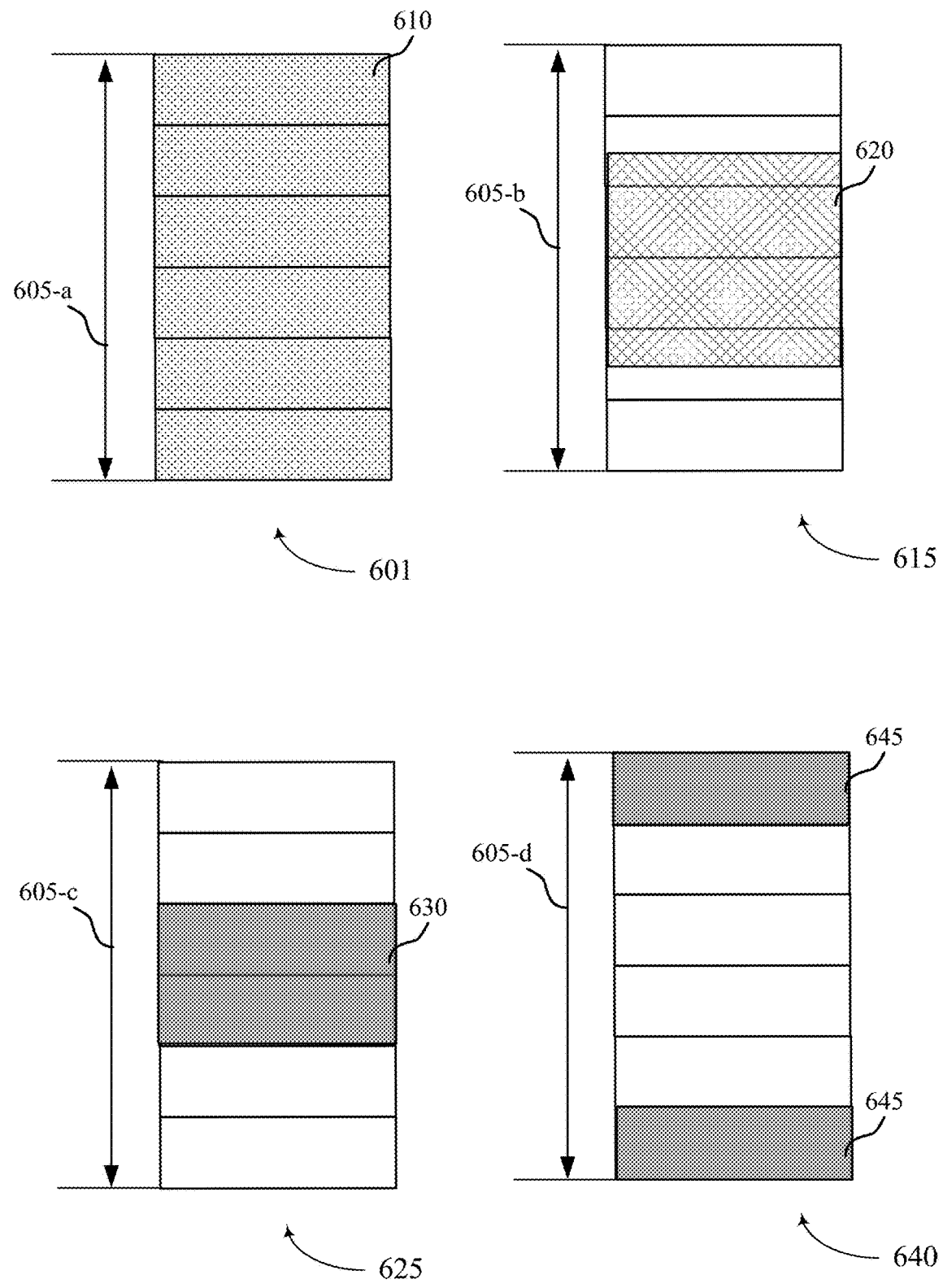

FIG. 6 illustrates an example of a signal design 600 that supports resynchronization signal design in accordance with various aspects of the present disclosure. In particular, FIG. 6 illustrates different example frequency domain signal designs for a resynchronization signal. In some examples, the signal design 600 may be implemented by aspects of wireless communications system 100.

In some examples, a base station (such as base station 105 in FIG. 1 and base station 105-*a* in FIG. 2) may broadcast synchronization signals for a cell to support connection on the cell for UEs (such as UE 115 in FIG. 1 and UE 115-*a* in FIG. 2). For example, the base station may transmit a first synchronization signal to a UE according to a first periodicity. In some cases, a UE may transition out of a connected mode, or transition into a sleep mode, or lose synchronization with the cell after receiving the first synchronization signal. In such cases, the UE may receive a second synchronization signal (e.g., RSS) for resynchronizing with the cell. In some cases, the second synchronization signal may be based on a cell identifier of the cell. In some cases, the sequence S may be of a predetermined length. In some cases, the second synchronization signal may include the sequence S, as described previously with reference to FIGS. 3-5. In some cases, as discussed previously with reference to FIGS. 3-5, the second synchronization signal (such as RSS) may be generated in the time domain. Further, in some cases, the second synchronization signal (such as RSS) may be generated to occupy different parts of the cell bandwidth. Several configuration options are described in the example of FIG. 6.

As a first example 601, the second synchronization signal may be generated by a sequence S 610 spanning a number of PRBs 605-*a* spanned by the first synchronization signal. For example, the first synchronization signal may span six (6) PRBs 605-*a*. In some cases, the sequence S 610 may be configured to span all 6 PRBs in the frequency domain. In such cases, the sequence S 610 may be transmitted from a base station to a UE without applying any power boosting (e.g., relative to the first synchronization signal) to the individual PRBs.

As a second example 615, the second synchronization signal may be generated by a sequence S 620 spanning a subset of PRBs 605-*b*. As previously discussed, the PRBs 605-*b* may include six PRBs. In some cases, the sequence S 620 may be configured to span a subset of the 6 PRBs in a contiguous fashion. In the second example 615, the sequence S 620 may be configured to span 3 PRBs in a contiguous fashion. The subset of PRBs spanned by the sequence S 620 may span only full PRBs, or may span partial PRBs as illustrated by the example 615. The sequence S 620 may be transmitted from a base station to a UE by applying a power boost (such as a 2× power boosting) to the PRBs across which the sequence S 620 is transmitted. For example, the second synchronization signal may be power boosted in accordance with a ratio of the number of PRBs 605-*b* to the PRBs spanned by the sequence S 620.

As a third example 625, the second synchronization signal may be generated by a sequence S 630 spanning a subset of PRBs 605-*c*. As previously discussed, the PRBs 605-*c* may include six PRBs. In some cases, the sequence S 630 may be configured to span a subset of the PRBs 605-*c* in a contiguous fashion. In the third example 625, the sequence S 630 may be configured to span 2 PRBs in a contiguous fashion. In some cases, the sequence S 630 may be transmitted by applying a predetermined power boosting as discussed with reference to example 615. In the illustrated example, the sequence S 630 may be transmitted from a base station to a UE by applying a 3× power boosting to the PRBs across which the sequence S 630 is transmitted.

As a fourth example 640, the second synchronization signal may be generated by a sequence S 645 spanning a subset of PRBs 605-*d*. In the fourth example 640, the sequence S 645 may be transmitted over a first PRB and over a second, non-contiguous PRB. As previously discussed, the PRBs 605-*d* may include six PRBs. Spanning a subset of the PRBs 605-*d* in a non-contiguous fashion may provide additional frequency diversity. In some cases, the sequence S 645 may be transmitted by applying a predetermined power boosting as discussed with reference to examples 615 and 625. In the illustrated example, the sequence S 645 may be transmitted by applying a 3× power boosting to the first PRB and the second PRB. In some cases, the non-contiguous regions including the sequence S 645 may lie at the edges of the PRBs 605-*d* to maximize frequency diversity.

Figure 7A:
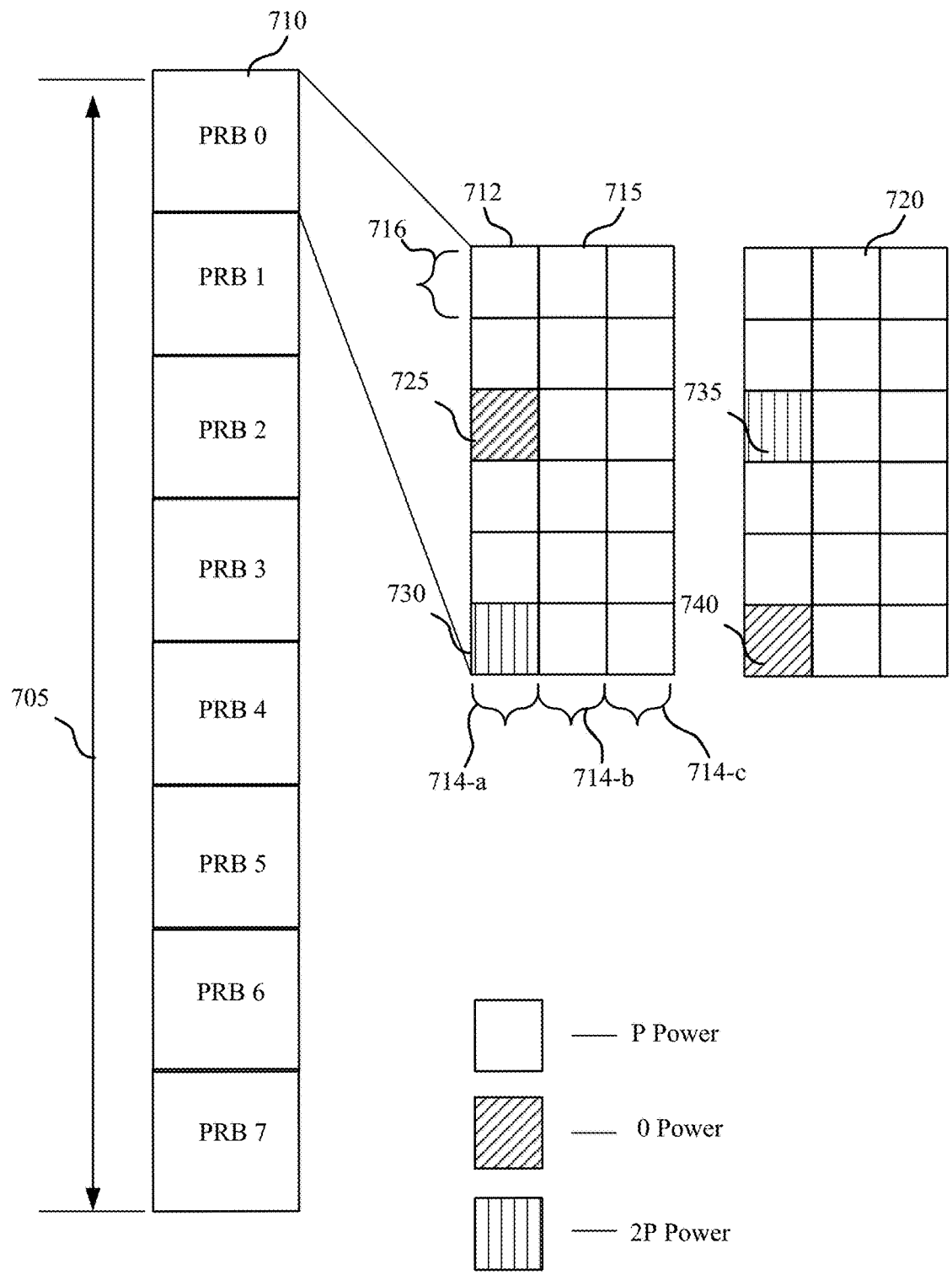

FIG. 7A illustrates an example of a signal design 700 that supports resynchronization signal design in accordance with various aspects of the present disclosure. In particular, FIG. 7A illustrates example time-frequency resource allocations for PRBs including a resynchronization signal or a wake-up signal (WUS). In some examples, the signal design 700 may be implemented by aspects of wireless communications system 100.

In some examples, a base station (such as base station 105 in FIG. 1 and base station 105-*a* in FIG. 2) may broadcast synchronization signals for a cell to support connection on the cell for UEs (such as UE 115 in FIG. 1 and UE 115-*a* in FIG. 2). For example, the base station may transmit a first synchronization signal to a UE according to a first periodicity. In some cases, if the UE transitions out of a connected mode after receiving the first synchronization signal, the base station may transmit a second synchronization signal (e.g., RSS) for resynchronizing with the cell. According to some aspects, the RSS may be transmitted over one or more PRBs, which may include at least one of a reference signal, the first synchronization signal, or a broadcast channel. For example, the RSS may be transmitted over one or more PRBs that also include a CRS, PSS, SSS, or a PBCH. The signal 710 (e.g., RSS, WUS) may span a number of PRBs 705. In some cases, the PRBs may include CRS, and the CRS may be associated with one or more antenna ports. Each PRB may include a number of resource elements 712.

According to some aspects of the present disclosure, a base station may map a signal to a first subset of resource elements 712 of a time-frequency resource block and a set of reference signals to a second subset of the resource elements of the time-frequency resource block. In some cases, the first subset of resource elements may include a subset of resource elements of a first symbol period of the time-frequency resource block, and each resource element of a second symbol period of the time-frequency resource block. In the example of FIG. 7A, the PRBs 705 may span over 8 PRBs. Each PRB may include resource elements corresponding to a number of symbol periods 714 and a number of subcarriers 716. Although illustrated as being a block of three (3) symbol periods 714 and six (6) subcarriers 716, it should be understood that these dimensions are shown for the sake of clarity and the PRBs 705 may be other sizes, such as twelve (12) or fourteen (14) symbol periods 714 and twelve (12) subcarriers 716, or any suitable dimension. In some cases, the resource elements 712 included in a PRB (such as PRB 0) may include resource elements mapped for an RSS or WUS and CRS resource elements. In some cases, the CRS, RSS and/or WUS may be power boosted (e.g., relative to the first synchronization signal). In some cases, there may be a relation between the power boost associated with the CRS and the power boost associated with the remaining resource elements (such as resource elements associated with RSS/WUS).

In some implementations, the energy per resource element (EPRE) for RSS or WUS may be constant across OFDM symbols. Thus, the UE may assume that for RSS or WUS, the EPRE is constant. For example, the detection performance for the RSS or WUS sequences may be degraded if EPRE is not constant across resource elements. In addition, the UE may be configured to perform channel estimation or perform channel measurements using RSS or WUS, and if the RSS or WUS has different EPRE across different resource elements, then it may impact the channel estimation or measurement performance. In some cases, a base station may be configured with a correspondence between antenna ports and transmit chains (e.g., radio frequency (RF) chains) or antennas. In some cases, the transmit power across different RF chains or antennas (or groups of antennas) may be constant. That is, the base station may not allocate power between different RF chains or antennas differently. Similarly, the transmit power per symbol period may also be constant. That is, the base station may not allocate transmit power differently among symbol periods.

In some examples, the CRS, RSS and WUS may be associated with different power boosting parameters. As discussed with reference to FIG. 6, the power boosting parameters in some cases, may be based on the blanking of one or more PRBs. For detection or use in channel estimation or measurement, it may be beneficial for a UE to determine the transmit power for CRS relative to EPRE for RSS or WUS. Specifically, it may be beneficial for the UE to determine the relationship between EPRE for RSS and the EPRE for CRS, as well as between EPRE for WUS and EPRE for CRS. In some cases, RSS or WUS may be transmitted in 2 PRBs, and one or more PRBs may be blanked. For example, power boosting of 0 dB, 2 dB, 4 dB, or 6 dB may correspond to blanking of 0, 2, 4, or 6 PRBs, respectively. In some cases, RSS or WUS may be transmitted via multiple RF chains or physical antennas, where each RF chain or antenna is associated with an antenna port.

In some cases, a first power ratio ($\rho_A$) between the set of reference signals and resource elements of a data channel for symbol periods that do not include CRS (e.g., symbol periods 714-*b* or 714-*c*) and a second power ratio ($\rho_B$) between the set of reference signals and resource elements of the data channel for symbol periods that do include CRS (e.g., symbol period 714-1) may be configured (e.g., for a UE or for the cell). In some cases, $\rho_A$ may be referred to as a power ratio of symbol periods of a data channel without CRS, and $\rho_B$ may be referred to as a power ratio of symbol periods of a data channel with CRS. In some cases, $\rho_A$ and $\rho_B$ may be conveyed by a ratio parameter (e.g., $P_B$), and if $P_B$ is not configured, UE may assume $\rho_A=\rho_B$. In some cases, the cell-specific ratio of $\rho_A$ and $\rho_B$ may be indicated according to cell-specific parameter $P_B$ signalled by higher layers and the number of configured eNodeB cell specific antenna ports. In the case of a single antenna port, it can be seen that when $P_B$ is equal to 1, each resource element (e.g., resource elements for CRS, RSS, and WUS) will also have the same power (e.g., P). In cases where $\rho_A$ does not equal $\rho_B$, the UE may be configured to evaluate a function of the first power ratio and the second power ratio in order to determine the power for RSS and/or WUS resource elements, or alternatively a predefined value based on cell-specific parameter $P_B$ signaled by higher layers and the number of configured eNodeB cell specific antenna ports.

According to the example described in FIG. 7A, one or more of the PRBs may be mapped to two antenna ports (such as antenna port 0 715 and antenna port 1 720). In some cases, the CRS in antenna port 0 715 may be FDM-ed with CRS in antenna port 1 720. That is, for antenna port 0 715, the resource elements corresponding to CRS for antenna port 1 720 may not have a symbol transmitted (e.g., may carry a null symbol). Conversely, for antenna port 1 720, the resource elements corresponding to CRS for antenna port 0 715 may not have a symbol transmitted (e.g., may carry a null symbol). As described above, each antenna port may correspond to a single RF chain or antenna (or group of antennas). As described with reference to FIG. 7A, the CRS may be configured to borrow the power from one resource element to increase the power of another resource element in order to counterbalance the effects of FDM and antenna ports corresponding to different RF chains or antennas. For example, in antenna port 715, the CRS may borrow power from resource element 725 to boost the power of resource element 730.

Additionally, in antenna port 720, the CRS may borrow power from resource element 730 to boost the power of resource element 725. In some cases, each resource element may be associated with a power P. Thus, after borrowing, the power transmitted via antenna port 715 for resource element 725 may be zero (0) and the power transmitted via antenna port 715 for resource element 730 may be 2P. Similarly, after borrowing, the power transmitted via antenna port 720 for resource element 735 may be 2P and the power transmitted via antenna port 720 for resource element 740 may be zero (0). In some cases, since the CRS ports are orthogonal, the UE may receive 2P power for CRS ports (through antenna ports 715 and 720) and, if the resource elements associated with the RSS or WUS are transmitted at power P for each antenna port, 2P power for the remaining resource elements as well. In this case, no power boosting for RSS or WUS is performed. In some cases, the network may be configured to power boost RSS, or WUS (e.g., via blanking of additional PRBs). Thus, the example of FIG. 7A may be utilized to boost transmit power for CRS when separate antenna ports are used for CRS transmission.

In some examples, if the RSS or WUS is transmitted via two PRBs and 6 PRBs are blanked, then a ratio of the EPRE for RSS and the EPRE for CRS may be 6 dB for 1 antenna port or 2 antenna ports, and 9 dB for 4 antenna ports. The UE may identify the number of blanked PRBs via a configuration message. Thus, the ratio of the EPRE for RSS to the EPRE for CRS may be given by the configured number of blanked PRBs for 1 or 2 antenna ports, and given by the configured number of blanked PRBs+3 dB for 4 antenna ports. Additionally, for WUS, the EPRE for WUS may be boosted above the EPRE for CRS by 3 dB for 1 antenna port or 2 antenna ports, and 6 dB for 4 antenna ports. That is, the ratio of the EPRE for WUS to the CRS may be $10 \times \log_{10} 3$ dB for 1 antenna port or 2 antenna ports, and $10 \times \log_{10} 6$ dB for 4 antenna ports Thus, the EPRE for RSS or WUS may be dependent on the number of blanked PRBs and the number of antenna ports.

Figure 7B:
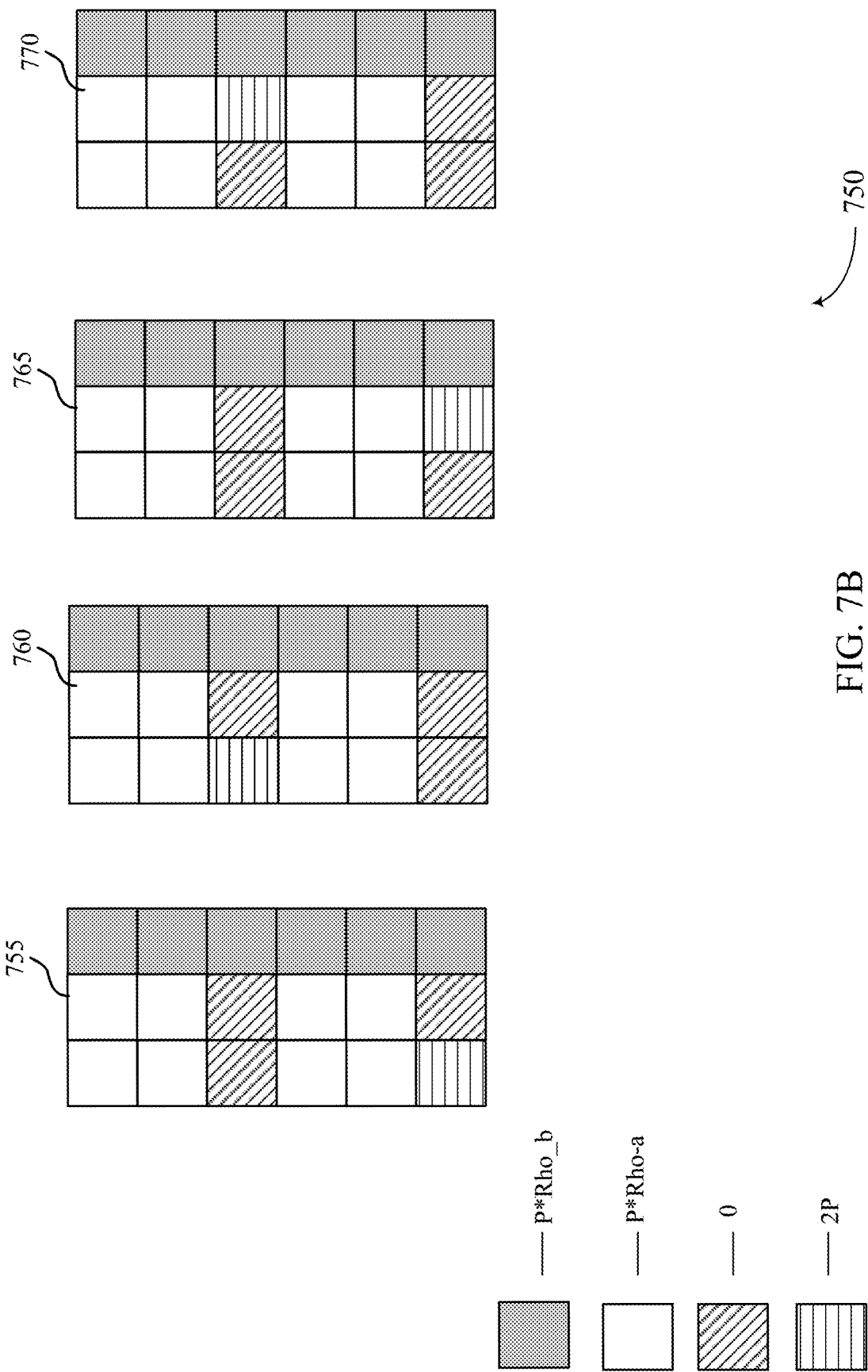

FIG. 7B illustrates an example of a signal design 750 that supports resynchronization signal design in accordance with various aspects of the present disclosure. In particular, FIG. 7B illustrates example time-frequency resource allocations for PRBs including a resynchronization signal or a WUS. In some examples, the signal design 750 may be implemented by aspects of wireless communications system 100.

As discussed with reference to FIG. 7A, a base station (such as base station 105 in FIG. 1 and base station 105-*a* in FIG. 2) may transmit a first synchronization signal to a UE according to a first periodicity. If the UE transitions out of synchronizations, the base station may transmit a second synchronization signal (e.g., RSS) for resynchronizing with the cell. A WUS may be transmitted aperiodically (e.g., prior to a paging occasion). In the example of FIG. 7B, a base station may map a signal to a first subset of resource elements of a time-frequency resource block and a set of reference signals to a second subset of the resource elements of the time-frequency resource block.

As described with reference to FIG. 7A, a first power ratio ($\rho_A$) between the set of reference signals and resource elements of a data channel for symbol periods that do not include CRS and a second power ratio ($\rho_B$) between the set of reference signals and resource elements of the data channel for symbol periods that do include CRS may be configured (e.g., for a UE or for the cell). In some cases, $\rho_A$ may be referred to as a power ratio of symbol periods of a data channel without CRS, and $\rho_B$ may be referred to as a power ratio of symbol periods of a data channel with CRS. In some cases, $\rho_A$ and $\rho_B$ may be conveyed by a ratio parameter (e.g., $P_B$), and a default value of $P_B$ may be one (1) (e.g., $\rho_A = \rho_B$). In some cases, the ratio of $\rho_A$ and $\rho_B$ may be a cell-specific parameter.

According to the example described in FIG. 7B, one or more of the PRBs may be mapped to four antenna ports 755, 760, 765, and 770. In some cases, a first antenna port 755 may be FDM-ed with a second antenna port 760, and the remaining antenna ports 765 and 770 may be TDM-ed with the first and second antenna ports 755 and 760 (such as in an adjacent symbol). In such cases, one or more antenna ports may have additional power in some OFDM symbols (such as the symbols in which resource elements are blanked corresponding to the CRS for other antenna ports). However, the additional power may not be transferred to the RSS or WUS in these symbols because the RSS is configured to have constant EPRE across all symbols. Thus, in the case of four antenna ports, the resource elements for transmitting CRS may be associated with a transmit power of 2P, and the resource element associated with RSS may be associated with a transmit power of 4P. Thus, the default EPRE for RSS (with no blanking of other PRBs) is 3 dB higher than the EPRE for CRS.

Figure 8A:
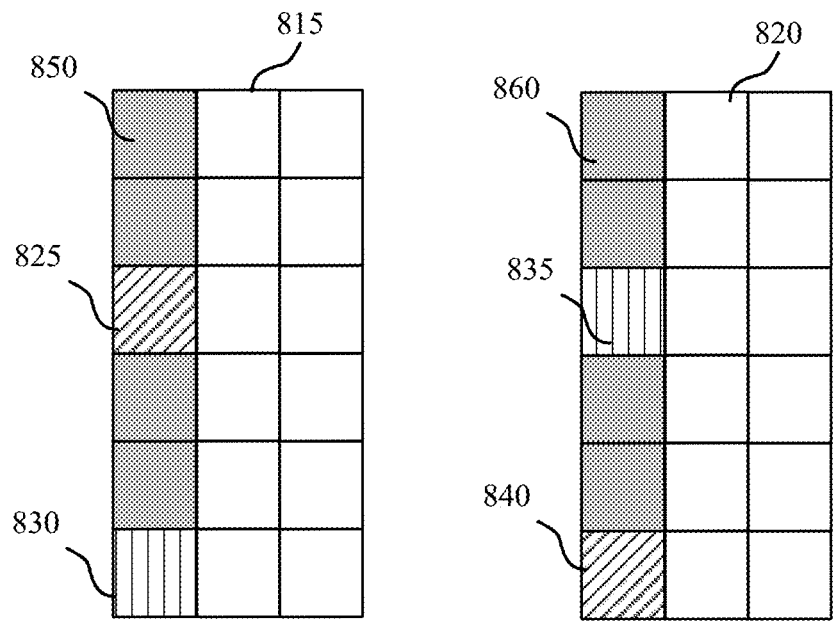
Figure 8A:
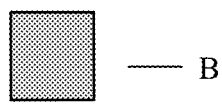
Figure 8A:
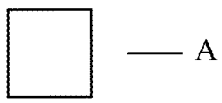
Figure 8A:
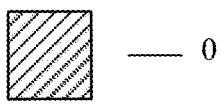
Figure 8A:
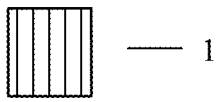

FIG. 8A illustrates an example of a signal design 800 that supports resynchronization signal design in accordance with various aspects of the present disclosure. In particular, FIG. 8A illustrates different example frequency domain signal designs for a resynchronization signal. In some examples, the signal design 800 may be implemented by aspects of wireless communications system 100.

As previously discussed, a base station (such as base station 105 in FIG. 1 and base station 105-*a* in FIG. 2) may broadcast synchronization signals for a cell to support connection on the cell for UEs (such as UE 115 in FIG. 1 and UE 115-*a* in FIG. 2). For example, the base station may transmit a first synchronization signal to a UE according to a first periodicity. In some cases, the base station may transmit a second synchronization signal (e.g., RSS) for resynchronizing with the cell. Additionally or alternatively, the base station may transmit a WUS prior to a paging occasion. According to some aspects, the RSS or WUS may be transmitted in PRBs including a reference signal, the first synchronization signal, or a broadcast channel. For example, PRBs used for the RSS or WUS may carry a CRS, PSS, SSS, or a PBCH.

According to some aspects of the present disclosure, a base station may map a signal (e.g., RSS, WUS) to a first subset of resource elements of a time-frequency resource block and a set of reference signals (e.g., CRS) to a second subset of the resource elements of the time-frequency resource block. In the example of FIG. 8A, one or more of the PRBs may be mapped to two antenna ports 815 and 820. The CRS in antenna port 0 815 may be FDM-ed with CRS in antenna port 1 820. In the example of FIG. 8A, the resource elements 850 may be associated with $\rho_b$ (such as resource elements including CRS) for antenna port 815, and the resource elements 860 may be associated with $P_b$ (such as resource elements including CRS) for antenna port 820. In some cases, the resource element 825 may be associated with 0 power and resource element 830 may be associated with 1 (or P) power. Similarly, for antenna port 820, the resource element 835 may be associated with 1 (or P) power and resource element 840 may be associated with 0 power.

In some cases, the UE may identify a power of the CRS, RSS and/or WUS by evaluating a function of a first power ratio ($\rho_A$) between the set of reference signals and resource elements of a data channel for the first symbol period and a second power ratio ($\rho_B$) between the set of reference signals and resource elements of the data channel for the second symbol period. In some cases, where the CRS is transmitted across one antenna port (not shown), the power ratio may be calculated using the following equation and Table 2:

$$5\rho_B 1 = 6\rho_A \rightarrow \rho_A = 1/(6-5\rho), \text{ with } \rho = \rho_B/\rho_A.$$

In some cases, where the CRS is transmitted across two antenna ports (shown in FIG. 8A) or 4 antenna ports (not shown), the power ratio may be calculated using the following equation and Table 2:

$$4\rho_B + 1 = 6\rho_A \rightarrow \rho_A = 1/(6-4\rho), \text{ with } \rho = \rho_B/\rho_A.$$

TABLE 2

Figure 8B:
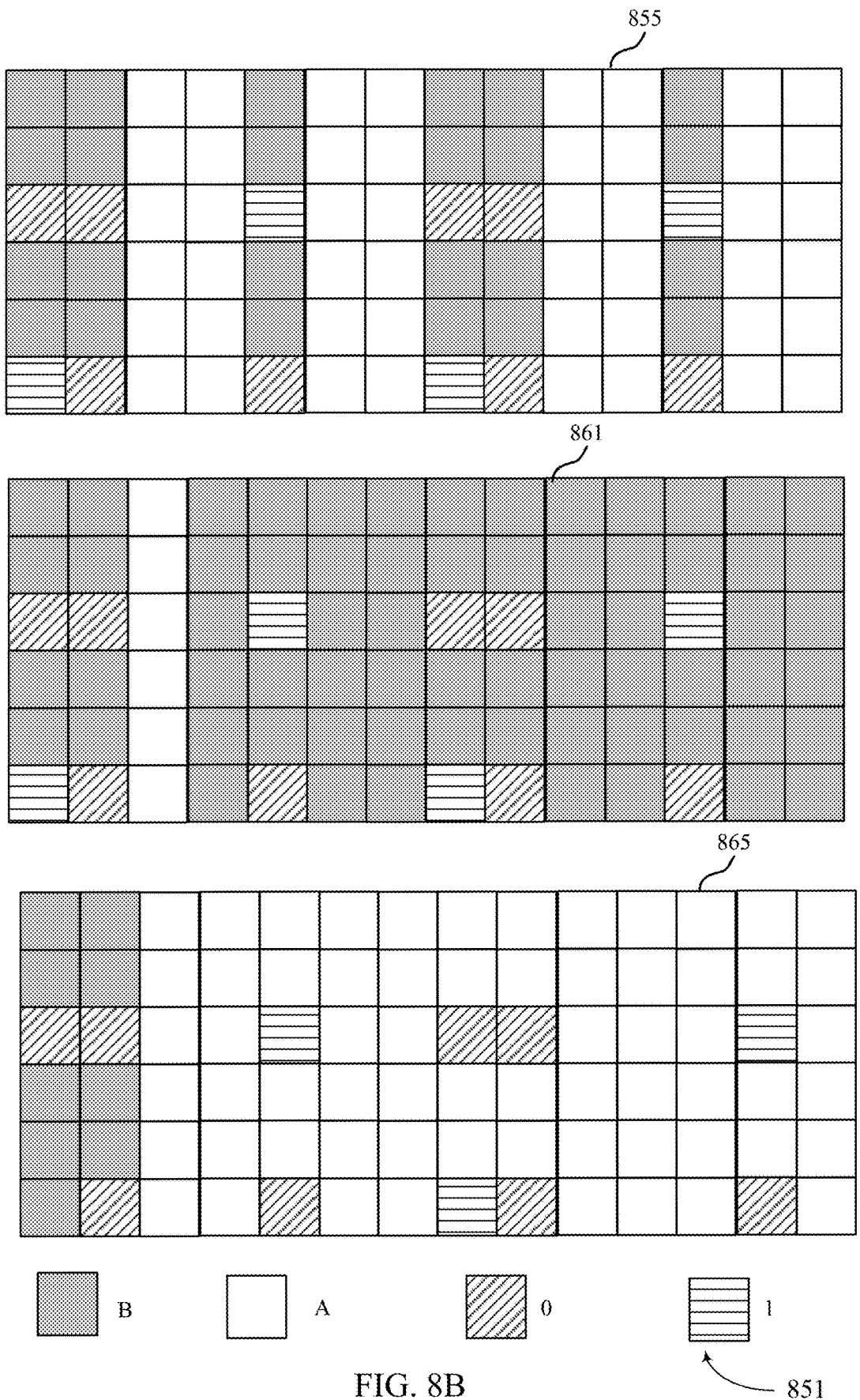

| $P_B$ | $\rho$ for 1AP | Default $\rho_A$ | Default $\rho_B$ | $\rho$ for 2 or 4 APs | Default $\rho_A$ | Default $\rho_B$ | CRS power boost |
|---|---|---|---|---|---|---|---|
| 0 | 1 | 1 | 1 | 5/4 | 1 | 5/4 | 0 dB |
| 1 | 4/5 | 1/2 | 2/5 | 1 | 1/2 | 1/2 | 3 dB |
| 2 | 3/5 | 1/3 | 1/5 | 3/4 | 1/3 | 1/4 | 4.8 dB |
| 3 | 2/5 | 1/4 | 1/10 | 1/2 | 1/4 | 1/8 | 6 dB | resource block. In the example of FIG. 8B, one or more of the PRBs may be mapped to an antenna port (antenna port 0), where the total number of antenna ports is 4.

In some cases, the UE may determine a function of a power ratio between each of the first subset of resource elements and the set of reference signals based on a number of antenna ports of the set of reference signals. For example, the function may include normalizing the second power ratio ($\rho_B$) by the first power ratio ($\rho_A$). Alternatively, the function may include a minimum of the first power ratio and the second power ratio or a maximum of the first power ratio and the second power ratio. In some examples, the function may include a sum of a product of the first power ratio with a first scaling factor and a product of the second power ratio with a second scaling factor. For example, the function may be calculated as beta*$\rho_B$+alpha*$\rho_A$, where beta=3/11 and alpha=8/11 in case of 1 or 2 antenna port, or beta=4/11 and alpha=7/11 in case of 4 antenna ports. In some cases, a ratio of the EPRE for RSS or WUS relative to Physical Downlink Shared Channel (PDSCH) $\rho_A$ may be the EPRE for the port (EPRE$_{port}$). For example, the EPRE for RSS or WUS relative to PDSCH $\rho_a$ may be a minimum of {p and 1}. In the example of FIG. 8B, the resource elements 855 are associated with a PDSCH, the resource elements 861 are associated with RSS and/or WUS, if they are equal to $\rho_B$, and the resource elements 865 are associated with the RSS and/or WUS, if they are equal to $P_A$. Additionally, a ratio of the EPRE for RSS or WUS relative to CRS may be p*EPRE$_{port}$, where p is the number of antenna ports. In some cases, e.g., when $\rho_A = \rho_B$, the EPRE for RSS or WUS relative to CRS may be 0 dB for 1 or 2 antenna ports and +3 dB for 4 antenna ports. Additionally or alternatively, the power ratios may be determined according to Table 3.

TABLE 3

| $P_B$ | $\rho$ for 1AP | Default $\rho_A$ | Default $\rho_B$ | EPRE to CRS EPRE | $\rho$ for 2APs | Default $\rho_A$ | Default $\rho_B$ | EPRE to CRS EPRE | $\rho$ for 4APs | Default $\rho_A$ | Default $\rho_B$ | EPRE to CRS EPRE |
|---|---|---|---|---|---|---|---|---|---|---|---|---|
| 0 | 1 | 1 | 1 | 1 | 5/4 | 1 | 5/4 | 2 | 5/4 | 1 | 5/4 | 4 |
| 1 | 4/5 | 1/2 | 2/5 | 2/5 | 1 | 1/2 | 1/2 | 1 | 1 | 1/2 | 1/2 | 2 |
| 2 | 3/5 | 1/3 | 1/5 | 1/5 | 3/4 | 1/3 | 1/4 | 1/2 | 3/4 | 1/3 | 1/4 | 2 |
| 3 | 2/5 | 1/4 | 1/10 | 1/10 | 1/2 | 1/4 | 1/8 | 1/4 | 1/2 | 1/4 | 1/8 | 1/2 |

FIG. 8B illustrates an example of a signal design 851 that supports resynchronization signal design in accordance with various aspects of the present disclosure. In particular, FIG. 8B illustrates different example frequency domain signal designs for a resynchronization signal. In some examples, the signal design 851 may be implemented by aspects of wireless communications system 100.

According to some aspects of the present disclosure, a base station may map a signal (e.g., RSS, WUS) to a first subset of resource elements of a time-frequency resource block and a set of reference signals (e.g., CRS) to a second subset of the resource elements of the time-frequency Specifically, a UE may be configured to calculate a ratio of EPRE for RSS and EPRE for CRS as $10 \log_{10}(p \times \min\{\rho_A^d, \rho_B^d\})$, with $\beta_A^d$ and $\rho_B^d$ the values for default $\rho_A$ and $\rho_B$ relative to CRS EPRE from Table 3, and p the number of CRS ports. Additionally, UE may be configured to calculate a ratio of EPRE for WUS and EPRE for CRS $10 \log_{10}(3 \times p \times \min\{\rho_A^d, \rho_B^d\})$, with $\beta_A^d$ and $\rho_B^d$ the values for default $\rho_A$ and $\rho_B$ relative to CRS EPRE from Table 3, with p being the number of CRS ports. Note that $\beta_A^d$ and $\rho_B^d$ that allow for uniform power allocation across all RBs. In case of $\rho_A^d = \rho_B^d$, the RSS EPRE relative to CRS EPRE is 0 dB for 1- or 2-port CRS, and 3 dB for 4-port CRS, respectively. Alternatively, UE may refer to a predefined Table (e.g., Table 3) for RSS EPRE relative to CRS EPRE to find the value according to the configured $P_B$ and number of CRS ports.

Figure 9:
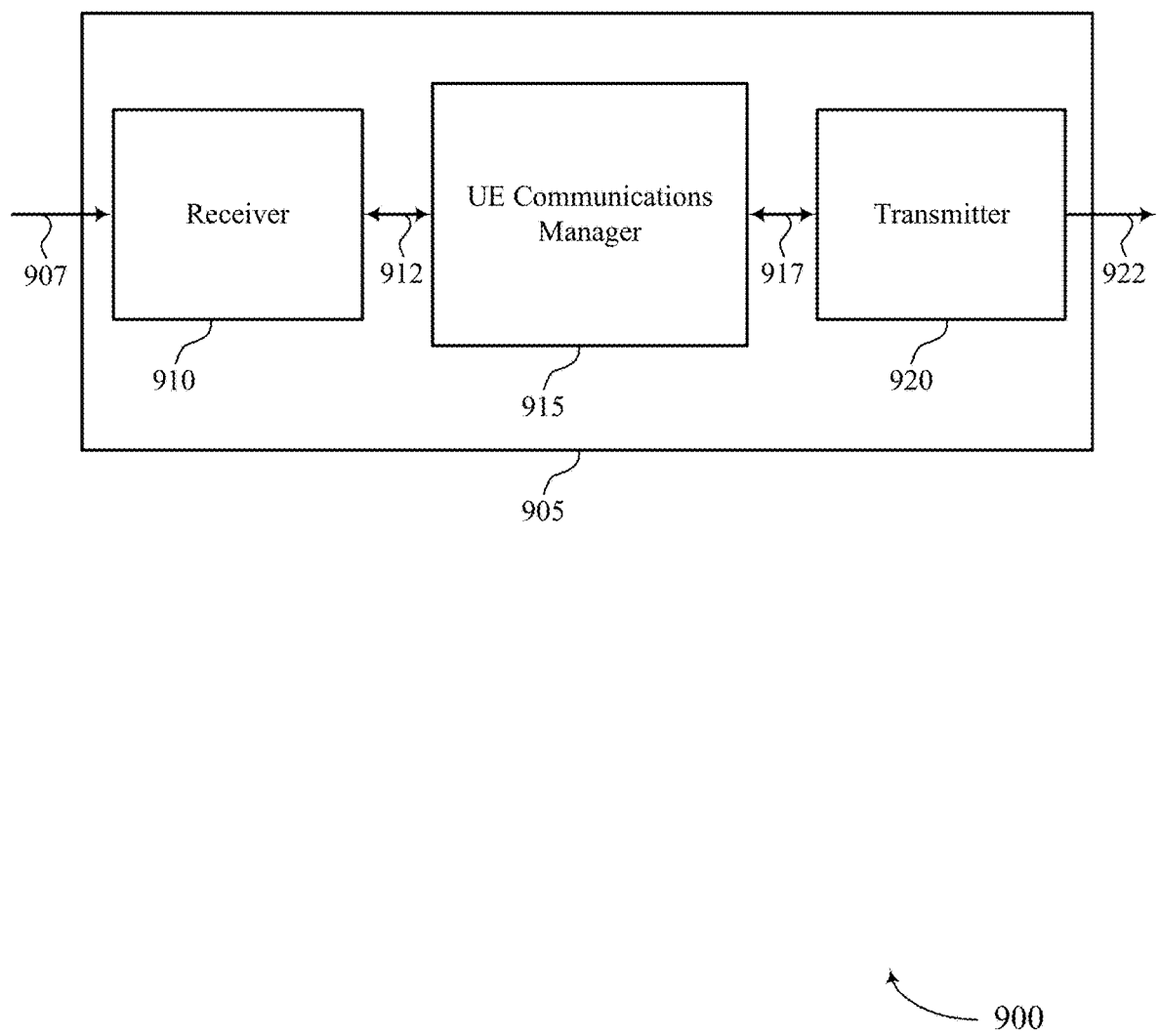
FIGS. 9 through 11B show block diagrams of a device that supports resynchronization signal design in accordance with aspects of the present disclosure.

FIG. 9 shows a block diagram 900 of a wireless device 905 that supports resynchronization signal design in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive signaling 907 via one or more antennas and may perform various operations to process the signaling (e.g., down-conversion, analog-to-digital conversion, filtering, baseband processing, etc.). This information may be passed on to other components of the device. In some cases, the receiver 910 may receive information such as packets, user data, or control information associated with various information channels (e.g., control channels, data channels, and information related to resynchronization signal design, etc.). The receiver 910 may be an example of aspects of the transceiver 1235 described with reference to FIG. 12. The receiver 910 may utilize a single antenna or a set of antennas.

Receiver 910 may receive system information associated with the cell, the system information indicating at least one of a presence of the second synchronization signal, timing information for the second synchronization signal (e.g., the second periodicity, a timing offset from the first synchronization signal), a length of the second synchronization signal, a frequency offset and/or a frequency location for the second synchronization signal, a transmit power for the second synchronization signal, a bandwidth of the second synchronization signal, a hopping pattern for the second synchronization signal, a multiplicative factor for the second periodicity, or an overhead percentage and receive a second instance of the first synchronization signal for the resynchronizing with the cell based on phase or timing information determined from the second synchronization signal.

UE communications manager 915 may be an example of aspects of the UE communications manager 1015 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive a signal 912, which may be a representation of signal 907 and may include a first synchronization signal and a second synchronization signal. UE communications manager 915 may receive the first synchronization signal for synchronizing with a cell, the first synchronization signal transmitted according to a first periodicity by a base station serving the cell. The UE communications manager 915 may receive, subsequent to the synchronizing, a second synchronization signal for resynchronizing with the cell, the second synchronization signal transmitted by the base station according to a second periodicity, where the second synchronization signal includes a set of repetitions of a first sequence that is based on a cell identifier of the cell, and communicate over the cell with the base station based on the resynchronizing. In some cases, the second periodicity may be different from the first periodicity.

The UE communications manager 915 may receive the signal 912 including a signal mapped to a first subset of resource elements of a time-frequency resource block and a set of reference signals mapped to a second subset of resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and demodulate the signal based on the power ratio. In some cases, the UE communications manager 915 may pass information 917 to transmitter 920. The UE communications manager 915 may be an example of aspects of the UE communications manager 1015 described herein.

Transmitter 920 may transmit signals 922 generated by or received from other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
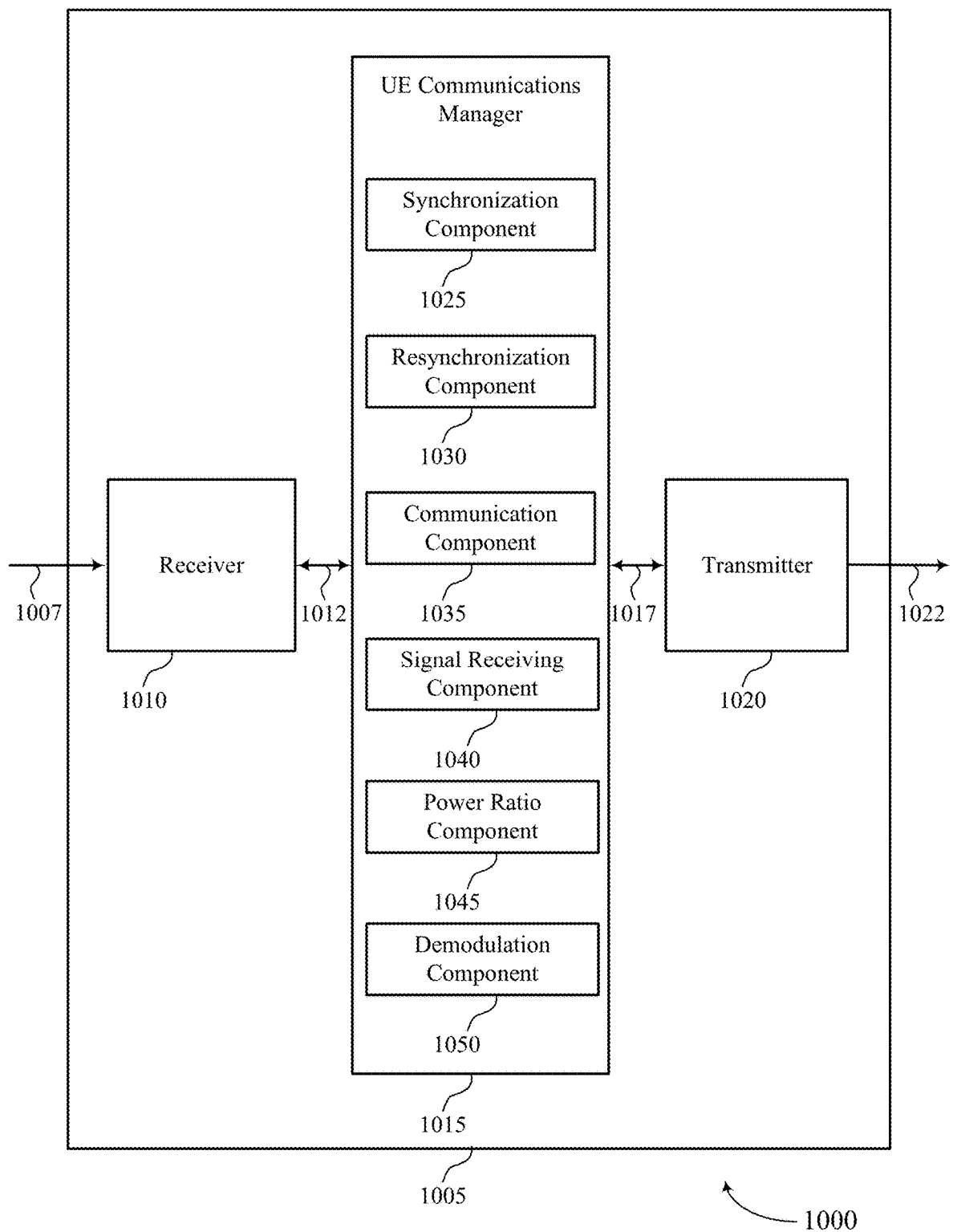

FIG. 10 shows a block diagram 1000 of a wireless device 1005 that supports resynchronization signal design in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive signaling 1007 via one or more antennas. In some cases, the signaling 1007 may include information such as packets, user data, or control information associated with various information channels (e.g., control channels, data channels, and information related to resynchronization signal design, etc.). Information may be passed on to other components of the device. The receiver 1010 may be an example of aspects of the transceiver 1235 described with reference to FIG. 12. The receiver 1010 may utilize a single antenna or a set of antennas. Receiver 1010 may pass along signal 1007, or a representation of signaling 1007 (e.g., filtered, digitized, etc.), in signal 1012 to UE communications manager 1015.

UE communications manager 1015 may be an example of aspects of the UE communications manager 1015 described with reference to FIG. 12. UE communications manager 1015 may also include synchronization component 1025, resynchronization component 1030, communication component 1035, signal receiving component 1040, power ratio component 1045, and demodulation component 1050.

Synchronization component 1025 may receive a first synchronization signal for synchronizing with a cell, the first synchronization signal transmitted according to a first periodicity by a base station serving the cell. In some cases, the first synchronization signal may be included in signal 1012.

Resynchronization component 1030 may receive, subsequent to the synchronizing, a second synchronization signal for resynchronizing with the cell, the second synchronization signal transmitted by the base station according to a second periodicity. In some cases, the second synchronization signal may be included in signal 1012. In some cases, the second periodicity is different from the first periodicity. In some cases, the second synchronization signal includes a set of repetitions of a first sequence that is based on a cell identifier of the cell. The resynchronization component 1030 may receive a third synchronization signal for the resynchronizing with the cell, the third synchronization signal being transmitted by the base station over the cell subsequent to the second synchronization signal and having a sequence length longer than a sequence length of the first sequence.

In some cases, the resynchronization component 1030 may receive, from the base station, a resynchronization signal configuration for a neighbor cell, the resynchronization signal configuration including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal. In some cases, the second synchronization signal includes a set of repetitions of a second sequence, and where the set of repetitions of the first sequence and the set of repetitions of the second sequence are transmitted according to a binary sequence. In some cases, the resynchronization signal configuration is received in system information or in dedicated signaling from the base station.

Communication component 1035 may communicate over the cell with the base station based on the resynchronizing. For example, the communication component 1035 may pass information associated with the first synchronization signal and the second synchronization signal to transmitter 1020 via signal 1017.

The signal receiving component 1040 may receive a signal mapped to a first subset of resource elements of a time-frequency resource block and a set of reference signals mapped to a second subset of the resource elements of the time-frequency resource block, where the first subset of resource elements include a subset of resource elements of a first symbol period of the time-frequency resource block, and each resource element of a second symbol period of the time-frequency resource block.

The power ratio component 1045 may identify a power ratio between each of the first subset of resource elements and the set of reference signals based on a number of antenna ports of the set of reference signals. The demodulation component 1050 may demodulate the signal based on the power ratio. The demodulation component 1050 may pass the demodulated signal to transmitter 1020 via signal 1017.

Transmitter 1020 may transmit signaling 1022 based on signaling 1017 generated by other components of the device. For instance, UE communications manager 1015 may pass information 1017 to transmitter 1020. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11A:
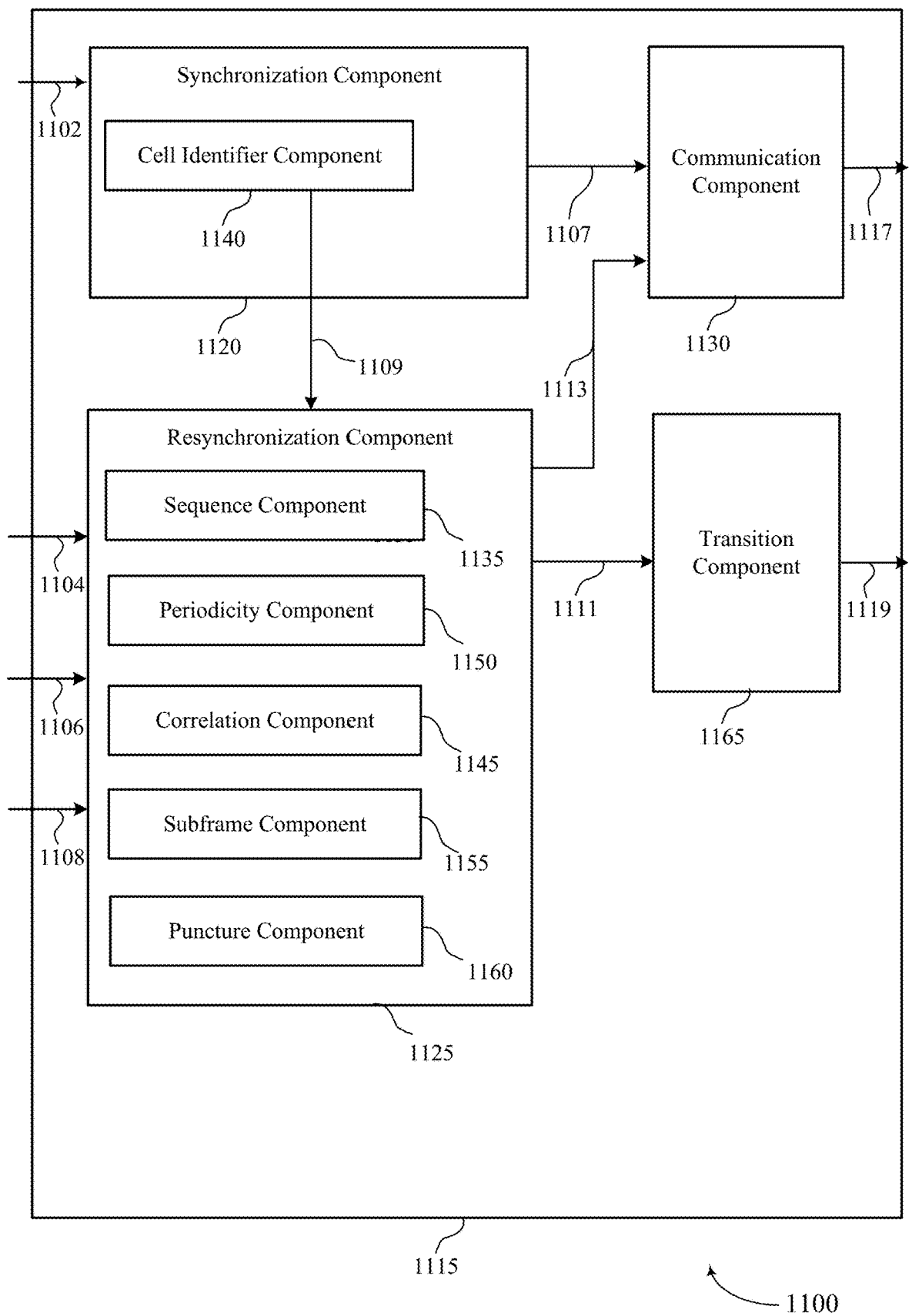

FIG. 11A shows a block diagram 1100 of a UE communications manager 1115 that supports resynchronization signal design in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include synchronization component 1120, resynchronization component 1125, communication component 1130, sequence component 1135, cell identifier component 1140, correlation component 1145, periodicity component 1150, subframe component 1155, puncture component 1160, and transition component 1165. Each of these modules may communicate, directly or indirectly, with one another (e.g., via one or more buses).

Synchronization component 1120 may receive a first synchronization signal 1102 for synchronizing with a cell, the first synchronization signal 1102 transmitted according to a first periodicity by a base station serving the cell. The synchronization component 1120 may determine first synchronization information 1107 and pass the first synchronization information 1107 to communication component 1130. In some cases, the synchronization component 1120 may pass the first synchronization information 1107 to cell identifier component 1140.

Cell identifier component 1140 may determine the cell identifier of the base station from the first synchronization information 1107. In some cases, the cell identifier component 1140 may pass the determined cell identifier 1109 to resynchronization component 1125. The resynchronization component 1125 may in turn pass the cell identifier 1109 to the sequence component 1135 and the correlation component 1145.

Resynchronization component 1125 may receive, subsequent to the synchronizing, a second synchronization signal 1104 for resynchronizing with the cell, the second synchronization signal 1104 transmitted by the base station according to a second periodicity, where the second synchronization signal 1104 includes a set of repetitions of a first sequence that is based on a cell identifier of the cell. The second periodicity may be configured separately from and may be different than the first periodicity. In some cases, the second synchronization signal includes a set of repetitions of a second sequence, and where the set of repetitions of the first sequence and the set of repetitions of the second sequence are transmitted according to a binary sequence. The resynchronization component 1125 may determine second synchronization information 1113 based on the second synchronization signal 1104 and may pass the second synchronization information 1113 to communication component 1130. Second synchronization information 1113 may include signal 1111 indicating synchronization of the device.

In some examples, the first synchronization signal 1102 may span a plurality of PRBs and the second synchronization signal 1104 may span the plurality of PRBs. In some examples, the first synchronization signal 1102 may span a plurality of PRBs and the second synchronization signal 1104 may span a subset of the plurality of PRBs. In some examples, a transmission power associated with the second synchronization signal 1104 may be increased relative to a transmission power associated with the first synchronization signal 1102 by a ratio of a first number of PRBs in the plurality of PRBs to a second number of PRBs in the subset of the plurality of PRBs. In some cases, the subset of the plurality of PRBs correspond to a contiguous set of PRBs. In some cases, the subset of the plurality of PRBs correspond to a non-contiguous set of PRBs.

In some cases, the resynchronization component 1125 may receive a third synchronization signal 1106 for the resynchronizing with the cell, the third synchronization signal 1106 being transmitted by the base station over the cell subsequent to the second synchronization signal 1104 and having a sequence length longer than a sequence length of the first sequence. The resynchronization component 1125 may determine the second synchronization information 1113 based on the third synchronization signal 1106 and may pass the second synchronization information 1113 to communication component 1130. In some cases, the sequence length of the third synchronization signal 1106 is shorter than a sequence length of the second synchronization signal 1104.

In some examples, the resynchronization component 1125 may receive, from the base station, a resynchronization signal configuration 1108 for a neighbor cell, the resynchronization signal configuration 1108 including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal. In some cases, the resynchronization component 1125 may determine the second synchronization information 1113 based on the resynchronization signal configuration 1108 and may pass the second synchronization information 1113 to communication component 1130. In some cases, the resynchronization signal configuration 1108 is received in system information or in dedicated signaling from the base station.

Sequence component 1135 may receive the cell identifier 1109 from the cell identifier component 1140. The sequence component 1135 may identify the binary sequence for the second synchronization signal 1104 based on a length of the second synchronization signal 1104 or the cell identifier 1109. In some cases, the first sequence includes a first subsequence and a second subsequence. In some cases, the second subsequence corresponds to a complex conjugate of the first subsequence. In some cases, the first sequence and the second sequence have low absolute value of cross-correlation with each other. In some cases, the second sequence corresponds to a complex conjugate of the first sequence.

In some cases, the first sequence corresponds to a PN sequence, a Zadoff-Chu sequence, or a result of a Kronecker product of a subsequence with a binary sequence. In some cases, the subsequence corresponds to a PN sequence or a Zadoff-Chu sequence. In some cases, the binary sequence corresponds to a maximum length sequence, a Barker code, or a Gold sequence.

Correlation component 1145 may receive the cell identifier 1109. The correlation component 1145 may correlate the second synchronization signal 1104 for the resynchronizing using a representation of the first sequence determined based on the cell identifier 1109.

Periodicity component 1150 may determine the second periodicity based on an association between the length of the second synchronization signal 1104 received in the system information and the second periodicity, and may determine the length of the second synchronization signal based on an association between the second periodicity received in the system information and the length of the second synchronization signal 1104. In some cases, the association between the length of the second synchronization signal 1104 received in the system information and the second periodicity is determined based on the multiplicative factor. In some cases, the association between the second periodicity received in the system information and the length of the second synchronization signal 1104 is determined based on the overhead percentage. The resynchronization component 1125 may determine the second synchronization information 1113 based on the second synchronization signal 1104 and the second periodicity determined by the periodicity component 1150.

Subframe component 1155 may modify the set of scheduled subframes for the receiving the second synchronization signal 1104 by the resynchronization component 1125. In some cases, the receiving the second synchronization signal 1104 includes: identifying that at least one of a set of scheduled subframes for the second synchronization signal 1104 coincides with a subframe that is restricted for transmission of the second synchronization signal 1104. The subframe component 1155 may pass the modified set of scheduled subframes in the second synchronization information 1113 to the communication component 1130. In some cases, the restricted subframe includes one of a multicast subframe, an MTC invalid subframe, a TDD uplink subframe, or a TDD special subframe. In some cases, the modifying the set of scheduled subframes includes selecting a modification action from the group including postponing the at least one of the set of scheduled subframes to a next subframe after the restricted subframe, suppressing reception of the at least one of the set of scheduled subframes for the restricted subframe, and receiving a portion of the at least one of the set of scheduled subframes in the restricted subframe. In some cases, the selecting the modification action is based on a TDD special subframe configuration.

Puncture component 1160 may determine that the second synchronization signal 1104 is punctured. In some cases, the second synchronization signal 1104 may be punctured by at least one of a reference signal, the first synchronization signal 1102, or a broadcast channel.

Communication component 1130 may receive the first synchronization information 1107 and the second synchronization information 1113. In some cases, the communication component 1130 may receive the modified set of scheduled subframes via the second synchronization information 1113. The communication component 1130 may communicate over the cell (e.g., perform a random access procedure or other connection procedure) with the base station based on the resynchronizing (e.g., second synchronization information 1113). In some examples, the communication component 1130 may pass communication information 1117 to other components within wireless device for further processing.

Transition component 1165 may receive signal 1111 indicating synchronization of the device. In some cases, the transition component 1165 may transition, subsequent to the synchronizing, out of a connected mode with the base station. In some examples, the transition component 1165 may pass communication information 1119 to other components within wireless device for further processing.

Figure 11B:
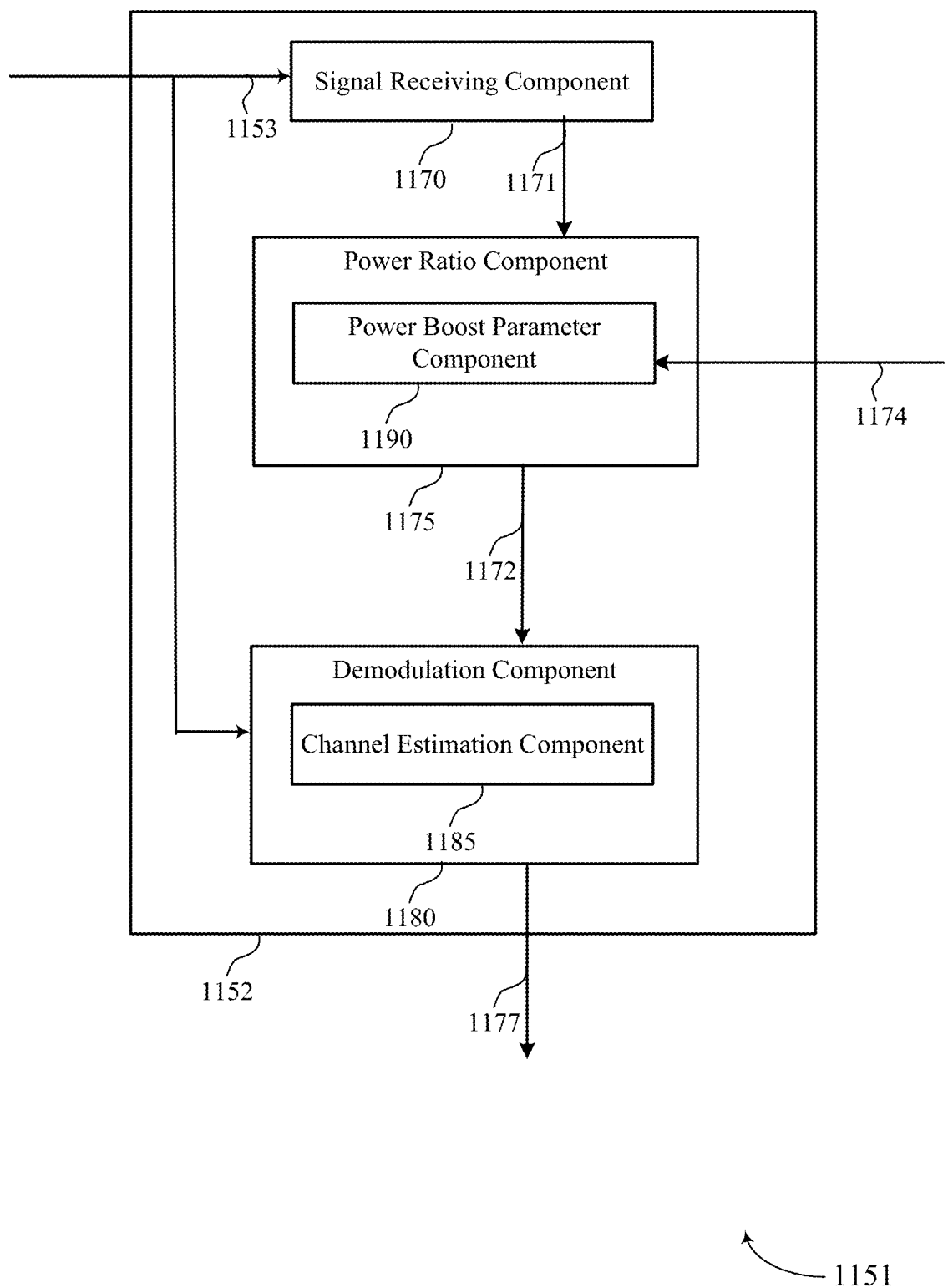

FIG. 11B shows a block diagram 1151 of a UE communications manager 1152 that supports resynchronization signal design in accordance with aspects of the present disclosure. The UE communications manager 1152 may be an example of aspects of a UE communications manager 915, a UE communications manager 1015, UE communications manager 1115, or a UE communications manager 1215 described with reference to FIGS. 9, 10, 11A, and 12. The UE communications manager 1152 may include signal receiving component 1170, power ratio component 1175, demodulation component 1180, channel estimation component 1185, and power boost parameter component 1190. Each of these modules may communicate, directly or indirectly, with one another (e.g., via one or more buses).

The signal receiving component 1170 may receive a signal 1153 mapped to a first subset of resource elements of a time-frequency resource block and a set of reference signals 1153 mapped to a second subset of the resource elements of the time-frequency resource block, where the first subset of resource elements include a subset of resource elements of a first symbol period of the time-frequency resource block, and each resource element of a second symbol period of the time-frequency resource block.

In some cases, the signal 1153 includes a resynchronization signal that includes a set of repetitions of a first sequence that is based on a cell identifier of a cell. In some cases, the signal 1153 includes a wake-up signal transmitted prior to an associated paging occasion for the UE. The signal receiving component 1170 may determine a signal 1171 based on the signal 1153 mapped to the first subset of resource elements of a time-frequency resource block and the set of reference signals 1153 mapped to the second subset of the resource elements. The signal receiving component 1170 may pass the signal 1171 to the power ratio component 1175 via signal 1171.

The power ratio component 1175 may receive the signal 1171 including the signal 1153 mapped to the first subset of resource elements of a time-frequency resource block and the set of reference signals 1153 mapped to the second subset of the resource elements via signal 1171. The power ratio component 1175 may identify a power ratio 1172 between each of the first subset of resource elements and the set of reference signals based on a number of antenna ports of the set of reference signals. In some examples, the power ratio component 1175 may evaluate a function of a first power ratio between the set of reference signals and resource elements of a data channel for the first symbol period and a second power ratio between the set of reference signals and resource elements of the data channel for the second symbol period.

In some cases, the function includes a minimum of the first power ratio and the second power ratio. In some cases, the function includes a maximum of the first power ratio and the second power ratio. In some cases, the function includes a sum of a product of the first power ratio with a first scaling factor and a product of the second power ratio with a second scaling factor.

In some cases, a first power ratio between the set of reference signals and resource elements of a data channel is configured for the first symbol period and a second power ratio between the set of reference signals and resource elements of the data channel is configured for the second symbol period, and where, for a first subset of values of a system information parameter, the power ratio corresponds to the first power ratio, and for a second subset of values of the system information parameter, the power ratio 1172 corresponds to the second power ratio.

In some cases, the identifying the power ratio 1172 is independent of a first power ratio between the set of reference signals and resource elements of a data channel for the first symbol period and a second power ratio between the set of reference signals and resource elements of the data channel for the second symbol period. In some cases, the power ratio 1172 is based on a per port power ratio for each of the number of antenna ports. In some cases, each of the number of antenna ports is associated with a single radio frequency (RF) chain at a transmitter of the signal. The power ratio component 1175 may pass the determined power ratio 1172 to the demodulation component 1180 and the channel estimation component 1185.

The power boost parameter component 1190 may receive a power boost parameter 1174 associated with the signal 1153, the power boost parameter 1174 indicating a configurable increase of a transmit power for the signal. In some examples, identifying the power ratio 1172 is based on the power boost parameter 1174.

The demodulation component 1180 may receive the signal 1153 and may receive the determined power ratio 1172 from the power ratio component 1175. The demodulation component 1180 may demodulate the signal 1153 based on the power ratio 1172. In some examples, the demodulation component 1180 may pass demodulated signal 1177 to other components within the wireless device (e.g., a decoder, etc.) for further processing.

The channel estimation component 1185 may receive the determined power ratio 1172 from the power ratio component 1175. The channel estimation component 1185 may perform channel estimation or a channel measurement using the signal 1153 based on the power ratio 1172. In some examples, the channel estimation component 1185 may pass channel measurement 1177 to other components within wireless device for further processing.

Figure 12:
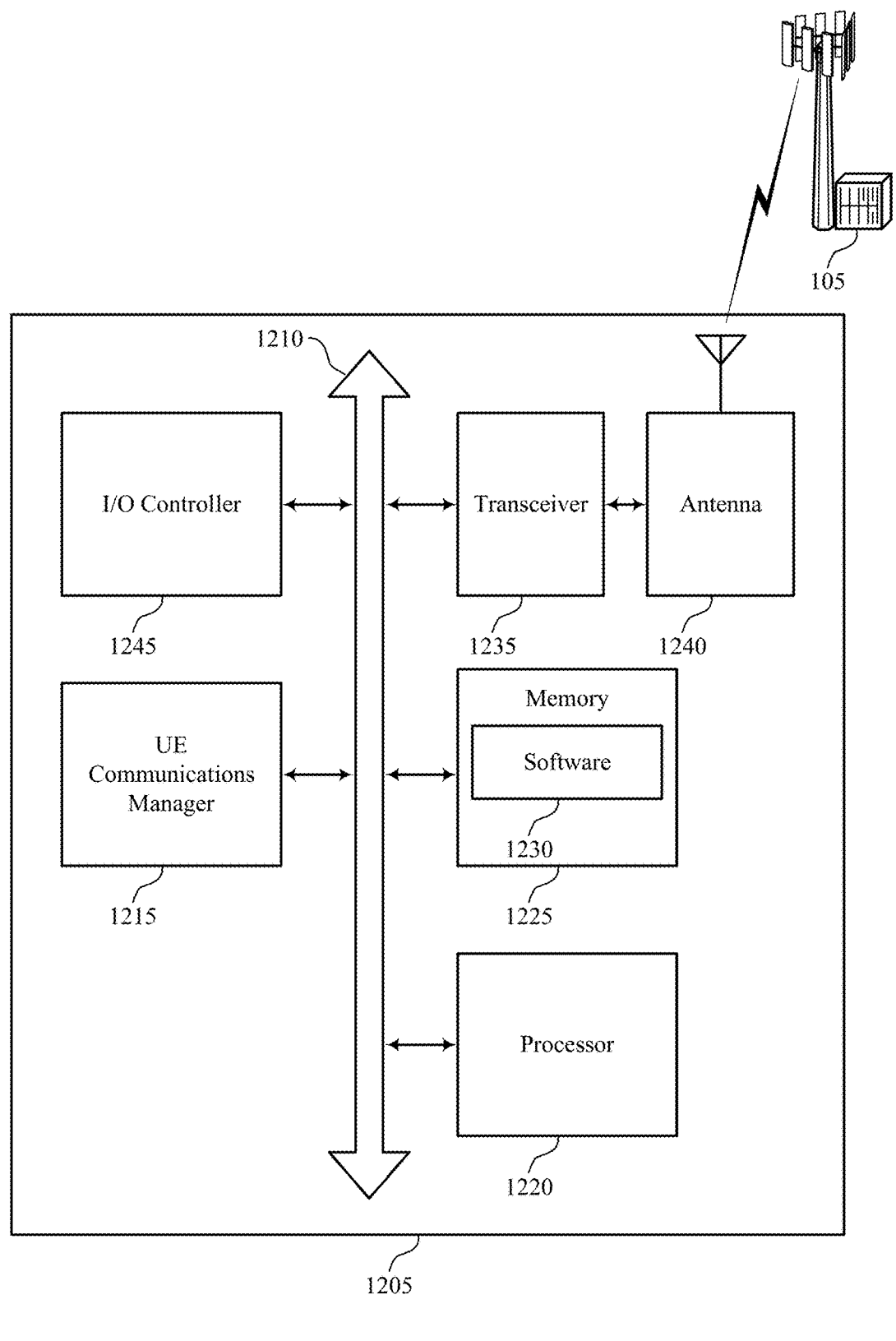
FIG. 12 illustrates a block diagram of a system including a UE that supports resynchronization signal design in accordance with aspects of the present disclosure.

FIG. 12 shows a diagram of a system 1200 including a device 1205 that supports resynchronization signal design in accordance with aspects of the present disclosure. Device 1005 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting resynchronization signal design).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support resynchronization signal design. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
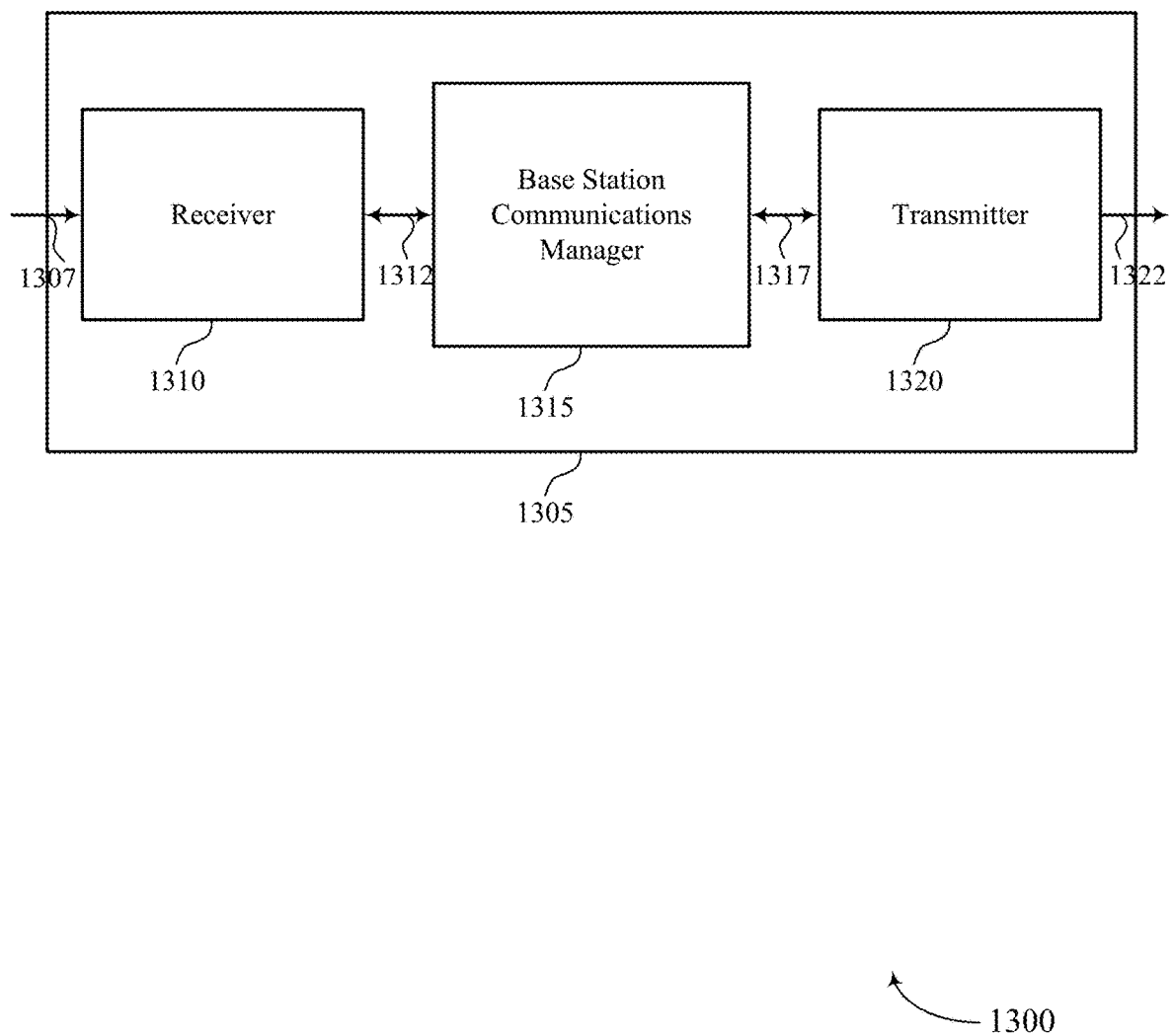
FIGS. 13 through 15B show block diagrams of a device that supports resynchronization signal design in accordance with aspects of the present disclosure.

FIG. 13 shows a block diagram 1300 of a wireless device 1305 that supports resynchronization signal design in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive signaling 1307 via one or more antennas and may perform various operations to process the signaling (e.g., down-conversion, analog-to-digital conversion, filtering, baseband processing, etc.). This information may be passed on to other components of the device. The receiver 1310 may receive information such as packets, user data, or control information associated with various information channels (e.g., control channels, data channels, and information related to resynchronization signal design, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16. Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may receive a signal 1312, which may be a representation of signal 1307 and may include a first synchronization signal and a second synchronization signal. The base station communications manager 1315 may transmit a first synchronization signal for the cell, the first synchronization signal transmitted according to a first periodicity, transmit a second synchronization signal for the cell, the second synchronization signal transmitted according to a second periodicity that is different from the first periodicity, where the second synchronization signal includes a set of repetitions of a first sequence that is based on a cell identifier of the cell, and communicate with at least one UE over the cell based on the transmission of the first synchronization signal or the second synchronization signal.

The base station communications manager 1315 may map a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block, identify a power ratio between each of the first subset of resource elements and the set of reference signals based on a number of antenna ports of the set of reference signals, and transmit the signal and the set of reference signals based on the power ratio. In some cases, the base station communications manager 1315 may pass information 1317 to transmitter 1320. The base station communications manager 1315 may be an example of aspects of the base station communications manager 1415 described herein.

Transmitter 1320 may transmit signals 1322 generated by or received from other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Transmitter 1320 transmit the first subsequence via a first antenna port and the second subsequence via a second antenna port, transmit the first sequence via a first antenna port and the second sequence via a second antenna port, and transmit system information associated with the cell, the system information indicating at least one of a presence of the second synchronization signal, timing information for the second synchronization signal (e.g., the second periodicity, a timing offset from the first synchronization signal), a length of the second synchronization signal, a frequency offset and/or a frequency location for the second synchronization signal, a transmit power for the second synchronization signal, a bandwidth of the second synchronization signal, a hopping pattern for the second synchronization signal, a multiplicative factor for the second periodicity, or an overhead percentage.

Figure 14:
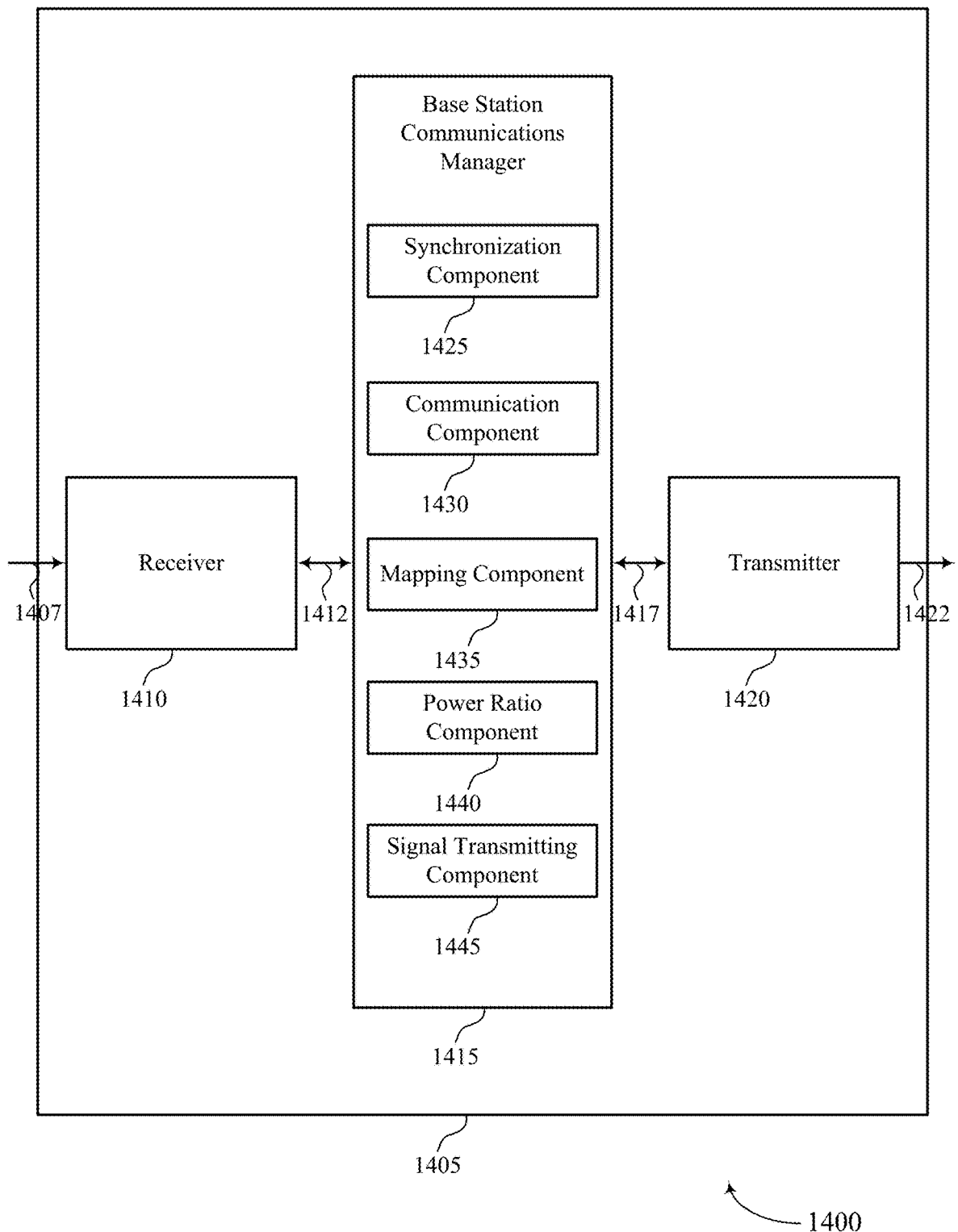

FIG. 14 shows a block diagram 1400 of a wireless device 1405 that supports resynchronization signal design in accordance with aspects of the present disclosure. Wireless device 1405 may be an example of aspects of a wireless device 1305 or a base station 105 as described with reference to FIG. 10. Wireless device 1405 may include receiver 1410, base station communications manager 1415, and transmitter 1420. Wireless device 1305 may also include a processor. Each of these components may be in communication with one another (e.g., via one or more buses).

Receiver 1410 may receive may receive signaling 1407 via one or more antennas. In some cases, the signaling 1407 may include information such as packets, user data, or control information associated with various information channels (e.g., control channels, data channels, and information related to resynchronization signal design, etc.). Information may be passed on to other components of the device. The receiver 1410 may be an example of aspects of the transceiver 1635 described with reference to FIG. 16. The receiver 1410 may utilize a single antenna or a set of antennas. Receiver 1410 may pass along signal 1407, or a representation of signaling 1407 (e.g., filtered, digitized, etc.), in signal 1412 to base station communications manager 1415.

Base station communications manager 1415 may be an example of aspects of the base station communications manager 1615 described with reference to FIG. 16. Base station communications manager 1415 may also include synchronization component 1425, communication component 1430, mapping component 1435, power ratio component 1440, and signal transmitting component 1445.

Synchronization component 1425 may transmit a first synchronization signal for a cell, the first synchronization signal transmitted according to a first periodicity, transmit a second synchronization signal for the cell, the second synchronization signal transmitted according to a second periodicity, where the second synchronization signal includes a set of repetitions of a first sequence that is based on a cell identifier of the cell. In some cases, the second periodicity is different from the first periodicity. In some cases, the synchronization component 1425 may transmit a third synchronization signal for the cell subsequent to the second synchronization signal, the third synchronization signal having a sequence length longer than a sequence length of the first sequence. In some examples, the synchronization component 1425 may transmit, to the at least one UE, a resynchronization signal configuration for a neighbor cell, the resynchronization signal configuration including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal. In some cases, the second synchronization signal includes a set of repetitions of a second sequence, and where the set of repetitions of the first sequence and the set of repetitions of the second sequence are transmitted according to a binary sequence. In some cases, the resynchronization signal configuration is transmitted in system information or in dedicated signaling from the base station to the at least one UE.

In some examples, the first synchronization signal may span a plurality of PRBs and the second synchronization signal may span the plurality of PRBs. In some examples, the first synchronization signal may span a plurality of PRBs and the second synchronization signal may span a subset of the plurality of PRBs. In some examples, a transmission power associated with the second synchronization signal may be increased relative to a transmission power associated with the first synchronization signal by a ratio of a first number of PRBs in the plurality of PRBs to a second number of PRBs in the subset of the plurality of PRBs. In some cases, the subset of the plurality of PRBs may correspond to a contiguous set of PRBs. In some cases, the subset of the plurality of PRBs may correspond to a non-contiguous set of PRBs.

Communication component 1430 may communicate with at least one UE over the cell based on the transmission of the first synchronization signal or the second synchronization signal. For example, the communication component 1430 may pass information associated with the first synchronization signal and the second synchronization signal to transmitter 1420 via signal 1417.

The mapping component 1435 may map a signal to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block.

The power ratio component 1440 may identify a power ratio between each of the first subset of resource elements and the set of reference signals based on a number of antenna ports of the set of reference signals. The signal transmitting component 1445 may transmit the signal and the set of reference signals based on the power ratio. For example, the signal transmitting component 1445 may include the signal and the set of reference signals in signal 1417, and pass the signal 1417 to transmitter 1420.

Transmitter 1420 may transmit signals 1422 generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15A:
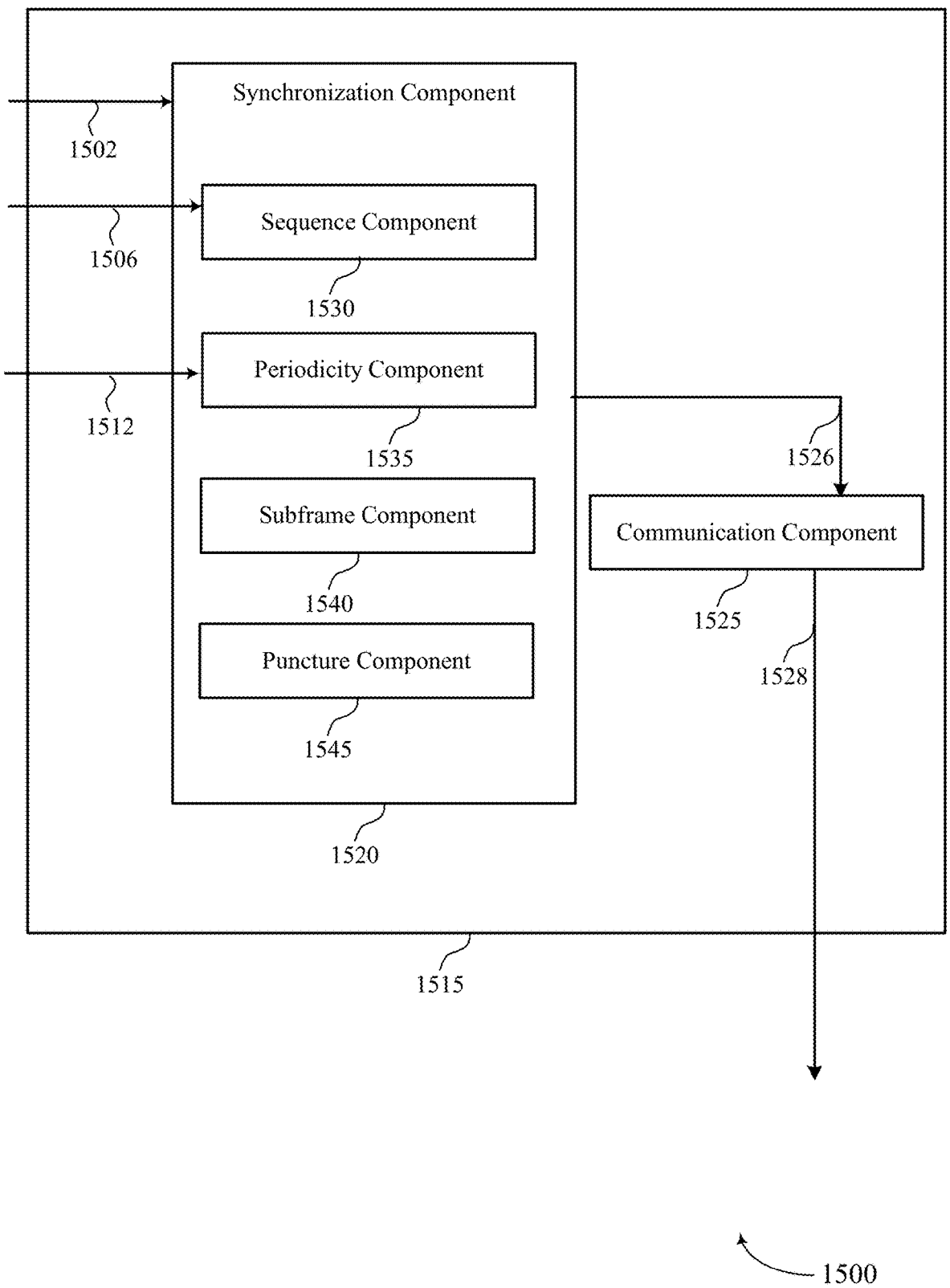

FIG. 15A shows a block diagram 1500 of a base station communications manager 1515 that supports resynchronization signal design in accordance with aspects of the present disclosure. The base station communications manager 1515 may be an example of aspects of a base station communications manager 1615 described with reference to FIGS. 12, 13, and 16. The base station communications manager 1515 may include synchronization component 1520, communication component 1525, sequence component 1530, periodicity component 1535, subframe component 1540, and puncture component 1545. Each of these modules may communicate, directly or indirectly, with one another (e.g., via one or more buses).

Synchronization component 1520 may receive synchronization signal information 1502. The synchronization component 1520 may determine a first synchronization signal and a second synchronization signal based on the synchronization signal 1502. The synchronization component 1520 may transmit the first synchronization signal for the cell, the first synchronization signal transmitted according to a first periodicity, and transmit the second synchronization signal for the cell, the second synchronization signal transmitted according to a second periodicity, where the second synchronization signal includes a set of repetitions of a first sequence that is based on a cell identifier of the cell. In some cases, the second periodicity is different from the first periodicity. In some cases, the synchronization component 1520 may send the first synchronization signal and the second synchronization signal to the communication component 1525 via signal 1526.

The synchronization component 1520 may transmit a third synchronization signal for the cell subsequent to the second synchronization signal, the third synchronization signal having a sequence length longer than a sequence length of the first sequence, and transmit, to the at least one UE, a resynchronization signal configuration for a neighbor cell, the resynchronization signal configuration including at least one of a presence of a resynchronization signal for the neighbor cell, a periodicity for the resynchronization signal, a length of the resynchronization signal, a timing offset for the resynchronization signal, a frequency offset for the resynchronization signal, a transmit power for the resynchronization signal, a bandwidth of the resynchronization signal, or a hopping pattern for the resynchronization signal. In some cases, the synchronization component 1520 may determine the third synchronization signal and the resynchronization signal based on synchronization information 1502. In some cases, the second synchronization signal includes a set of repetitions of a second sequence, and where the set of repetitions of the first sequence and the set of repetitions of the second sequence are transmitted according to a binary sequence. In some cases, the resynchronization signal configuration is transmitted in system information or in dedicated signaling from the base station to the at least one UE.

Sequence component 1530 may receive a cell identifier 1506. The sequence component 1530 may identify the binary sequence based on the length of the second synchronization signal or the cell identifier 1506. In some cases, the first sequence includes a first subsequence and a second subsequence. In some cases, the second subsequence corresponds to a complex conjugate of the first subsequence. In some cases, the first sequence and the second sequence have low absolute value of cross-correlation with each other. In some cases, the second sequence corresponds to a complex conjugate of the first sequence. In some cases, the sequence length of the third synchronization signal is shorter than a sequence length of the second synchronization signal. In some cases, the first sequence corresponds to a PN sequence, a Zadoff-Chu sequence, or a result of a Kronecker product of a subsequence with a binary sequence. In some cases, the subsequence corresponds to a PN sequence or a Zadoff-Chu sequence. In some cases, the binary sequence corresponds to a maximum length sequence, a Barker code, or a Gold sequence.

Periodicity component 1535 may receive system information 1512. The periodicity component 1535 may determine the second periodicity based on an association between the length of the second synchronization signal indicated in the system information 1512 and the second periodicity and determine the length of the second synchronization signal based on an association between the second periodicity indicated in the system information 1512 and the length of the second synchronization signal. In some cases, the association between the length of the second synchronization signal received in the system information 1512 and the second periodicity is determined based on the multiplicative factor. In some cases, the association between the second periodicity received in the system information 1512 and the length of the second synchronization signal is determined based on the overhead percentage.

Subframe component 1540 may identify that at least one of a set of scheduled subframes for the second synchronization signal coincides with a subframe that is restricted for of the second synchronization signal and modify the set of scheduled subframes for the transmitting the second synchronization signal. In some cases, the restricted subframe includes one of a multicast subframe, an MTC invalid subframe, a TDD uplink subframe, or a TDD special subframe. In some cases, the modifying the set of scheduled subframes includes selecting a modification action from the group including postponing the at least one of the set of scheduled subframes to a next subframe after the restricted subframe, suppressing transmission of the at least one of the set of scheduled subframes for the restricted subframe, and transmitting a portion of the at least one of the set of scheduled subframes in the restricted subframe. In some cases, the selecting the modification action is based on a TDD special subframe configuration.

Puncture component 1545 may puncture the second synchronization signal with at least one of a reference signal, the first synchronization signal, or a broadcast channel. Communication component 1525 may receive the first synchronization signal and the second synchronization signal via signal 1526. The communication component 1525 may communicate with at least one UE over the cell based on the transmission of the first synchronization signal or the second synchronization signal. In some cases, the communication component 1525 may communicate via signal 1528.

Figure 15B:
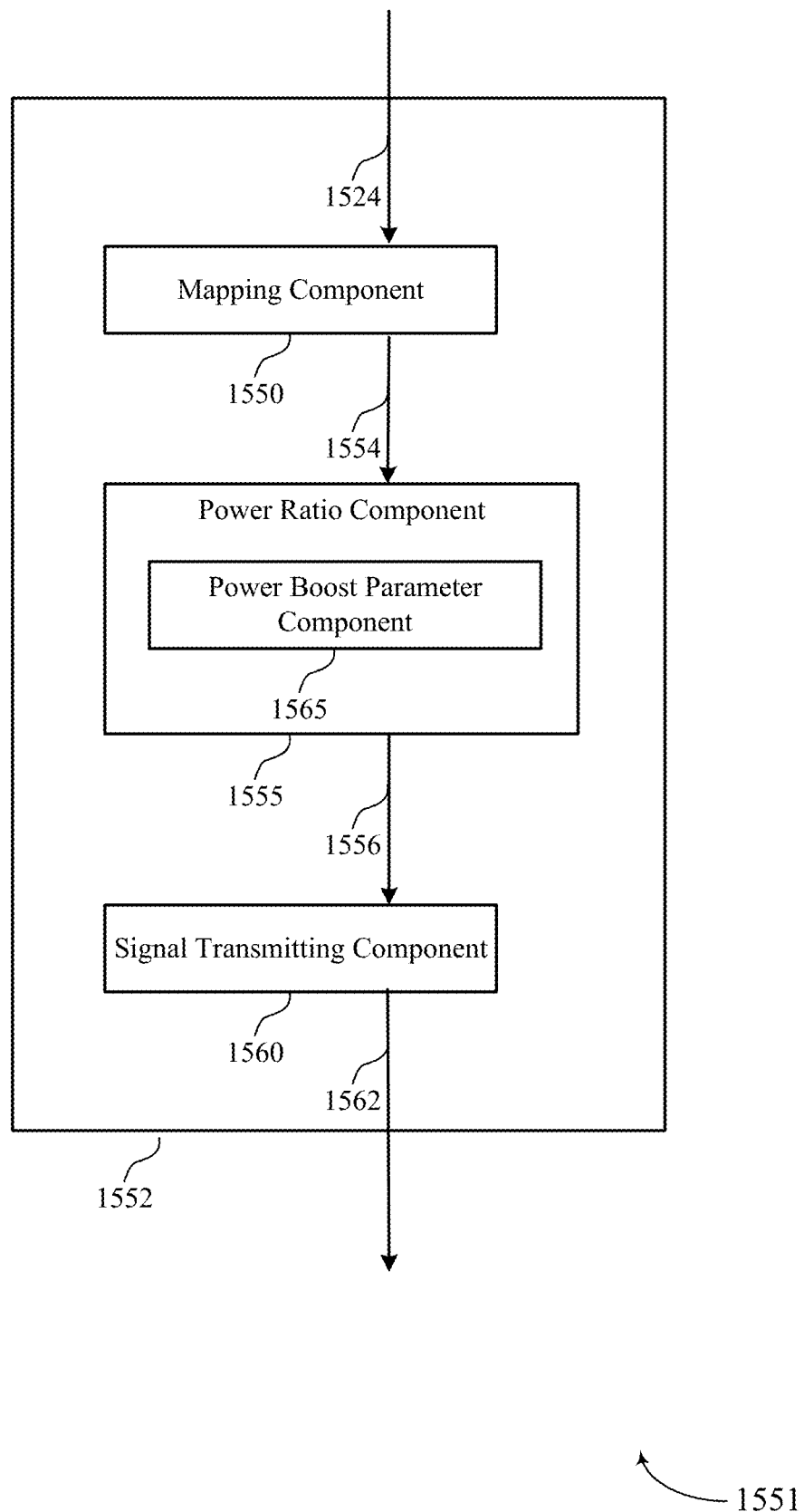

FIG. 15B shows a block diagram 1551 of a base station communications manager 1552 that supports resynchronization signal design in accordance with aspects of the present disclosure. The base station communications manager 1552 may be an example of aspects of a base station communications manager 1315, or base station communications manager 1515, or base station communications manager 1615 described with reference to FIGS. 13, 15A and 16. The base station communications manager 1515 may include mapping component 1550, power ratio component 1555, signal transmitting component 1560, and power boost parameter component 1565. Each of these modules may communicate, directly or indirectly, with one another (e.g., via one or more buses).

The mapping component 1550 may receive signal 1524 and may map the signal 1524 to a first subset of resource elements of a time-frequency resource block and a set of reference signals to a second subset of the resource elements of the time-frequency resource block, where the first subset of resource elements include a subset of resource elements of a first symbol period of the time-frequency resource block, and each resource element of a second symbol period of the time-frequency resource block. In some cases, a first reference signal of the set of reference signals is mapped to a first resource element of the time-frequency resource block and a second reference signal of the set of reference signals is mapped to a second resource element of the time-frequency resource block. The mapping component 1550 may pass the mapped signal 1554 to the power ratio component 1555.

The power ratio component 1555 may identify a power ratio 1556 between each of the first subset of resource elements and the set of reference signals based on a number of antenna ports of the set of reference signals. In some examples, the power ratio component 1555 may evaluate a function of a first power ratio between the set of reference signals and resource elements of a data channel for the first symbol period and a second power ratio between the set of reference signals and resource elements of the data channel for the second symbol period.

In some cases, the function includes a minimum of the first power ratio and the second power ratio. In some cases, the function includes a maximum of the first power ratio and the second power ratio. In some cases, the function includes a sum of a product of the first power ratio with a first scaling factor and a product of the second power ratio with a second scaling factor.

In some cases, a first power ratio between the set of reference signals and resource elements of a data channel is configured for the first symbol period and a second power ratio between the set of reference signals and resource elements of the data channel is configured for the second symbol period, and where, for a first subset of values of a system information parameter, the power ratio 1556 corresponds to the first power ratio, and for a second subset of values of the system information parameter, the power ratio 1556 corresponds to the second power ratio.

In some cases, the identifying the power ratio 1556 is independent of a first power ratio between the set of reference signals and resource elements of a data channel for the first symbol period and a second power ratio between the set of reference signals and resource elements of the data channel for the second symbol period. In some cases, the power ratio 1556 is based on a per port power ratio for each of the number of antenna ports. In some cases, each of the number of antenna ports is associated with a single RF chain at the base station. The power ratio component 1555 may pass the determined power ratios 1556 to signal transmitting component 1560.

The power boost parameter component 1565 may configure a power boost parameter associated with the signal, the power boost parameter indicating a configurable increase of a transmit power for the signal. In some examples, identifying the power ratio 1556 is based on the power boost parameter. In some cases, the power boost parameter is based on a number of blanked time-frequency resource blocks.

The signal transmitting component 1560 may transmit the signal and the set of reference signals based on the power ratio 1565. In some cases, the transmitting includes transmitting, via a first antenna port, the first reference signal via the first resource element and a null symbol via the second resource element and transmitting, via a second antenna port, the second reference signal via the second resource element and a null symbol via the first resource element. In some cases, the signal includes a resynchronization signal that includes a set of repetitions of a first sequence that is based on a cell identifier of a cell. In some cases, the signal includes a wake-up signal transmitted prior to a paging occasion. The signal transmitting component 1560 may transmit the signal and the set of reference signals via signal 1562.

Figure 16:
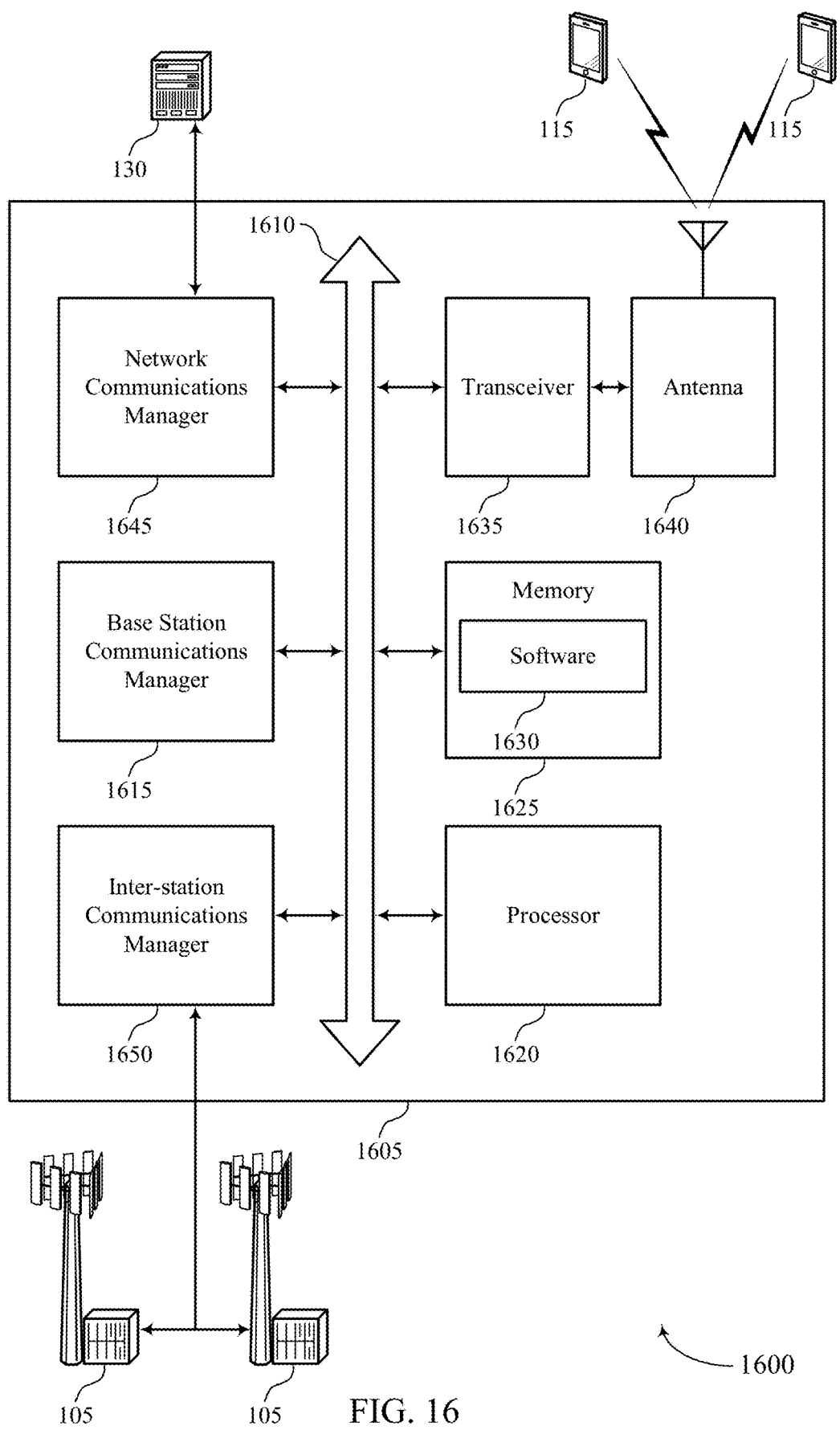
FIG. 16 illustrates a block diagram of a system including a base station that supports resynchronization signal design in accordance with aspects of the present disclosure.

FIG. 16 shows a diagram of a system 1600 including a device 1605 that supports resynchronization signal design in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting resynchronization signal design).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support resynchronization signal design. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas. In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an LTE/LTE-A wireless communication network technology to provide communication between base stations 105.

Figure 17:
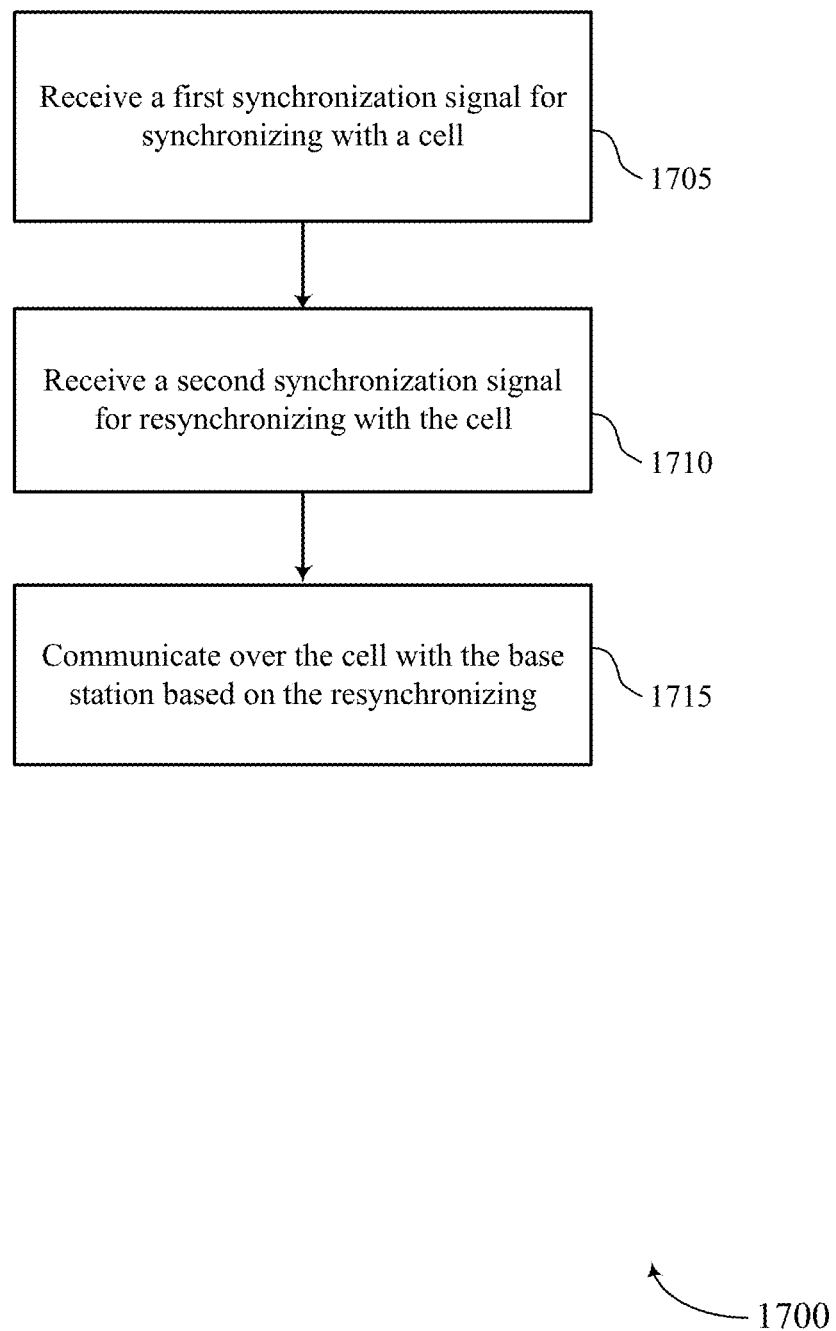
FIGS. 17 through 23 illustrate methods for resynchronization signal design in accordance with aspects of the present disclosure.

FIG. 17 shows a flowchart illustrating a method 1700 for resynchronization signal design in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a first synchronization signal for synchronizing with a cell. In some cases, the first synchronization signal may be transmitted according to a first periodicity by a base station serving the cell. In some cases, the first synchronization signal spans a plurality of PRBs. The operations of 1705 may be performed according to the methods described herein. In certain examples, aspects of the operations of 1705 may be performed by a synchronization component as described with reference to FIGS. 9 through 12.

At 1710 the UE 115 may receive a second synchronization signal for resynchronizing with the cell. In some examples, the second synchronization signal may be received subsequent to the synchronizing. In some cases, the second synchronization signal transmitted by the base station according to a second periodicity that is different from the first periodicity. In some cases, the second synchronization signal may include a plurality of repetitions of a first sequence that is based on a cell identifier of the cell. In some cases, the second synchronization signal may include a plurality of repetitions of a second sequence. The plurality of repetitions of the first sequence and the plurality of repetitions of the second sequence may be transmitted according to a binary sequence. The operations of 1710 may be performed according to the methods described herein. In certain examples, aspects of the operations of 1710 may be performed by a resynchronization component as described with reference to FIGS. 9 through 12.

At 1715 the UE 115 may communicate over the cell with the base station based on the resynchronizing. The operations of 1715 may be performed according to the methods described herein. In certain examples, aspects of the operations of 1715 may be performed by a communication component as described with reference to FIGS. 9 through 12.

Figure 18:
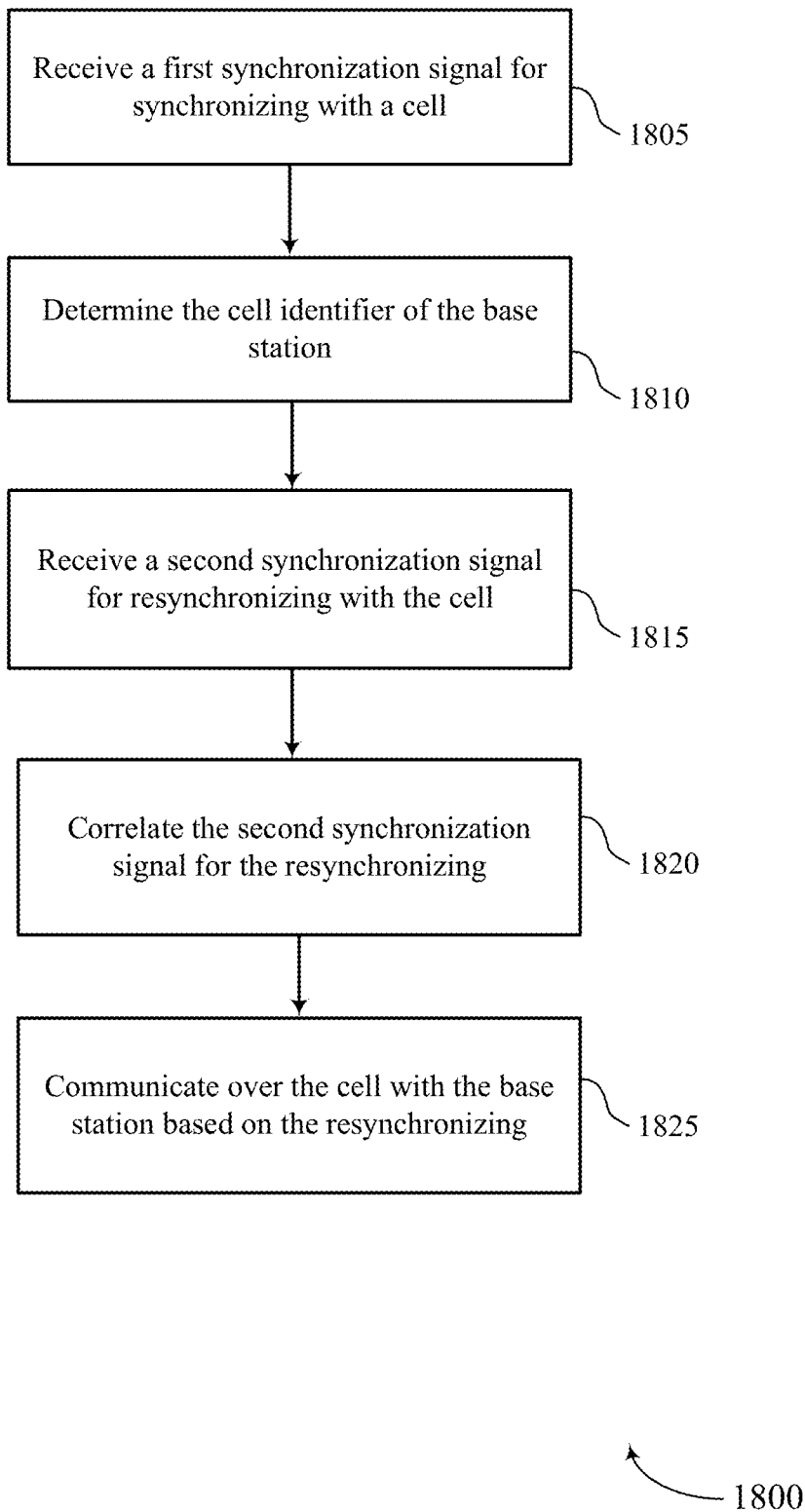

FIG. 18 shows a flowchart illustrating a method 1800 for resynchronization signal design in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a first synchronization signal for synchronizing with a cell. As previously described with reference to FIG. 16, the first synchronization signal may be transmitted according to a first periodicity by a base station serving the cell. The operations of 1805 may be performed according to the methods described herein. In certain examples, aspects of the operations of 1805 may be performed by a synchronization component as described with reference to FIGS. 9 through 12.

At 1810 the UE 115 may determine the cell identifier of the base station. In some cases, the UE 115 may determine the cell identifier of the base station from the first synchronization signal. The operations of 1810 may be performed according to the methods described herein. In certain examples, aspects of the operations of 1810 may be performed by a cell identifier component as described with reference to FIGS. 9 through 12.

At 1815 the UE 115 may receive a second synchronization signal for resynchronizing with the cell. In some cases, the second synchronization signal may be transmitted by the base station according to a second periodicity. In some cases, the second periodicity may be different from the first periodicity. In some cases, the second synchronization signal may include a plurality of repetitions of a first sequence that is based on a cell identifier of the cell. The operations of 1815 may be performed according to the methods described herein. In certain examples, aspects of the operations of 1815 may be performed by a resynchronization component as described with reference to FIGS. 9 through 12.

At 1820 the UE 115 may correlate the second synchronization signal for the resynchronizing. In some cases, the UE 115 may correlate the second synchronization signal using a representation of the first sequence determined based on the cell identifier. The operations of 1820 may be performed according to the methods described herein. In certain examples, aspects of the operations of 1820 may be performed by a correlation component as described with reference to FIGS. 9 through 12.

At 1825 the UE 115 may communicate over the cell with the base station based on the resynchronizing. The operations of 1825 may be performed according to the methods described herein. In certain examples, aspects of the operations of 1825 may be performed by a communication component as described with reference to FIGS. 9 through 12.

Figure 19:
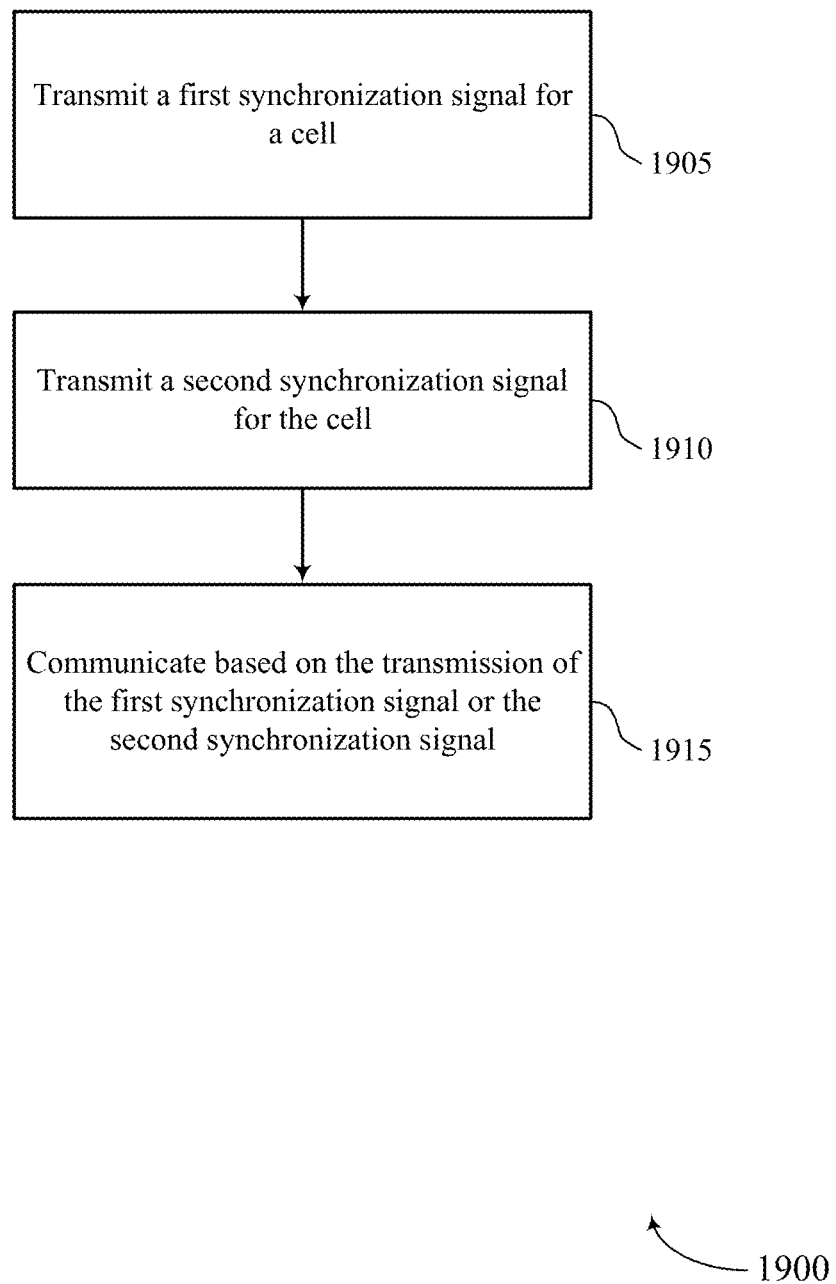

FIG. 19 shows a flowchart illustrating a method 1900 for resynchronization signal design in accordance with aspects of the present disclosure. The operations of method 1900 may be implemented by a base station 105 or its components as described herein. For example, the operations of method 1900 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 1905 the base station 105 serving a cell, may transmit a first synchronization signal for the cell. In some cases, the first synchronization signal may be transmitted according to a first periodicity. The operations of 1905 may be performed according to the methods described herein. In certain examples, aspects of the operations of 1905 may be performed by a synchronization component as described with reference to FIGS. 13 through 16.

At 1910 the base station 105 may transmit a second synchronization signal for the cell, the second synchronization signal transmitted according to a second periodicity that is different from the first periodicity. In some cases, the second synchronization signal may include a plurality of repetitions of a first sequence that is based on a cell identifier of the cell. The base station 105 may identify the cell identifier of the serving cell, and may transmit the second synchronization signal based on the cell identifier. The operations of 1910 may be performed according to the methods described herein. In certain examples, aspects of the operations of 1910 may be performed by a synchronization component as described with reference to FIGS. 13 through 16.

At 1915 the base station 105 may communicate with at least one UE over the cell based on the transmission of the first synchronization signal or the second synchronization signal. The operations of 1915 may be performed according to the methods described herein. In certain examples, aspects of the operations of 1915 may be performed by a communication component as described with reference to FIGS. 13 through 16.

Figure 20:
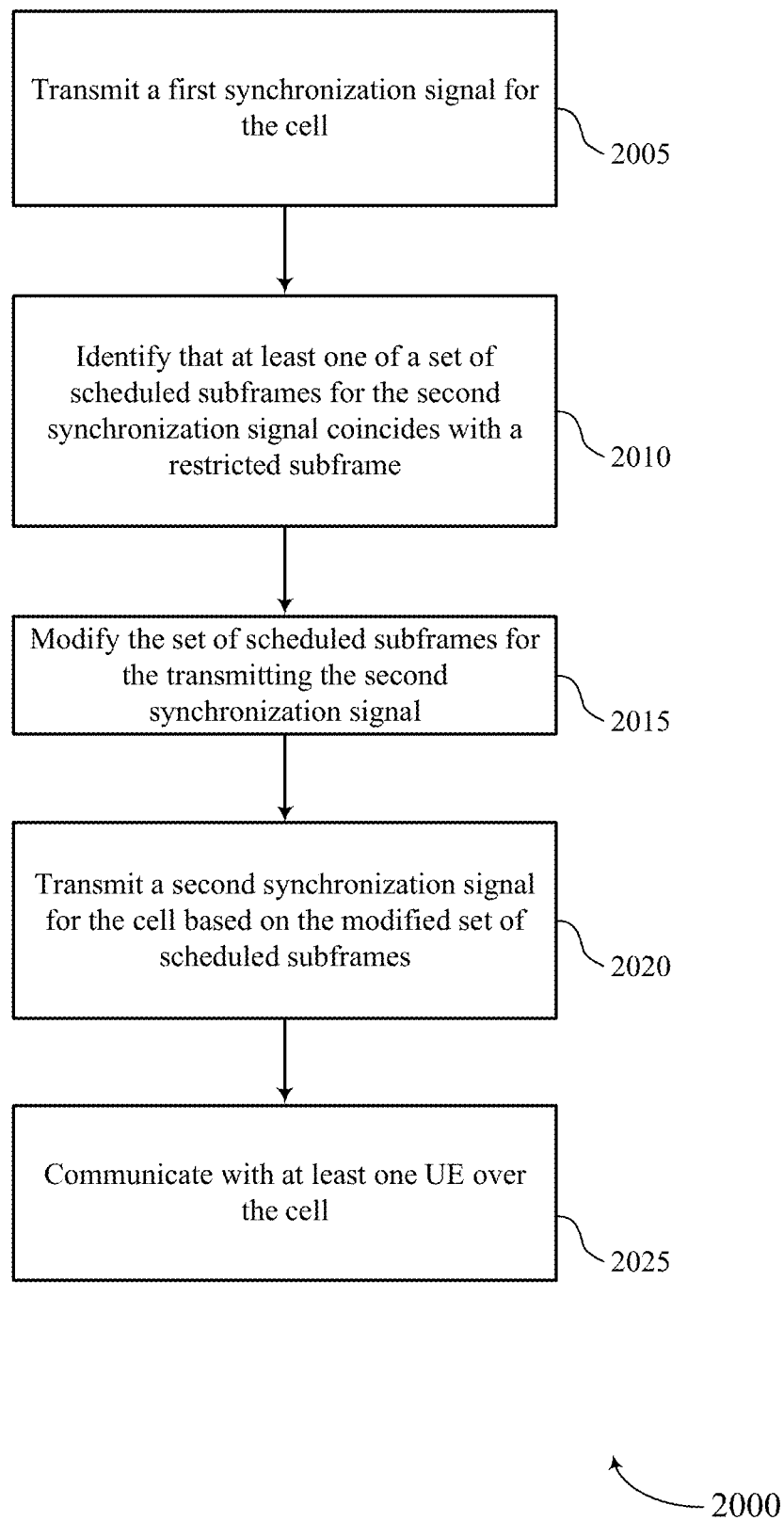

FIG. 20 shows a flowchart illustrating a method 2000 for resynchronization signal design in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2005 the base station 105 serving a cell, may transmit a first synchronization signal for the cell. In some cases, the first synchronization signal may be transmitted according to a first periodicity. The operations of 2005 may be performed according to the methods described herein. In certain examples, aspects of the operations of 2005 may be performed by a synchronization component as described with reference to FIGS. 13 through 16.

At 2010 the base station 105 may identify that at least one of a plurality of scheduled subframes for the second synchronization signal coincides with a subframe that is restricted for of the second synchronization signal. In some cases, the restricted subframe may include a multicast subframe, an MTC invalid subframe, a TDD uplink subframe, or a TDD special subframe. The operations of 2010 may be performed according to the methods described herein. In certain examples, aspects of the operations of 2010 may be performed by a subframe component as described with reference to FIGS. 13 through 16.

At 2015 the base station 105 may modify the plurality of scheduled subframes for the transmitting the second synchronization signal. In order to modify, the base station 105 may first select a modification action from the group including postponing the at least one of the plurality of scheduled subframes to a next subframe after the restricted subframe, suppressing transmission of the at least one of the plurality of scheduled subframes for the restricted subframe. The base station 105 may then transmit a portion of the at least one of the plurality of scheduled subframes in the restricted subframe. The operations of 2015 may be performed according to the methods described herein. In certain examples, aspects of the operations of 2015 may be performed by a subframe component as described with reference to FIGS. 13 through 16.

At 2020 the base station 105 may transmit a second synchronization signal for the cell based on the modified set of scheduled subframes. In some cases, the second synchronization signal may be transmitted according to a second periodicity. In some cases, the second periodicity may be different from the first periodicity. In some cases, the second synchronization signal may include a plurality of repetitions of a first sequence that is based on a cell identifier of the cell. The operations of 2020 may be performed according to the methods described herein. In certain examples, aspects of the operations of 2020 may be performed by a synchronization component as described with reference to FIGS. 13 through 16.

At 2025 the base station 105 may communicate with at least one UE over the cell based on the transmission of the first synchronization signal or the second synchronization signal. The operations of 2025 may be performed according to the methods described herein. In certain examples, aspects of the operations of 2025 may be performed by a communication component as described with reference to FIGS. 13 through 16.

Figure 21:
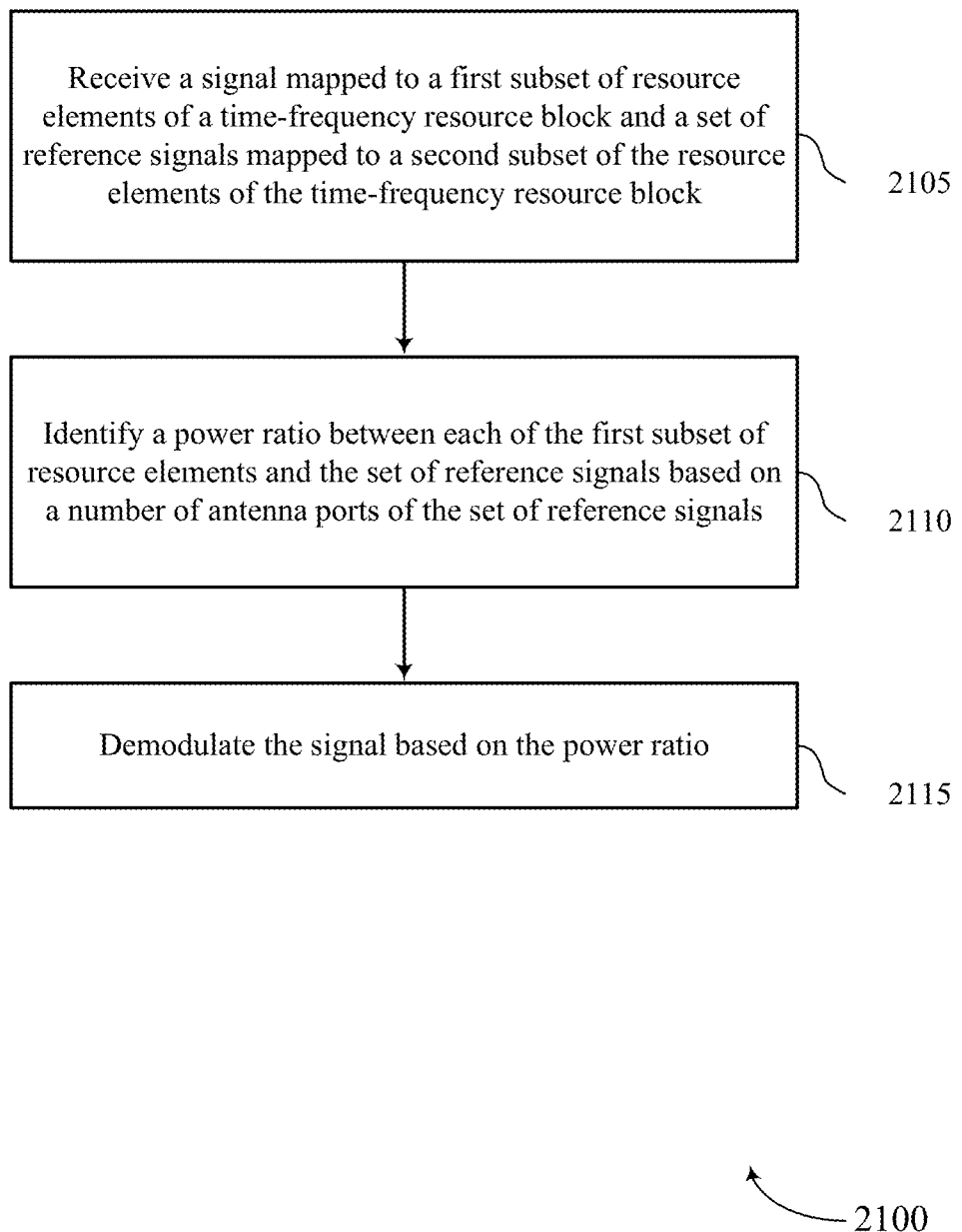

FIG. 21 shows a flowchart illustrating a method 2100 that supports resynchronization signal design in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may receive a signal mapped to a first subset of resource elements of a time-frequency resource block and a set of reference signals mapped to a second subset of the resource elements of the time-frequency resource block. In some cases, the first subset of resource elements include a subset of resource elements of a first symbol period of the time-frequency resource block, and each resource element of a second symbol period of the time-frequency resource block. The operations of 2105 may be performed according to the methods described herein. In some examples, aspects of the operations of 2105 may be performed by a signal receiving component as described with reference to FIGS. 9 through 12.

At 2110, the UE may identify a power ratio between each of the first subset of resource elements and the set of reference signals based on a number of antenna ports of the set of reference signals. To identify the power ratio, the UE may evaluate a function of a first power ratio between the set of reference signals and resource elements of a data channel for the first symbol period and a second power ratio between the set of reference signals and resource elements of the data channel for the second symbol period. The operations of 2110 may be performed according to the methods described herein. In some examples, aspects of the operations of 2110 may be performed by a power ratio component as described with reference to FIGS. 9 through 12.

At 2115, the UE may demodulate the signal based on the power ratio. The operations of 2115 may be performed according to the methods described herein. In some examples, aspects of the operations of 2115 may be performed by a demodulation component as described with reference to FIGS. 9 through 12.

Figure 22:
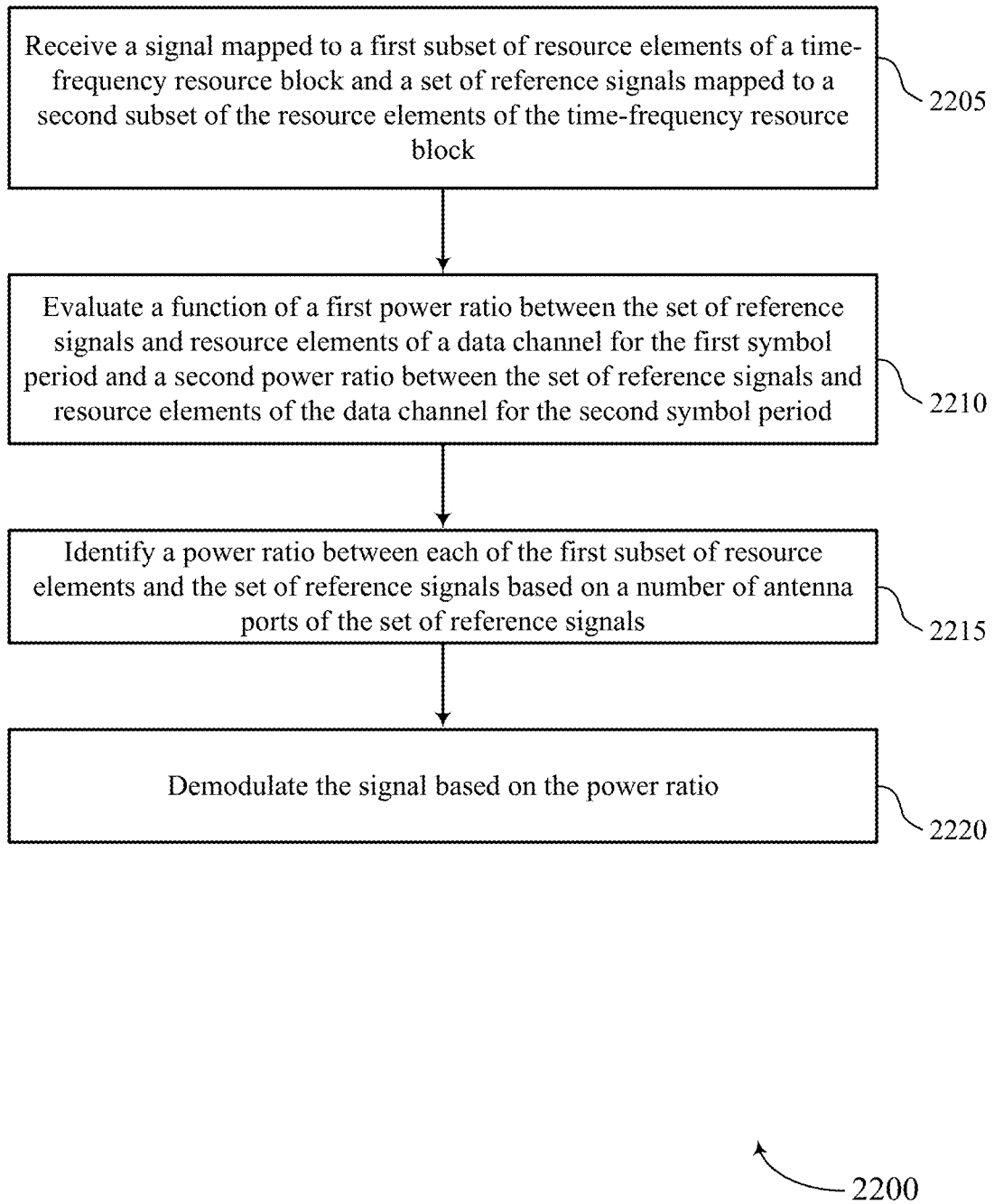

FIG. 22 shows a flowchart illustrating a method 2200 that supports resynchronization signal design in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may receive a signal mapped to a first subset of resource elements of a time-frequency resource block and a set of reference signals mapped to a second subset of the resource elements of the time-frequency resource block. In some cases, the first subset of resource elements include a subset of resource elements of a first symbol period of the time-frequency resource block, and each resource element of a second symbol period of the time-frequency resource block. The operations of 2205 may be performed according to the methods described herein. In some examples, aspects of the operations of 2205 may be performed by a signal receiving component as described with reference to FIGS. 9 through 12.

At 2210, the UE may evaluate a function of a first power ratio between the set of reference signals and resource elements of a data channel for the first symbol period and a second power ratio between the set of reference signals and resource elements of the data channel for the second symbol period. In some cases, the function includes normalizing the second power ratio by the first power ratio. In some cases, the function includes a minimum of the first power ratio and the second power ratio. In some cases, the function includes a maximum of the first power ratio and the second power ratio. In some cases, the function includes a sum of a product of the first power ratio with a first scaling factor and a product of the second power ratio with a second scaling factor. The operations of 2210 may be performed according to the methods described herein. In some examples, aspects of the operations of 2210 may be performed by a power ratio component as described with reference to FIGS. 9 through 12.

At 2215, the UE may identify a power ratio between each of the first subset of resource elements and the set of reference signals based on a number of antenna ports of the set of reference signals. The operations of 2215 may be performed according to the methods described herein. In some examples, aspects of the operations of 2215 may be performed by a power ratio component as described with reference to FIGS. 9 through 12.

At 2220, the UE may demodulate the signal based on the power ratio. The operations of 2220 may be performed according to the methods described herein. In some examples, aspects of the operations of 2220 may be performed by a demodulation component as described with reference to FIGS. 9 through 12.

Figure 23:
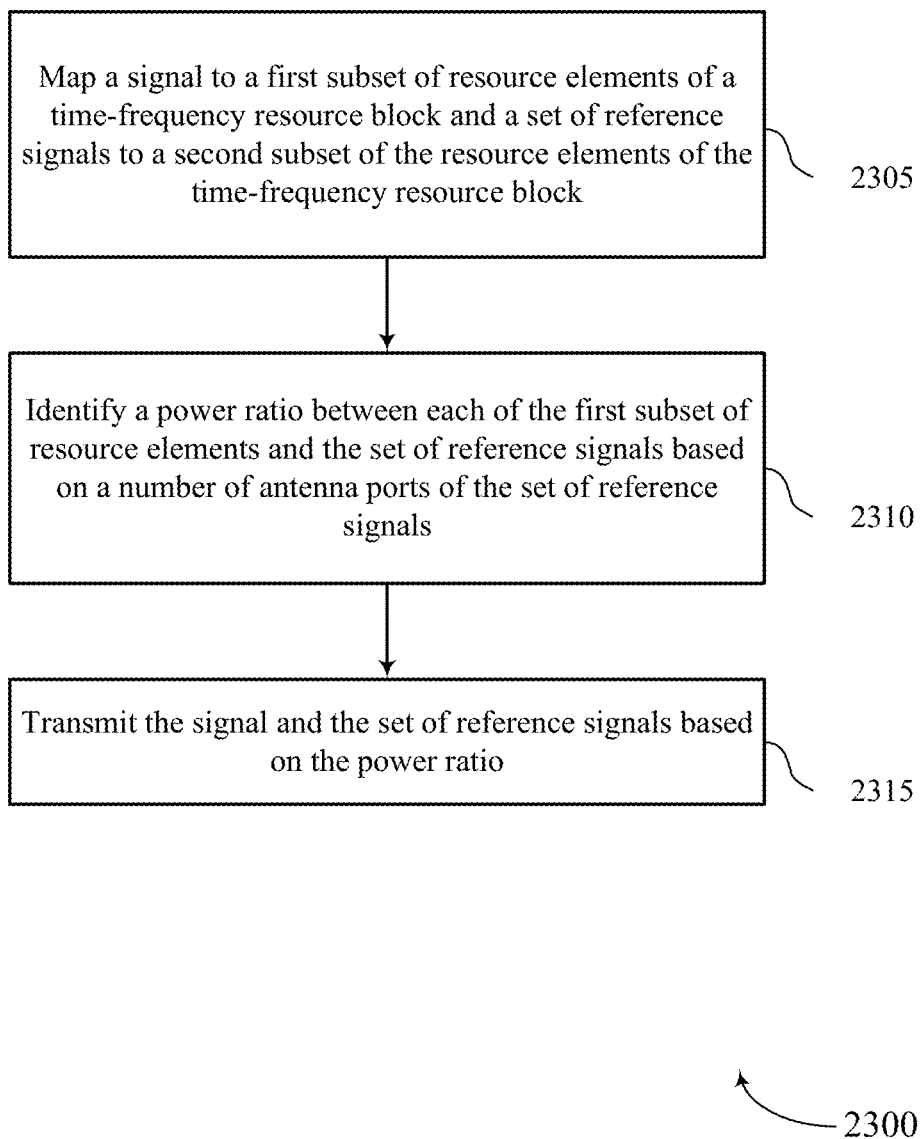

FIG. 23 shows a flowchart illustrating a method 2300 that supports resynchronization signal design in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may map a signal to a first subset of resource elements of a time-frequency resource block and a set of reference signals to a second subset of the resource elements of the time-frequency resource block. In some cases, the first subset of resource elements include a subset of resource elements of a first symbol period of the time-frequency resource block, and each resource element of a second symbol period of the time-frequency resource block. The operations of 2305 may be performed according to the methods described herein. In some examples, aspects of the operations of 2305 may be performed by a mapping component as described with reference to FIGS. 13 through 16.

At 2310, the base station may identify a power ratio between each of the first subset of resource elements and the set of reference signals based on a number of antenna ports of the set of reference signals. The operations of 2310 may be performed according to the methods described herein. In some examples, aspects of the operations of 2310 may be performed by a power ratio component as described with reference to FIGS. 13 through 16.

At 2315, the base station may transmit the signal and the set of reference signals based on the power ratio. The operations of 2315 may be performed according to the methods described herein. In some examples, aspects of the operations of 2315 may be performed by a signal transmitting component as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a first synchronization signal, the first synchronization signal transmitted by a base station and having a first periodicity;
synchronizing with the base station based on the first synchronization signal;
receiving system information comprising one or more parameters associated with a second synchronization signal;
receiving, subsequent to the synchronizing, the second synchronization signal, the second synchronization signal transmitted by the base station and having a second periodicity, wherein the second synchronization signal comprises a plurality of repetitions of a first sequence that is based at least in part on a cell identifier associated with the base station;
resynchronizing with the base station based on the second synchronization signal; and
communicating over the cell with the base station subsequent to the resynchronizing.

2. The method of claim 1, wherein the second synchronization signal comprises a plurality of repetitions of a second sequence, and wherein the plurality of repetitions of the first sequence and the plurality of repetitions of the second sequence are based, at least in part, on a binary sequence.

3. The method of claim 2, wherein the second sequence corresponds to a complex conjugate of the first sequence.

4. The method of claim 2, wherein the binary sequence corresponds to a length of the second synchronization signal.

5. The method of claim 2, wherein the binary sequence comprises an eight-bit binary sequence given by {1, 0, 0, 1, 0, 1, 1, 1}, a sixteen-bit binary sequence given by {0, 0, 1, 1, 0, 1, 0, 0, 0, 1, 1, 0, 0, 1, 0, 1}, a thirty-two-bit binary sequence given by {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1}, or a forty-bit binary sequence given by {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 0, 1, 0, 1, 1, 0}.

6. The method of claim 1, wherein one or more subframes indicated for transmission of the second synchronization signal by the system information coincides with a subframe on which transmission of the second synchronization signal is restricted,
and further comprising:
modifying reception of the second synchronization signal on the one or more subframes indicated for transmission of the second synchronization signal by the system information.

7. The method of claim 6, wherein the restricted subframe comprises a TDD special subframe.

8. The method of claim 6, wherein the modifying comprises at least one of postponing the one or more subframes until after the restricted subframe, suppressing reception of the second synchronization signal during the restricted subframe, and receiving a portion of the second synchronization signal during the restricted subframe.

9. The method of claim 8, wherein the modifying is based at least in part on the restricted subframe being a TDD special subframe configuration.

10. The method of claim 1, wherein the second synchronization signal is punctured by at least one of a reference signal, the first synchronization signal, or a broadcast channel.

11. An apparatus for wireless communication, comprising:
a processor;
memory in electronic communication with the processor; and
instructions stored in the memory and executable by the processor to cause the apparatus to:
receive a first synchronization signal, the first synchronization signal transmitted by a base station and having a first periodicity;
synchronize with the base station based on the first synchronization signal;
receive system information comprising one or more parameters associated with a second synchronization signal;
receive, subsequent to the synchronizing, the second synchronization signal, the second synchronization signal transmitted by the base station and having a second periodicity, wherein the second synchronization signal comprises a plurality of repetitions of a first sequence that is based at least in part on a cell identifier associated with the base station;
resynchronize with the base station based on the second synchronization signal; and
communicate over the cell with the base station subsequent to the resynchronizing.

12. The apparatus of claim 11, wherein the second synchronization signal comprises a plurality of repetitions of a second sequence, and wherein the plurality of repetitions of the first sequence and the plurality of repetitions of the second sequence are based, at least in part, on a binary sequence.

13. The apparatus of claim 12, wherein the second sequence corresponds to a complex conjugate of the first sequence.

14. The apparatus of claim 12, wherein the binary sequence corresponds to a length of the second synchronization signal.

15. The apparatus of claim 12, wherein the binary sequence comprises an eight-bit binary sequence given by {1, 0, 0, 1, 0, 1, 1, 1}, a sixteen-bit binary sequence given by {0, 0, 1, 1, 0, 1, 0, 0, 0, 1, 1, 0, 0, 1, 0, 1}, a thirty-two-bit binary sequence given by {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1}, or a forty-bit binary sequence given by {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 1, 1, 0, 1, 0, 1, 1, 0}.

16. The apparatus of claim 11, wherein one or more subframes indicated for transmission of the second synchronization signal by the system information coincides with a subframe on which transmission of the second synchronization signal is restricted, and wherein the instructions stored in the memory and executable by the processor further cause the apparatus to:
modify reception of the second synchronization signal on the one or more subframes indicated for transmission of the second synchronization signal by the system information.

17. The apparatus of claim 16, wherein the restricted subframe comprises a TDD special subframe.

18. The apparatus of claim 16, wherein the instructions to modify reception of the second synchronization signal on the one or more subframes comprises at least one of postponing the one or more subframes until after the restricted subframe, suppressing reception of the second synchronization signal during the restricted subframe, and receiving a portion of the second synchronization signal during the restricted subframe.

19. The apparatus of claim 18, wherein the instructions to modfiy reception of the second synchronization signal on the one or more subframes operate based at least in part on the restricted subframe being a TDD special subframe configuration.

20. The apparatus of claim 11, wherein the second synchronization signal is punctured by at least one of a reference signal, the first synchronization signal, or a broadcast channel.

21. A non-transitory computer readable medium, comprising instructions stored on a computer readable medium that when executed on one or more processors, causes the one or more processors to:
receive a first synchronization signal, the first synchronization signal transmitted by a base station and having a first periodicity;
synchronize with the base station based on the first synchronization signal;
receive system information comprising one or more parameters associated with a second synchronization signal;
receive, subsequent to the synchronizing, the second synchronization signal, the second synchronization signal transmitted by the base station and having a second periodicity, wherein the second synchronization signal comprises a plurality of repetitions of a first sequence that is based at least in part on a cell identifier associated with the base station;
resynchronize with the base station based on the second synchronization signal; and
communicate over the cell with the base station subsequent to the resynchronizing.

22. The non-transitory computer readable medium of claim 21, wherein the second synchronization signal comprises a plurality of repetitions of a second sequence, and wherein the plurality of repetitions of the first sequence and the plurality of repetitions of the second sequence are based, at least in part, on a binary sequence.

23. The non-transitory computer readable medium of claim 22, wherein the second sequence corresponds to a complex conjugate of the first sequence.

24. The non-transitory computer readable medium of claim 22, wherein the binary sequence corresponds to a length of the second synchronization signal.

25. The non-transitory computer readable medium of claim 22, wherein the binary sequence comprises an eight-bit binary sequence given by {1, 0, 0, 1, 0, 1, 1, 1}, a sixteen-bit binary sequence given by {0, 0, 1, 1, 0, 1, 0, 0, 0, 1, 1, 0, 0, 1, 0, 1}, a thirty-two-bit binary sequence given by {1, 1, 0, 0, 1, 0, 0, 1, 0, 1, 1, 1, 0, 0, 0, 1, 1, 1, 0, 1, 0, 1, 0, 0, 1, 0, 0, 0, 1, 1, 0, 1}, ora forty-bit binary sequence given by {0, 1, 1, 0, 1, 1, 0, 0, 0, 1, 0, 1, 0, 0, 1, 1, 1, 0, 1, 1, 1, 0, 0, 0, 0, 1, 1, 1, 0, 1, 0, 0, 0, 1, 1, 0, 1, 0, 1, 1, 0}.

26. The non-transitory computer readable medium of claim 21, one or more subframes indicated for transmission of the second synchronization signal by the system information coincides with a subframe on which transmission of the second synchronization signal is restricted from transmission of the second synchronization signal,
and wherein the instructions further cause the one or more processors to:
modify reception of the second synchronization signal on the one or more subframes indicated for transmission of the second synchronization signal by the system information.

27. The non-transitory computer readable medium of claim 26, wherein the restricted subframe comprises one of a a TDD special subframe.

28. The non-transitory computer readable medium of claim 26, wherein the instructions to modify reception of the second synchronization signal on the one or more subframes cause the one or more processors to at least one of: postpone the one or more subframes until after the restricted subframe, suppress reception of the second synchronization signal during the restricted subframe, and receive a portion of the second synchronization signal during the one or more subframes in the restricted subframe.

29. The non-transitory computer readable medium of claim 28, wherein the instructions to modfiy reception of the second synchronization signal on the one or more subframes operate based at least in part on the restricted subframe being a TDD special subframe configuration.

30. The non-transitory computer readable medium of claim 21, wherein the second synchronization signal is punctured by at least one of a reference signal, the first synchronization signal, or a broadcast channel.

31. A user equipment, comprising:
means for receiving a first synchronization signal, the first synchronization signal transmitted by a base station and having a first periodicity;
means for synchronizing with the base station based on the first synchronization signal;
means for receiving system information comprising one or more parameters associated with a second synchronization signal;
means for receiving, subsequent to the synchronizing, the second synchronization signal, the second synchronization signal transmitted by the base station and having a second periodicity, wherein the second synchronization signal comprises a plurality of repetitions of a first sequence that is based at least in part on a cell identifier associated with the base station;
means for resynchronizing with the base station based on the second synchronization signal; and
means for communicating over the cell with the base station subsequent to the resynchronizing.

* * * * *